United States Patent
Al-ALi et al.

(10) Patent No.: US 12,521,021 B2
(45) Date of Patent: Jan. 13, 2026

(54) WEARABLE DEVICE FOR NONINVASIVE BODY TEMPERATURE MEASUREMENT

(71) Applicant: Masimo Corporation, Irvine, CA (US)

(72) Inventors: Ammar Al-ALi, San Juan Capistrano, CA (US); Stephen Scruggs, Newport Beach, CA (US); Joel Amposta, Irvine, CA (US); Valery G. Telfort, Irvine, CA (US)

(73) Assignee: Masimo Corporation, Irvine, CA (US)

( * ) Notice: Subject to any disclaimer, the term of this patent is extended or adjusted under 35 U.S.C. 154(b) by 568 days.

(21) Appl. No.: 17/933,604

(22) Filed: Sep. 20, 2022

(65) Prior Publication Data

US 2023/0087671 A1    Mar. 23, 2023

Related U.S. Application Data

(60) Provisional application No. 63/261,500, filed on Sep. 22, 2021.

(51) Int. Cl.
*A61B 5/01* (2006.01)
*A61B 5/00* (2006.01)
(Continued)

(52) U.S. Cl.
CPC .............. *A61B 5/01* (2013.01); *A61B 5/6832* (2013.01); *G01K 1/16* (2013.01); *G01K 7/22* (2013.01);
(Continued)

(58) Field of Classification Search
CPC . A61B 5/01; A61B 5/6832; A61B 2562/0271; A61B 2562/043;
(Continued)

(56) References Cited

U.S. PATENT DOCUMENTS

| | | |
|---|---|---|
| 3,646,606 A | 2/1972 | Buxton et al. |
| 3,690,313 A | 9/1972 | Weppner et al. |

(Continued)

FOREIGN PATENT DOCUMENTS

| | | |
|---|---|---|
| CN | 101401313 | 4/2009 |
| CN | 101534706 | 9/2009 |

(Continued)

OTHER PUBLICATIONS

US 9,167,986 B2, 10/2015, Aga et al. (withdrawn)
(Continued)

*Primary Examiner* — Eric F Winakur
*Assistant Examiner* — Noah M Healy
(74) *Attorney, Agent, or Firm* — Knobbe Martens Olson & Bear LLP

(57) ABSTRACT

A wearable device configured to secure to skin of a user and noninvasively measure body temperature of the user can include first and second pairs of temperature sensors configured to generate one or more signals responsive to detected thermal energy, a thermally conductive element positioned at least partially between the second pair of temperature sensors, and one or more hardware processors configured to receive the one or more signals generated by each of said first and second pairs of temperature sensors and determine one or more body temperature values of the user based on at least comparisons between different ones of the first and second pairs of temperature sensors. In some implementations, the wearable device includes thermally conductive probes for transmitting thermal energy toward ones of the first and second pairs of temperature sensors and a substrate positioned between the probes and the skin.

19 Claims, 32 Drawing Sheets

(51) Int. Cl.
*G01K 1/16* (2006.01)
*G01K 7/22* (2006.01)
*G01K 13/20* (2021.01)

(52) U.S. Cl.
CPC ...... *G01K 13/20* (2021.01); *A61B 2562/0271* (2013.01); *A61B 2562/043* (2013.01)

(58) Field of Classification Search
CPC ............... A61B 5/0008; A61B 5/6833; A61B 2560/0252; A61B 2562/04; A61B 2562/046; G01K 1/16; G01K 7/22; G01K 13/20; G01K 1/20
See application file for complete search history.

(56) References Cited

U.S. PATENT DOCUMENTS

| | | |
|---|---|---|
| 3,978,849 A | 9/1976 | Geneen |
| 4,108,166 A | 8/1978 | Schmid |
| 4,129,125 A | 12/1978 | Lester et al. |
| 4,231,354 A | 11/1980 | Kurtz et al. |
| D278,363 S | 4/1985 | Schenkel et al. |
| 4,589,415 A | 5/1986 | Haaga |
| 4,662,378 A | 5/1987 | Thomis |
| D297,460 S | 8/1988 | Inoue et al. |
| 4,838,275 A | 6/1989 | Lee |
| 4,852,570 A | 8/1989 | Levine |
| 4,960,128 A | 10/1990 | Gordon et al. |
| 4,964,408 A | 10/1990 | Hink et al. |
| 4,966,154 A | 10/1990 | Cooper et al. |
| 5,092,340 A | 3/1992 | Yamaguchi et al. |
| 5,140,519 A | 8/1992 | Friesdorf et al. |
| 5,159,932 A | 11/1992 | Zanetti et al. |
| 5,161,539 A | 11/1992 | Evans et al. |
| 5,262,944 A | 11/1993 | Weisner et al. |
| 5,277,189 A | 1/1994 | Jacobs |
| 5,278,627 A | 1/1994 | Aoyagi et al. |
| 5,282,474 A | 2/1994 | Valdes Sosa et al. |
| 5,296,688 A | 3/1994 | Hamilton et al. |
| 5,318,037 A | 6/1994 | Evans et al. |
| 5,319,355 A | 6/1994 | Russek |
| 5,331,549 A | 7/1994 | Crawford, Jr. |
| 5,333,106 A | 7/1994 | Lanpher et al. |
| 5,337,744 A | 8/1994 | Branigan |
| 5,341,805 A | 8/1994 | Stavridi et al. |
| 5,348,008 A | 9/1994 | Bornn et al. |
| 5,358,519 A | 10/1994 | Grandjean |
| D353,195 S | 12/1994 | Savage et al. |
| D353,196 S | 12/1994 | Savage et al. |
| 5,375,599 A | 12/1994 | Shimizu |
| 5,377,676 A | 1/1995 | Vari et al. |
| 5,400,794 A | 3/1995 | Gorman |
| 5,416,695 A | 5/1995 | Stutman et al. |
| D359,546 S | 6/1995 | Savage et al. |
| D360,596 S | 7/1995 | Moritz et al. |
| 5,431,170 A | 7/1995 | Mathews |
| 5,434,611 A | 7/1995 | Tamura |
| 5,436,499 A | 7/1995 | Namavar et al. |
| D361,840 S | 8/1995 | Savage et al. |
| D362,063 S | 9/1995 | Savage et al. |
| D363,120 S | 10/1995 | Savage et al. |
| 5,456,252 A | 10/1995 | Vari et al. |
| 5,479,934 A | 1/1996 | Imran |
| 5,482,036 A | 1/1996 | Diab et al. |
| 5,483,968 A | 1/1996 | Adam et al. |
| 5,494,041 A | 2/1996 | Wilk |
| 5,494,043 A | 2/1996 | O'Sullivan et al. |
| 5,503,149 A | 4/1996 | Beavin |
| 5,505,202 A | 4/1996 | Mogi et al. |
| 5,523,534 A | 6/1996 | Meister et al. |
| 5,533,511 A | 7/1996 | Kaspari et al. |
| D372,787 S | 8/1996 | Dozier et al. |
| 5,544,649 A | 8/1996 | David et al. |
| 5,553,609 A | 9/1996 | Chen et al. |
| 5,558,638 A | 9/1996 | Evers et al. |
| 5,561,275 A | 10/1996 | Savage et al. |
| 5,566,676 A | 10/1996 | Rosenfeldt et al. |
| 5,576,952 A | 11/1996 | Stutman et al. |
| 5,579,001 A | 11/1996 | Dempsey et al. |
| 5,590,649 A | 1/1997 | Caro et al. |
| 5,602,924 A | 2/1997 | Durand et al. |
| 5,619,991 A | 4/1997 | Sloane |
| 5,638,816 A | 6/1997 | Kiani-Azarbayjany et al. |
| 5,638,818 A | 6/1997 | Diab et al. |
| 5,640,967 A | 6/1997 | Fine et al. |
| 5,645,440 A | 7/1997 | Tobler et al. |
| 5,671,914 A | 9/1997 | Kalkhoran et al. |
| 5,685,314 A | 11/1997 | Geheb et al. |
| 5,687,717 A | 11/1997 | Halpern et al. |
| 5,694,020 A | 12/1997 | Lang et al. |
| 5,724,580 A | 3/1998 | Levin et al. |
| 5,724,983 A | 3/1998 | Selker et al. |
| 5,725,308 A | 3/1998 | Smith et al. |
| 5,726,440 A | 3/1998 | Kalkhoran et al. |
| 5,732,146 A | 3/1998 | Yamada et al. |
| 5,734,739 A | 3/1998 | Sheehan et al. |
| D393,830 S | 4/1998 | Tobler et al. |
| 5,743,262 A | 4/1998 | Lepper, Jr. et al. |
| 5,747,806 A | 5/1998 | Khalil et al. |
| 5,750,994 A | 5/1998 | Schlager |
| 5,758,079 A | 5/1998 | Ludwig et al. |
| 5,758,644 A | 6/1998 | Diab et al. |
| 5,760,910 A | 6/1998 | Lepper, Jr. et al. |
| 5,772,585 A | 6/1998 | Lavin et al. |
| 5,782,805 A | 7/1998 | Meinzer |
| 5,801,637 A | 9/1998 | Lomholt |
| 5,813,403 A | 9/1998 | Soller et al. |
| 5,822,544 A | 10/1998 | Chaco et al. |
| 5,822,546 A | 10/1998 | George |
| 5,855,550 A | 1/1999 | Lai et al. |
| 5,890,929 A | 4/1999 | Mills et al. |
| 5,910,139 A | 6/1999 | Cochran et al. |
| 5,919,134 A | 7/1999 | Diab |
| 5,921,920 A | 7/1999 | Marshall et al. |
| 5,924,074 A | 7/1999 | Evans |
| 5,931,160 A | 8/1999 | Gilmore et al. |
| 5,941,836 A | 8/1999 | Friedman |
| 5,942,986 A | 8/1999 | Shabot et al. |
| 5,950,189 A | 9/1999 | Cohen et al. |
| 5,987,343 A | 11/1999 | Kinast |
| 5,987,519 A | 11/1999 | Peifer et al. |
| 5,997,343 A | 12/1999 | Mills et al. |
| 6,002,952 A | 12/1999 | Diab et al. |
| 6,006,119 A | 12/1999 | Soller et al. |
| 6,010,937 A | 1/2000 | Karam et al. |
| 6,014,346 A | 1/2000 | Malone |
| 6,018,673 A | 1/2000 | Chin et al. |
| 6,024,699 A | 2/2000 | Surwit et al. |
| 6,027,452 A | 2/2000 | Flaherty et al. |
| 6,032,063 A | 2/2000 | Hoar et al. |
| 6,032,678 A | 3/2000 | Rottem |
| 6,035,230 A | 3/2000 | Kang et al. |
| 6,036,718 A | 3/2000 | Ledford et al. |
| 6,040,578 A | 3/2000 | Malin et al. |
| 6,066,204 A | 5/2000 | Haven |
| 6,093,146 A | 7/2000 | Filangeri |
| 6,101,478 A | 8/2000 | Brown |
| 6,106,463 A | 8/2000 | Wilk |
| 6,115,673 A | 9/2000 | Malin et al. |
| 6,124,597 A | 9/2000 | Shehada |
| 6,128,521 A | 10/2000 | Marro et al. |
| 6,129,675 A | 10/2000 | Jay |
| 6,129,686 A | 10/2000 | Friedman |
| 6,132,218 A | 10/2000 | Benja-Athon |
| 6,139,494 A | 10/2000 | Cairnes |
| 6,144,868 A | 11/2000 | Parker |
| 6,152,754 A | 11/2000 | Gerhardt et al. |
| 6,167,258 A | 12/2000 | Schmidt et al. |
| D437,058 S | 1/2001 | Gozani |
| 6,168,563 B1 | 1/2001 | Brown |
| 6,171,237 B1 | 1/2001 | Avitall et al. |
| 6,183,417 B1 | 2/2001 | Gehab et al. |
| 6,184,521 B1 | 2/2001 | Coffin, IV et al. |
| 6,185,448 B1 | 2/2001 | Borovsky |

(56) References Cited

U.S. PATENT DOCUMENTS

| | | |
|---|---|---|
| 6,195,576 B1 | 2/2001 | John |
| 6,221,012 B1 | 4/2001 | Maschke et al. |
| 6,224,553 B1 | 5/2001 | Nevo |
| 6,230,142 B1 | 5/2001 | Benigno et al. |
| 6,232,609 B1 | 5/2001 | Snyder et al. |
| 6,241,683 B1 | 6/2001 | Macklem et al. |
| 6,253,097 B1 | 6/2001 | Aronow et al. |
| 6,255,708 B1 | 7/2001 | Sudharsanan et al. |
| 6,267,723 B1 | 7/2001 | Matsumura et al. |
| 6,269,262 B1 | 7/2001 | Kandori et al. |
| 6,280,381 B1 | 8/2001 | Malin et al. |
| 6,285,896 B1 | 9/2001 | Tobler et al. |
| 6,304,767 B1 | 10/2001 | Soller et al. |
| 6,308,089 B1 | 10/2001 | von der Ruhr et al. |
| 6,312,378 B1 | 11/2001 | Bardy |
| 6,317,627 B1 | 11/2001 | Ennen et al. |
| 6,321,100 B1 | 11/2001 | Parker |
| 6,322,502 B1 | 11/2001 | Schoenberg et al. |
| 6,329,139 B1 | 12/2001 | Nova et al. |
| 6,334,065 B1 | 12/2001 | Al-Ali et al. |
| 6,338,039 B1 | 1/2002 | Lonski et al. |
| 6,354,235 B1 | 3/2002 | Davies |
| 6,360,114 B1 | 3/2002 | Diab et al. |
| 6,364,834 B1 | 4/2002 | Reuss et al. |
| 6,368,283 B1 | 4/2002 | Xu et al. |
| 6,385,476 B1 | 5/2002 | Osadchy et al. |
| 6,385,589 B1 | 5/2002 | Trusheim et al. |
| 6,411,373 B1 | 6/2002 | Garside et al. |
| 6,415,167 B1 | 7/2002 | Blank et al. |
| 6,430,437 B1 | 8/2002 | Marro |
| 6,430,525 B1 | 8/2002 | Weber et al. |
| 6,463,311 B1 | 10/2002 | Diab |
| 6,470,199 B1 | 10/2002 | Kopotic et al. |
| 6,470,893 B1 | 10/2002 | Boesen |
| 6,487,429 B2 | 11/2002 | Hockersmith et al. |
| 6,505,059 B1 | 1/2003 | Kollias et al. |
| 6,524,240 B1 | 2/2003 | Thede |
| 6,525,386 B1 | 2/2003 | Mills et al. |
| 6,526,300 B1 | 2/2003 | Kiani et al. |
| 6,534,012 B1 | 3/2003 | Hazen et al. |
| 6,542,764 B1 | 4/2003 | Al-Ali et al. |
| 6,544,173 B2 | 4/2003 | West et al. |
| 6,544,174 B2 | 4/2003 | West et al. |
| 6,551,243 B2 | 4/2003 | Bocionek et al. |
| 6,578,428 B1 | 6/2003 | Dromms et al. |
| 6,580,086 B1 | 6/2003 | Schulz et al. |
| 6,582,393 B2 | 6/2003 | Sage, Jr. |
| 6,584,336 B1 | 6/2003 | Ali et al. |
| 6,587,196 B1 | 7/2003 | Stippick et al. |
| 6,587,199 B1 | 7/2003 | Luu |
| 6,595,316 B2 | 7/2003 | Cybulski et al. |
| 6,597,932 B2 | 7/2003 | Tian et al. |
| 6,606,511 B1 | 8/2003 | Ali et al. |
| 6,616,606 B1 | 9/2003 | Peterson et al. |
| 6,635,559 B2 | 10/2003 | Greenwald et al. |
| 6,639,668 B1 | 10/2003 | Trepagnier |
| 6,640,116 B2 | 10/2003 | Diab |
| 6,640,117 B2 | 10/2003 | Makarewicz et al. |
| 6,641,533 B2 | 11/2003 | Causey et al. |
| 6,646,556 B1 | 11/2003 | Smith et al. |
| 6,650,939 B2 | 11/2003 | Takpke, II et al. |
| D483,872 S | 12/2003 | Cruz et al. |
| 6,658,276 B2 | 12/2003 | Kianl et al. |
| 6,661,161 B1 | 12/2003 | Lanzo et al. |
| 6,694,180 B1 | 2/2004 | Boesen |
| 6,697,656 B1 | 2/2004 | Al-Ali |
| 6,697,658 B2 | 2/2004 | Al-Ali |
| RE38,476 E | 3/2004 | Diab et al. |
| RE38,492 E | 4/2004 | Diab et al. |
| 6,719,694 B2 | 4/2004 | Weng et al. |
| 6,735,379 B2 | 5/2004 | Salmon et al. |
| 6,738,652 B2 | 5/2004 | Mattu et al. |
| 6,746,406 B2 | 6/2004 | Lia et al. |
| 6,751,492 B2 | 6/2004 | Ben-haim |
| 6,760,607 B2 | 7/2004 | Al-Ali |
| 6,766,188 B2 | 7/2004 | Soller |
| 6,783,492 B2 | 8/2004 | Dominguez |
| 6,788,965 B2 | 9/2004 | Ruchti et al. |
| 6,790,178 B1 | 9/2004 | Mault et al. |
| 6,795,724 B2 | 9/2004 | Hogan |
| 6,796,186 B2 | 9/2004 | Lia et al. |
| 6,804,656 B1 | 10/2004 | Rosenfeld |
| 6,807,050 B1 | 10/2004 | Whitehorn et al. |
| 6,816,241 B2 | 11/2004 | Grubisic |
| 6,817,979 B2 | 11/2004 | Nihtila et al. |
| 6,822,564 B2 | 11/2004 | Al-Ali |
| 6,837,848 B2 | 1/2005 | Bonner et al. |
| 6,841,535 B2 | 1/2005 | Divita et al. |
| 6,850,787 B2 | 2/2005 | Weber et al. |
| 6,850,788 B2 | 2/2005 | Al-Ali |
| 6,855,112 B2 | 2/2005 | Kao et al. |
| 6,860,266 B2 | 3/2005 | Blike |
| 6,876,931 B2 | 4/2005 | Lorenz et al. |
| 6,897,788 B2 | 5/2005 | Khair et al. |
| 6,907,237 B1 | 6/2005 | Dorenbosch et al. |
| 6,915,149 B2 | 7/2005 | Ben-haim |
| 6,920,345 B2 | 7/2005 | Al-Ali et al. |
| 6,934,570 B2 | 8/2005 | Kiani et al. |
| 6,943,348 B1 | 9/2005 | Coffin, IV |
| D511,004 S | 10/2005 | Masuda |
| 6,952,340 B2 | 10/2005 | Son et al. |
| 6,956,649 B2 | 10/2005 | Acosta et al. |
| D511,384 S | 11/2005 | Masuda |
| 6,961,598 B2 | 11/2005 | Diab |
| 6,970,792 B1 | 11/2005 | Diab |
| 6,980,419 B2 | 12/2005 | Smith et al. |
| 6,983,179 B2 | 1/2006 | Ben-haim |
| 6,985,764 B2 | 1/2006 | Mason et al. |
| 6,988,989 B2 | 1/2006 | Weiner et al. |
| 6,990,087 B2 | 1/2006 | Rao et al. |
| 6,990,364 B2 | 1/2006 | Ruchti et al. |
| 6,997,882 B1 | 2/2006 | Parker |
| 6,997,884 B2 | 2/2006 | Ulmsten |
| 6,998,247 B2 | 2/2006 | Monfre et al. |
| 7,003,338 B2 | 2/2006 | Weber et al. |
| 7,004,907 B2 | 2/2006 | Banet et al. |
| 7,015,451 B2 | 3/2006 | Dalke et al. |
| 7,025,729 B2 | 4/2006 | De Chazal et al. |
| 7,027,849 B2 | 4/2006 | Al-Ali |
| 7,033,761 B2 | 4/2006 | Shafer |
| 7,035,686 B2 | 4/2006 | Hogan |
| 7,063,666 B2 | 6/2006 | Weng et al. |
| 7,079,035 B2 | 7/2006 | Bock et al. |
| D526,719 S | 8/2006 | Richie, Jr. et al. |
| 7,096,052 B2 | 8/2006 | Mason et al. |
| 7,096,054 B2 | 8/2006 | Abdul-Hafiz et al. |
| D529,616 S | 10/2006 | Deros et al. |
| 7,133,710 B2 | 11/2006 | Acosta et al. |
| 7,142,901 B2 | 11/2006 | Kiani et al. |
| 7,179,228 B2 | 2/2007 | Banet |
| 7,188,621 B2 | 3/2007 | DeVries et al. |
| 7,208,119 B1 | 4/2007 | Kurtock et al. |
| 7,225,006 B2 | 5/2007 | Al-Ali et al. |
| RE39,672 E | 6/2007 | Shehada et al. |
| 7,229,415 B2 | 6/2007 | Schwartz |
| 7,238,159 B2 | 7/2007 | Banet et al. |
| 7,241,287 B2 | 7/2007 | Shehada et al. |
| 7,244,251 B2 | 7/2007 | Shehada et al. |
| 7,245,373 B2 | 7/2007 | Soller et al. |
| 7,248,172 B2 | 7/2007 | Clifford et al. |
| 7,252,659 B2 | 8/2007 | Shehada et al. |
| 7,254,429 B2 | 8/2007 | Schurman et al. |
| 7,254,431 B2 | 8/2007 | Al-Ali |
| 7,254,434 B2 | 8/2007 | Schulz et al. |
| 7,256,708 B2 | 8/2007 | Rosenfeld |
| 7,261,697 B2 | 8/2007 | Berstein |
| 7,264,616 B2 | 9/2007 | Shehada et al. |
| 7,267,671 B2 | 9/2007 | Shehada et al. |
| 7,268,859 B2 | 9/2007 | Sage, Jr. et al. |
| 7,274,955 B2 | 9/2007 | Kiani et al. |
| D554,263 S | 10/2007 | Al-Ali |
| 7,280,858 B2 | 10/2007 | Al-Ali et al. |
| 7,285,090 B2 | 10/2007 | Stivoric et al. |
| 7,289,835 B2 | 10/2007 | Mansfield et al. |

(56) References Cited

U.S. PATENT DOCUMENTS

| | | |
|---|---|---|
| 7,292,883 B2 | 11/2007 | De Felice et al. |
| 7,307,543 B2 | 12/2007 | Rosenfeld |
| 7,313,423 B2 | 12/2007 | Griffin et al. |
| D558,882 S | 1/2008 | Brady |
| 7,314,446 B2 | 1/2008 | Byrd et al. |
| 7,315,825 B2 | 1/2008 | Rosenfeld |
| 7,321,862 B2 | 1/2008 | Rosenfeld |
| 7,322,971 B2 | 1/2008 | Shehada et al. |
| 7,336,187 B2 | 2/2008 | Hubbard, Jr. et al. |
| 7,341,559 B2 | 3/2008 | Schulz et al. |
| 7,343,186 B2 | 3/2008 | Lamego et al. |
| D566,282 S | 4/2008 | Al-Ali et al. |
| 7,356,178 B2 | 4/2008 | Ziel et al. |
| 7,356,365 B2 | 4/2008 | Schurman |
| 7,361,155 B2 | 4/2008 | Sage, Jr. et al. |
| D569,280 S | 5/2008 | Chen |
| 7,371,981 B2 | 5/2008 | Abdul-Hafiz |
| 7,373,193 B2 | 5/2008 | Al-Ali et al. |
| 7,377,794 B2 | 5/2008 | Al Ali et al. |
| 7,378,975 B1 | 5/2008 | Smith et al. |
| 7,382,247 B2 | 6/2008 | Welch et al. |
| 7,390,299 B2 | 6/2008 | Weiner et al. |
| 7,395,158 B2 | 7/2008 | Monfre et al. |
| 7,395,216 B2 | 7/2008 | Rosenfeld |
| 7,396,330 B2 | 7/2008 | Banet et al. |
| 7,411,509 B2 | 8/2008 | Rosenfeld |
| 7,413,546 B2 | 8/2008 | Agutter et al. |
| 7,415,297 B2 | 8/2008 | Al-Ali et al. |
| 7,419,483 B2 | 9/2008 | Shehada |
| 7,433,827 B2 | 10/2008 | Rosenfeld |
| 7,438,683 B2 | 10/2008 | Al-Ali et al. |
| 7,439,856 B2 | 10/2008 | Weiner et al. |
| 7,454,359 B2 | 11/2008 | Rosenfeld |
| 7,454,360 B2 | 11/2008 | Rosenfeld |
| 7,462,151 B2 | 12/2008 | Childre et al. |
| 7,467,094 B2 | 12/2008 | Rosenfeld |
| 7,475,019 B2 | 1/2009 | Rosenfeld |
| 7,481,772 B2 | 1/2009 | Banet |
| 7,483,729 B2 | 1/2009 | Al-Ali et al. |
| 7,489,250 B2 | 2/2009 | Bock et al. |
| D587,657 S | 3/2009 | Al-Ali et al. |
| 7,497,828 B1 | 3/2009 | Wilk et al. |
| 7,500,950 B2 | 3/2009 | Al-Ali et al. |
| 7,509,494 B2 | 3/2009 | Al-Ali |
| 7,510,849 B2 | 3/2009 | Schurman et al. |
| 7,514,725 B2 | 4/2009 | Wojtczuk et al. |
| 7,515,043 B2 | 4/2009 | Welch et al. |
| 7,515,044 B2 | 4/2009 | Welch et al. |
| 7,519,406 B2 | 4/2009 | Blank et al. |
| D592,507 S | 5/2009 | Wachman et al. |
| 7,530,942 B1 | 5/2009 | Diab |
| 7,532,919 B2 | 5/2009 | Soyemi et al. |
| 7,549,961 B1 | 6/2009 | Hwang |
| 7,551,717 B2 | 6/2009 | Tome et al. |
| 7,559,520 B2 | 7/2009 | Quijano et al. |
| 7,577,475 B2 | 8/2009 | Consentino et al. |
| 7,588,558 B2 | 9/2009 | Sage, Jr. et al. |
| 7,590,950 B2 | 9/2009 | Collins et al. |
| 7,593,230 B2 | 9/2009 | Abul-Haj et al. |
| 7,596,398 B2 | 9/2009 | Al-Ali et al. |
| 7,597,665 B2 | 10/2009 | Wilk et al. |
| 7,606,608 B2 | 10/2009 | Blank et al. |
| 7,612,999 B2 | 11/2009 | Clark et al. |
| 7,616,303 B2 | 11/2009 | Yang et al. |
| 7,620,674 B2 | 11/2009 | Ruchti et al. |
| D606,659 S | 12/2009 | Kiani et al. |
| 7,629,039 B2 | 12/2009 | Eckerbom et al. |
| 7,639,145 B2 | 12/2009 | Lawson et al. |
| 7,640,140 B2 | 12/2009 | Ruchti et al. |
| 7,647,083 B2 | 1/2010 | Al-Ali et al. |
| 7,650,291 B2 | 1/2010 | Rosenfeld |
| D609,193 S | 2/2010 | Al-Ali et al. |
| D610,690 S | 2/2010 | Tokumoto et al. |
| 7,654,966 B2 | 2/2010 | Westinskow et al. |
| 7,658,716 B2 | 2/2010 | Banet et al. |
| 7,684,845 B2 | 3/2010 | Juan |
| 7,689,437 B1 | 3/2010 | Teller et al. |
| RE41,236 E | 4/2010 | Seely |
| D614,305 S | 4/2010 | Al-Ali et al. |
| 7,693,697 B2 | 4/2010 | Westinskow et al. |
| 7,697,966 B2 | 4/2010 | Monfre et al. |
| 7,698,105 B2 | 4/2010 | Ruchti et al. |
| RE41,317 E | 5/2010 | Parker |
| RE41,333 E | 5/2010 | Blank et al. |
| 7,722,542 B2 | 5/2010 | Lia et al. |
| D617,463 S | 6/2010 | Tokumoto et al. |
| 7,729,733 B2 | 6/2010 | Al-Ali et al. |
| 7,736,318 B2 | 6/2010 | Consentino et al. |
| 7,740,590 B2 | 6/2010 | Bernstein |
| 7,761,127 B2 | 7/2010 | Al-Ali et al. |
| 7,763,420 B2 | 7/2010 | Strizker et al. |
| 7,764,982 B2 | 7/2010 | Dalke et al. |
| D621,515 S | 8/2010 | Chua et al. |
| D621,516 S | 8/2010 | Kiani et al. |
| 7,766,818 B2 | 8/2010 | Iketani et al. |
| 7,774,060 B2 | 8/2010 | Westenskow et al. |
| 7,778,851 B2 | 8/2010 | Schoenberg et al. |
| 7,783,879 B2 | 8/2010 | Krummel et al. |
| 7,791,155 B2 | 9/2010 | Diab |
| 7,794,407 B2 | 9/2010 | Rothenberg |
| 7,803,120 B2 | 9/2010 | Banet et al. |
| 7,806,830 B2 | 10/2010 | Bernstein |
| 7,820,184 B2 | 10/2010 | Strizker et al. |
| RE41,912 E | 11/2010 | Parker |
| 7,831,450 B2 | 11/2010 | Schoenberg |
| 7,841,986 B2 | 11/2010 | He et al. |
| D629,524 S | 12/2010 | Zeller et al. |
| 7,848,935 B2 | 12/2010 | Gotlib |
| 7,858,322 B2 | 12/2010 | Tymianski et al. |
| 7,865,232 B1 | 1/2011 | Krishnaswamy et al. |
| 7,880,626 B2 | 2/2011 | Al-Ali et al. |
| 7,881,892 B2 | 2/2011 | Soyemi et al. |
| 7,890,156 B2 | 2/2011 | Ooi et al. |
| D634,017 S | 3/2011 | Tokumoto et al. |
| 7,909,772 B2 | 3/2011 | Popov et al. |
| 7,914,514 B2 | 3/2011 | Calderon |
| 7,919,713 B2 | 4/2011 | Al-Ali et al. |
| 7,937,128 B2 | 5/2011 | Al-Ali |
| 7,937,129 B2 | 5/2011 | Mason et al. |
| 7,941,199 B2 | 5/2011 | Kiani |
| 7,957,780 B2 | 6/2011 | Lamego et al. |
| 7,962,188 B2 | 6/2011 | Kiani et al. |
| 7,963,927 B2 | 6/2011 | Kelleher et al. |
| 7,967,749 B2 | 6/2011 | Hutchinson et al. |
| 7,976,472 B2 | 7/2011 | Kiani |
| 7,987,069 B2 | 7/2011 | Rodgers et al. |
| 7,988,639 B2 | 8/2011 | Starks |
| 7,990,382 B2 | 8/2011 | Kiani |
| 7,991,463 B2 | 8/2011 | Kelleher et al. |
| 7,991,625 B2 | 8/2011 | Rosenfeld |
| 7,993,275 B2 | 8/2011 | Banet et al. |
| 8,008,088 B2 | 8/2011 | Bellott et al. |
| RE42,753 E | 9/2011 | Kiani-Azarbayjany et al. |
| 8,027,846 B2 | 9/2011 | Schoenberg |
| 8,028,701 B2 | 10/2011 | Al-Ali et al. |
| 8,033,996 B2 | 10/2011 | Behar |
| 8,036,736 B2 | 10/2011 | Snyder et al. |
| 8,038,625 B2 | 10/2011 | Afonso et al. |
| 8,048,040 B2 | 11/2011 | Kiani |
| 8,050,728 B2 | 11/2011 | Al-Ali et al. |
| 8,068,104 B2 | 11/2011 | Rampersad |
| 8,073,707 B2 | 12/2011 | Teller et al. |
| 8,094,013 B1 | 1/2012 | Lee et al. |
| RE43,169 E | 2/2012 | Parker |
| 8,118,620 B2 | 2/2012 | Al-Ali et al. |
| 8,130,105 B2 | 3/2012 | Al-Ali et al. |
| D659,836 S | 5/2012 | Bensch et al. |
| 8,170,887 B2 | 5/2012 | Rosenfeld |
| 8,175,895 B2 | 5/2012 | Rosenfeld |
| 8,180,440 B2 | 5/2012 | McCombie et al. |
| 8,182,443 B1 | 5/2012 | Kiani |
| 8,190,223 B2 | 5/2012 | Al-Ali et al. |
| 8,200,321 B2 | 6/2012 | McCombie et al. |
| 8,203,438 B2 | 6/2012 | Kiani et al. |

(56) References Cited

U.S. PATENT DOCUMENTS

| | | |
|---|---|---|
| 8,203,704 B2 | 6/2012 | Merritt et al. |
| 8,206,312 B2 | 6/2012 | Farquhar |
| 8,214,007 B2 | 7/2012 | Baker et al. |
| 8,219,172 B2 | 7/2012 | Schurman et al. |
| 8,224,411 B2 | 7/2012 | Al-Ali et al. |
| 8,229,532 B2 | 7/2012 | Davis |
| 8,233,955 B2 | 7/2012 | Al-Ali et al. |
| D665,085 S | 8/2012 | Strother et al. |
| 8,235,907 B2 | 8/2012 | Wilk et al. |
| 8,239,010 B2 | 8/2012 | Banet et al. |
| 8,239,780 B2 | 8/2012 | Manetta et al. |
| 8,241,213 B2 | 8/2012 | Lynn et al. |
| 8,249,815 B2 | 8/2012 | Taylor |
| 8,255,026 B1 | 8/2012 | Al-Ali |
| 8,265,723 B1 | 9/2012 | McHale et al. |
| 8,274,360 B2 | 9/2012 | Sampath et al. |
| 8,280,473 B2 | 10/2012 | Al-Ali |
| 8,294,588 B2 | 10/2012 | Fisher et al. |
| 8,294,716 B2 | 10/2012 | Lord et al. |
| 8,311,747 B2 | 11/2012 | Taylor |
| 8,311,748 B2 | 11/2012 | Taylor et al. |
| 8,315,683 B2 | 11/2012 | Al-Ali et al. |
| 8,315,812 B2 | 11/2012 | Taylor |
| 8,315,813 B2 | 11/2012 | Taylor et al. |
| 8,315,814 B2 | 11/2012 | Taylor et al. |
| 8,321,004 B2 | 11/2012 | Moon et al. |
| 8,321,150 B2 | 11/2012 | Taylor |
| RE43,860 E | 12/2012 | Parker |
| 8,326,649 B2 | 12/2012 | Rosenfeld |
| 8,346,330 B2 | 1/2013 | Lamego |
| 8,348,840 B2 | 1/2013 | Heit et al. |
| 8,353,842 B2 | 1/2013 | Al-Ali et al. |
| 8,355,766 B2 | 1/2013 | MacNeish, III et al. |
| 8,360,936 B2 | 1/2013 | Dibenedetto et al. |
| 8,364,250 B2 | 1/2013 | Moon et al. |
| 8,374,665 B2 | 2/2013 | Lamego |
| D679,018 S | 3/2013 | Fullerton et al. |
| 8,388,353 B2 | 3/2013 | Kiani et al. |
| 8,401,602 B2 | 3/2013 | Kiani |
| 8,401,874 B2 | 3/2013 | Rosenfeld |
| 8,414,499 B2 | 4/2013 | Al-Ali et al. |
| 8,418,524 B2 | 4/2013 | Al-Ali |
| 8,419,649 B2 | 4/2013 | Banet et al. |
| 8,428,967 B2 | 4/2013 | Olsen et al. |
| 8,430,817 B1 | 4/2013 | Al-Ali et al. |
| 8,437,824 B2 | 5/2013 | Moon et al. |
| 8,437,825 B2 | 5/2013 | Dalvi et al. |
| 8,442,607 B2 | 5/2013 | Banet et al. |
| 8,449,469 B2 | 5/2013 | Banet et al. |
| 8,455,290 B2 | 6/2013 | Siskavich |
| 8,457,707 B2 | 6/2013 | Kiani |
| 8,471,713 B2 | 6/2013 | Poeze et al. |
| 8,473,020 B2 | 6/2013 | Kiani et al. |
| 8,475,370 B2 | 7/2013 | McCombie et al. |
| 8,506,480 B2 | 8/2013 | Banet et al. |
| 8,509,867 B2 | 8/2013 | Workman et al. |
| 8,515,509 B2 | 8/2013 | Bruinsma et al. |
| 8,523,781 B2 | 9/2013 | Al-Ali |
| 8,527,038 B2 | 9/2013 | Moon et al. |
| D692,145 S | 10/2013 | Al-Ali et al. |
| 8,545,417 B2 | 10/2013 | Banet et al. |
| 8,554,297 B2 | 10/2013 | Moon et al. |
| 8,571,617 B2 | 10/2013 | Reichgott et al. |
| 8,571,618 B1 | 10/2013 | Lamego et al. |
| 8,571,619 B2 | 10/2013 | Al-Ali et al. |
| 8,574,161 B2 | 11/2013 | Banet et al. |
| 8,577,431 B2 | 11/2013 | Lamego et al. |
| 8,579,813 B2 | 11/2013 | Causey, III et al. |
| 8,584,345 B2 | 11/2013 | Al-Ali et al. |
| 8,588,880 B2 | 11/2013 | Abdul-Hafiz et al. |
| 8,588,924 B2 | 11/2013 | Dion |
| 8,591,411 B2 | 11/2013 | Banet et al. |
| 8,594,776 B2 | 11/2013 | McCombie et al. |
| 8,600,777 B2 | 12/2013 | Schoenberg |
| 8,602,997 B2 | 12/2013 | Banet et al. |
| 8,614,630 B2 | 12/2013 | Narasimhan et al. |
| 8,620,678 B2 | 12/2013 | Gotlib |
| 8,622,922 B2 | 1/2014 | Banet et al. |
| 8,630,691 B2 | 1/2014 | Lamego et al. |
| D699,255 S | 2/2014 | Kim |
| 8,641,631 B2 | 2/2014 | Sierra et al. |
| 8,652,060 B2 | 2/2014 | Al-Ali |
| 8,663,106 B2 | 3/2014 | Stivoric et al. |
| 8,666,468 B1 | 3/2014 | Al-Ali |
| 8,670,811 B2 | 3/2014 | O'Reilly |
| 8,672,854 B2 | 3/2014 | McCombie et al. |
| RE44,823 E | 4/2014 | Parker |
| RE44,875 E | 4/2014 | Kiani et al. |
| D701,964 S | 4/2014 | Yoneta et al. |
| 8,688,183 B2 | 4/2014 | Bruinsma et al. |
| 8,690,799 B2 | 4/2014 | Telfort et al. |
| 8,702,627 B2 | 4/2014 | Telfort et al. |
| 8,712,494 B1 | 4/2014 | MacNeish, III et al. |
| 8,715,206 B2 | 5/2014 | Telfort et al. |
| 8,723,677 B1 | 5/2014 | Kiani |
| 8,727,977 B2 | 5/2014 | Banet et al. |
| 8,738,118 B2 | 5/2014 | Moon et al. |
| 8,740,792 B1 | 6/2014 | Kiani et al. |
| 8,740,802 B2 | 6/2014 | Banet et al. |
| 8,740,807 B2 | 6/2014 | Banet et al. |
| 8,747,330 B2 | 6/2014 | Banet et al. |
| 8,755,535 B2 | 6/2014 | Telfort et al. |
| 8,755,872 B1 | 6/2014 | Marinow |
| D709,846 S | 7/2014 | Oswaks |
| 8,764,671 B2 | 7/2014 | Kiani |
| 8,768,423 B2 | 7/2014 | Shakespeare et al. |
| 8,771,204 B2 | 7/2014 | Telfort et al. |
| 8,781,544 B2 | 7/2014 | Al-Ali et al. |
| 8,790,268 B2 | 7/2014 | Al-Ali |
| D711,905 S | 8/2014 | Morrison |
| 8,801,613 B2 | 8/2014 | Al-Ali et al. |
| 8,808,188 B2 | 8/2014 | Banet et al. |
| 8,818,477 B2 | 8/2014 | Soller |
| 8,821,397 B2 | 9/2014 | Al-Ali et al. |
| 8,821,415 B2 | 9/2014 | Al-Ali et al. |
| 8,830,449 B1 | 9/2014 | Lamego et al. |
| 8,840,549 B2 | 9/2014 | Al-Ali et al. |
| 8,852,094 B2 | 10/2014 | Al-Ali et al. |
| 8,852,994 B2 | 10/2014 | Wojtczuk et al. |
| 8,866,620 B2 | 10/2014 | Amir |
| 8,873,035 B2 | 10/2014 | Yang et al. |
| 8,878,888 B2 | 11/2014 | Rosenfeld |
| 8,888,700 B2 | 11/2014 | Banet et al. |
| 8,897,847 B2 | 11/2014 | Al-Ali |
| 8,898,369 B1 | 11/2014 | Yang |
| D719,267 S | 12/2014 | Vaccarella et al. |
| 8,907,287 B2 | 12/2014 | Vanderpohl |
| 8,909,330 B2 | 12/2014 | McCombie et al. |
| 8,911,377 B2 | 12/2014 | Al-Ali |
| 8,956,293 B2 | 2/2015 | McCombie et al. |
| 8,956,294 B2 | 2/2015 | McCombie et al. |
| 8,974,115 B2 | 3/2015 | Segal et al. |
| 8,979,765 B2 | 3/2015 | Banet et al. |
| 8,989,831 B2 | 3/2015 | Al-Ali et al. |
| 8,998,809 B2 | 4/2015 | Kiani |
| 9,035,794 B2 | 5/2015 | Narasimhan et al. |
| 9,055,928 B2 | 6/2015 | McCombie et al. |
| 9,057,689 B2 | 6/2015 | Soller |
| 9,066,666 B2 | 6/2015 | Kiani |
| 9,066,680 B1 | 6/2015 | Al-Ali et al. |
| 9,095,291 B2 | 8/2015 | Soller |
| 9,095,316 B2 | 8/2015 | Welch et al. |
| 9,106,038 B2 | 8/2015 | Telfort et al. |
| 9,107,625 B2 | 8/2015 | Telfort et al. |
| 9,131,881 B2 | 9/2015 | Diab et al. |
| 9,138,180 B1 | 9/2015 | Coverston et al. |
| 9,149,192 B2 | 10/2015 | Banet et al. |
| 9,153,112 B1 | 10/2015 | Kiani et al. |
| 9,161,700 B2 | 10/2015 | Banet et al. |
| D743,817 S | 11/2015 | Singh et al. |
| 9,173,593 B2 | 11/2015 | Banet et al. |
| 9,173,594 B2 | 11/2015 | Banet et al. |
| 9,183,738 B1 | 11/2015 | Allen, Sr. et al. |
| 9,192,329 B2 | 11/2015 | Al-Ali |

(56) References Cited

U.S. PATENT DOCUMENTS

| | | |
|---|---|---|
| 9,192,351 B1 | 11/2015 | Telfort et al. |
| 9,195,385 B2 | 11/2015 | Al-Ali et al. |
| D745,167 S | 12/2015 | Canas et al. |
| D746,161 S | 12/2015 | Vardi |
| 9,204,816 B2 | 12/2015 | Aga et al. |
| 9,211,095 B1 | 12/2015 | Al-Ali |
| 9,214,196 B2 | 12/2015 | Aga et al. |
| 9,215,986 B2 | 12/2015 | Banet et al. |
| 9,218,454 B2 | 12/2015 | Kiani et al. |
| 9,245,668 B1 | 1/2016 | Vo et al. |
| 9,247,004 B2 | 1/2016 | Azimi |
| 9,267,572 B2 | 2/2016 | Barker et al. |
| 9,277,864 B2 | 3/2016 | Yang et al. |
| 9,277,880 B2 | 3/2016 | Poeze et al. |
| 9,307,908 B2 | 4/2016 | Chan et al. |
| 9,307,915 B2 | 4/2016 | McCombie et al. |
| 9,307,928 B1 | 4/2016 | Al-Ali et al. |
| 9,323,894 B2 | 4/2016 | Kiani |
| D755,392 S | 5/2016 | Hwang et al. |
| 9,326,712 B1 | 5/2016 | Kiani |
| 9,339,209 B2 | 5/2016 | Banet et al. |
| 9,339,211 B2 | 5/2016 | Banet et al. |
| D759,828 S | 6/2016 | Riedle |
| 9,364,158 B2 | 6/2016 | Banet et al. |
| 9,378,450 B1 | 6/2016 | Mei et al. |
| 9,380,952 B2 | 7/2016 | Banet et al. |
| 9,392,945 B2 | 7/2016 | Al-Ali et al. |
| 9,408,542 B1 | 8/2016 | Kinast et al. |
| 9,408,573 B2 | 8/2016 | Welch et al. |
| D766,113 S | 9/2016 | Dohi et al. |
| 9,436,645 B2 | 9/2016 | Al-Ali et al. |
| 9,439,574 B2 | 9/2016 | McCombie et al. |
| 9,445,759 B1 | 9/2016 | Lamego et al. |
| 9,471,541 B1 | 10/2016 | Chan et al. |
| 9,474,474 B2 | 10/2016 | Lamego et al. |
| 9,480,435 B2 | 11/2016 | Olsen |
| 9,483,726 B2 | 11/2016 | Mei et al. |
| 9,486,138 B2 | 11/2016 | Simpson et al. |
| 9,492,092 B2 | 11/2016 | McCombie et al. |
| D773,529 S | 12/2016 | Cabrera |
| D775,148 S | 12/2016 | Anzures |
| 9,510,779 B2 | 12/2016 | Poeze et al. |
| 9,517,024 B2 | 12/2016 | Kiani et al. |
| 9,532,722 B2 | 1/2017 | Lamego et al. |
| 9,545,227 B2 | 1/2017 | Selvaraj et al. |
| 9,560,996 B2 | 2/2017 | Kiani |
| 9,563,836 B2 | 2/2017 | Mei et al. |
| 9,566,007 B2 | 2/2017 | McCombie et al. |
| 9,579,039 B2 | 2/2017 | Jansen et al. |
| D781,314 S | 3/2017 | Aström |
| 9,588,135 B1 | 3/2017 | Narasimhan et al. |
| 9,593,985 B2 | 3/2017 | Segal et al. |
| 9,622,692 B2 | 4/2017 | Lamego et al. |
| 9,632,533 B2 | 4/2017 | Li et al. |
| 9,632,981 B2 | 4/2017 | Chan et al. |
| D788,312 S | 5/2017 | Al-Ali et al. |
| 9,636,029 B1 | 5/2017 | Narasimhan et al. |
| 9,649,054 B2 | 5/2017 | Lamego et al. |
| 9,655,546 B2 | 5/2017 | Shen et al. |
| 9,655,559 B2 | 5/2017 | Chan et al. |
| D789,391 S | 6/2017 | Cabrera |
| D789,809 S | 6/2017 | Kang |
| 9,681,205 B1 | 6/2017 | Yang |
| 9,697,928 B2 | 7/2017 | Al-Ali et al. |
| D795,100 S | 8/2017 | Alla |
| D795,252 S | 8/2017 | Chung et al. |
| D795,713 S | 8/2017 | Griffin et al. |
| D795,714 S | 8/2017 | Pugmire et al. |
| 9,717,458 B2 | 8/2017 | Lamego et al. |
| 9,724,016 B1 | 8/2017 | Al-Ali et al. |
| 9,724,024 B2 | 8/2017 | Al-Ali |
| 9,724,025 B1 | 8/2017 | Kiani et al. |
| 9,728,061 B2 | 8/2017 | Shen et al. |
| 9,749,232 B2 | 8/2017 | Sampath et al. |
| D796,350 S | 9/2017 | Bone |
| 9,750,442 B2 | 9/2017 | Olsen |
| 9,750,461 B1 | 9/2017 | Telfort |
| 9,762,673 B2 | 9/2017 | Azimi |
| 9,775,545 B2 | 10/2017 | Al-Ali et al. |
| 9,778,079 B1 | 10/2017 | Al-Ali et al. |
| 9,782,077 B2 | 10/2017 | Lamego et al. |
| 9,787,568 B2 | 10/2017 | Lamego et al. |
| 9,788,778 B2 | 10/2017 | Chan et al. |
| 9,808,188 B1 | 11/2017 | Perea et al. |
| 9,814,405 B2 | 11/2017 | Yang et al. |
| 9,818,281 B2 | 11/2017 | Narasimhan |
| D805,926 S | 12/2017 | Im et al. |
| 9,839,379 B2 | 12/2017 | Al-Ali et al. |
| 9,839,381 B1 | 12/2017 | Weber et al. |
| 9,847,749 B2 | 12/2017 | Kiani et al. |
| 9,848,800 B1 | 12/2017 | Lee et al. |
| 9,855,003 B2 | 1/2018 | Chan et al. |
| 9,861,289 B2 | 1/2018 | Li et al. |
| 9,861,298 B2 | 1/2018 | Eckerbom et al. |
| 9,861,305 B1 | 1/2018 | Weber et al. |
| 9,872,619 B2 | 1/2018 | Lee |
| 9,872,634 B2 | 1/2018 | Chan et al. |
| 9,877,650 B2 | 1/2018 | Muhsin et al. |
| 9,891,079 B2 | 2/2018 | Dalvi |
| 9,924,897 B1 | 3/2018 | Abdul-Hafiz |
| 9,936,382 B2 | 4/2018 | Yang et al. |
| 9,936,917 B2 | 4/2018 | Poeze et al. |
| 9,955,937 B2 | 5/2018 | Telfort |
| 9,965,946 B2 | 5/2018 | Al-Ali et al. |
| 9,980,678 B2 | 5/2018 | Chan et al. |
| D819,660 S | 6/2018 | Cabrera |
| D820,311 S | 6/2018 | Cabrera |
| D820,865 S | 6/2018 | Muhsin et al. |
| D821,593 S | 6/2018 | Perez |
| 9,986,951 B1 | 6/2018 | Ferdosi et al. |
| 9,986,952 B2 | 6/2018 | Dalvi et al. |
| 9,993,203 B2 | 6/2018 | Mei et al. |
| 9,999,376 B2 | 6/2018 | Chan et al. |
| D822,215 S | 7/2018 | Al-Ali et al. |
| D822,216 S | 7/2018 | Barker et al. |
| 10,010,276 B2 | 7/2018 | Al-Ali et al. |
| 10,020,075 B2 | 7/2018 | Perlman et al. |
| 10,039,463 B1 | 8/2018 | Selvaraj et al. |
| 10,080,524 B1 | 9/2018 | Xi |
| 10,086,138 B1 | 10/2018 | Novak, Jr. |
| 10,111,591 B2 | 10/2018 | Dyell et al. |
| D833,305 S | 11/2018 | Jang et al. |
| D833,624 S | 11/2018 | DeJong et al. |
| 10,123,716 B2 | 11/2018 | Narasimhan et al. |
| 10,123,729 B2 | 11/2018 | Dyell et al. |
| 10,140,837 B2 | 11/2018 | Shen et al. |
| D835,282 S | 12/2018 | Barker et al. |
| D835,283 S | 12/2018 | Barker et al. |
| D835,284 S | 12/2018 | Barker et al. |
| D835,285 S | 12/2018 | Barker et al. |
| 10,143,383 B2 | 12/2018 | Tseng et al. |
| 10,149,616 B2 | 12/2018 | Al-Ali et al. |
| 10,154,815 B2 | 12/2018 | Al-Ali et al. |
| 10,159,412 B2 | 12/2018 | Lamego et al. |
| D838,372 S | 1/2019 | Goering et al. |
| 10,182,750 B1 | 1/2019 | Philippine et al. |
| 10,188,348 B2 | 1/2019 | Kiani et al. |
| RE47,218 E | 2/2019 | Ali-Ali |
| RE47,244 E | 2/2019 | Kiani et al. |
| RE47,249 E | 2/2019 | Kiani et al. |
| 10,194,834 B2 | 2/2019 | Selvaraj et al. |
| 10,205,291 B2 | 2/2019 | Scruggs et al. |
| 10,212,165 B1 | 2/2019 | Petersen et al. |
| 10,213,146 B2 | 2/2019 | Aga et al. |
| 10,213,163 B2 | 2/2019 | Ferdosi et al. |
| D842,136 S | 3/2019 | Jang et al. |
| 10,226,187 B2 | 3/2019 | Al-Ali et al. |
| 10,231,657 B2 | 3/2019 | Al-Ali et al. |
| 10,231,670 B2 | 3/2019 | Blank et al. |
| RE47,353 E | 4/2019 | Kiani et al. |
| D844,642 S | 4/2019 | Cabrera |
| D846,746 S | 4/2019 | Lee |
| D847,159 S | 4/2019 | Cabrera |
| 10,262,506 B2 | 4/2019 | Aga et al. |

(56) References Cited

U.S. PATENT DOCUMENTS

| | | |
|---|---|---|
| 10,279,247 B2 | 5/2019 | Kiani |
| 10,292,664 B2 | 5/2019 | Al-Ali |
| 10,299,720 B2 | 5/2019 | Brown et al. |
| 10,317,427 B2 | 6/2019 | Chan et al. |
| 10,321,872 B2 | 6/2019 | Li |
| 10,324,109 B2 | 6/2019 | Chan et al. |
| 10,327,337 B2 | 6/2019 | Triman et al. |
| 10,327,713 B2 | 6/2019 | Barker et al. |
| 10,332,630 B2 | 6/2019 | Al-Ali |
| 10,357,163 B1 | 7/2019 | Selvaraj et al. |
| 10,373,714 B1 | 8/2019 | Selvaraj et al. |
| 10,383,520 B2 | 8/2019 | Wojitczuk et al. |
| 10,383,527 B2 | 8/2019 | Al-Ali |
| 10,383,562 B2 | 8/2019 | Chan et al. |
| 10,388,120 B2 | 8/2019 | Muhsin et al. |
| 10,420,473 B2 | 9/2019 | Shi |
| 10,422,814 B2 | 9/2019 | Chan et al. |
| D861,508 S | 10/2019 | Ejiri et al. |
| D864,120 S | 10/2019 | Forrest et al. |
| 10,433,781 B2 | 10/2019 | Chan et al. |
| 10,441,181 B1 | 10/2019 | Telfort et al. |
| 10,441,196 B2 | 10/2019 | Eckerbom et al. |
| 10,448,844 B2 | 10/2019 | Al-Ali et al. |
| 10,448,849 B2 | 10/2019 | Ferdosi et al. |
| 10,448,871 B2 | 10/2019 | Al-Ali |
| 10,456,038 B2 | 10/2019 | Lamego et al. |
| D867,906 S | 11/2019 | Chang |
| 10,463,340 B2 | 11/2019 | Telfort et al. |
| 10,471,159 B1 | 11/2019 | Lapotko et al. |
| 10,505,311 B2 | 12/2019 | Al-Ali et al. |
| D873,294 S | 1/2020 | Anzures |
| 10,524,738 B2 | 1/2020 | Olsen |
| 10,532,174 B2 | 1/2020 | Al-Ali |
| 10,537,285 B2 | 1/2020 | Sherim et al. |
| 10,542,903 B2 | 1/2020 | Al-Ali et al. |
| 10,554,756 B2 | 2/2020 | Azimi |
| 10,555,678 B2 | 2/2020 | Dalvi et al. |
| 10,568,553 B2 | 2/2020 | O'Neil et al. |
| 10,582,854 B2 | 3/2020 | Liou et al. |
| 10,582,862 B1 | 3/2020 | Selvaraj et al. |
| 10,588,565 B2 | 3/2020 | Larson et al. |
| 10,595,776 B1 | 3/2020 | Selvaraj et al. |
| 10,608,817 B2 | 3/2020 | Haider et al. |
| D880,477 S | 4/2020 | Forrest et al. |
| 10,617,302 B2 | 4/2020 | Al-Ali et al. |
| 10,617,325 B2 | 4/2020 | Chan et al. |
| 10,617,335 B2 | 4/2020 | Al-Ali et al. |
| 10,631,732 B2 | 4/2020 | Larson et al. |
| 10,637,181 B2 | 4/2020 | Al-Ali et al. |
| D883,819 S | 5/2020 | Singh et al. |
| D884,165 S | 5/2020 | deBock |
| D886,303 S | 6/2020 | Huang et al. |
| D886,849 S | 6/2020 | Muhsin et al. |
| D887,548 S | 6/2020 | Abdul-Hafiz et al. |
| D887,549 S | 6/2020 | Abdul-Hafiz et al. |
| D888,731 S | 6/2020 | Momchilov |
| 10,667,764 B2 | 6/2020 | Ahmed et al. |
| D890,708 S | 7/2020 | Forrest et al. |
| 10,721,785 B2 | 7/2020 | Al-Ali |
| 10,736,518 B2 | 8/2020 | Al-Ali et al. |
| 10,739,205 B2 | 8/2020 | Jang et al. |
| 10,750,951 B1 | 8/2020 | Prachar |
| 10,750,984 B2 | 8/2020 | Pauley et al. |
| D896,825 S | 9/2020 | Abel |
| D897,098 S | 9/2020 | Al-Ali |
| 10,772,522 B2 | 9/2020 | Zadig |
| 10,779,098 B2 | 9/2020 | Iswanto et al. |
| D898,924 S | 10/2020 | Hinds et al. |
| D901,538 S | 11/2020 | Cabrera |
| 10,827,958 B2 | 11/2020 | Biederman et al. |
| 10,827,961 B1 | 11/2020 | Iyengar et al. |
| 10,828,007 B1 | 11/2020 | Telfort et al. |
| 10,832,818 B2 | 11/2020 | Muhsin et al. |
| 10,849,554 B2 | 12/2020 | Shreim et al. |
| 10,856,741 B2 | 12/2020 | Damania et al. |
| 10,856,750 B2 | 12/2020 | Indorf et al. |
| D906,970 S | 1/2021 | Forrest et al. |
| D907,219 S | 1/2021 | Neri |
| D908,213 S | 1/2021 | Abdul-Hafiz et al. |
| 10,918,281 B2 | 2/2021 | Al-Ali et al. |
| 10,932,705 B2 | 3/2021 | Muhsin et al. |
| 10,932,729 B2 | 3/2021 | Kiani et al. |
| 10,939,878 B2 | 3/2021 | Kiani et al. |
| 10,956,950 B2 | 3/2021 | Al-Ali et al. |
| D916,135 S | 4/2021 | Indorf et al. |
| D917,046 S | 4/2021 | Abdul-Hafiz et al. |
| D917,550 S | 4/2021 | Indorf et al. |
| D917,564 S | 4/2021 | Indorf et al. |
| D917,704 S | 4/2021 | Al-Ali et al. |
| 10,987,066 B2 | 4/2021 | Chandran et al. |
| 10,991,135 B2 | 4/2021 | Al-Ali et al. |
| D919,094 S | 5/2021 | Al-Ali et al. |
| D919,100 S | 5/2021 | Al-Ali et al. |
| D920,138 S | 5/2021 | Kuwashiro et al. |
| 11,006,867 B2 | 5/2021 | Al-Ali |
| D921,202 S | 6/2021 | Al-Ali et al. |
| 11,024,064 B2 | 6/2021 | Muhsin et al. |
| 11,026,604 B2 | 6/2021 | Chen et al. |
| D925,597 S | 7/2021 | Chandran et al. |
| 11,064,948 B2 | 7/2021 | Peabody |
| D927,533 S | 8/2021 | Clymer |
| D927,699 S | 8/2021 | Al-Ali et al. |
| 11,076,777 B2 | 8/2021 | Lee et al. |
| 11,083,371 B1 | 8/2021 | Szabados et al. |
| 11,114,188 B2 | 9/2021 | Poeze et al. |
| D933,232 S | 10/2021 | Al-Ali et al. |
| D933,233 S | 10/2021 | Al-Ali et al. |
| D933,234 S | 10/2021 | Al-Ali et al. |
| D933,508 S | 10/2021 | Wolff |
| 11,145,408 B2 | 10/2021 | Sampath et al. |
| 11,147,518 B1 | 10/2021 | Al-Ali et al. |
| 11,185,262 B2 | 11/2021 | Al-Ali et al. |
| 11,191,484 B2 | 12/2021 | Kiani et al. |
| 11,234,623 B2 | 2/2022 | Frick |
| 11,253,190 B2 | 2/2022 | Ortiz et al. |
| D946,425 S | 3/2022 | Chang et al. |
| D946,596 S | 3/2022 | Ahmed |
| D946,597 S | 3/2022 | Ahmed |
| D946,598 S | 3/2022 | Ahmed |
| D946,617 S | 3/2022 | Ahmed |
| 11,272,839 B2 | 3/2022 | Al-Ali et al. |
| 11,289,199 B2 | 3/2022 | Al-Ali |
| RE49,034 E | 4/2022 | Al-Ali |
| 11,298,021 B2 | 4/2022 | Muhsin et al. |
| D950,580 S | 5/2022 | Ahmed |
| D950,599 S | 5/2022 | Ahmed |
| D950,738 S | 5/2022 | Al-Ali et al. |
| D956,785 S | 7/2022 | Liu |
| D957,648 S | 7/2022 | Al-Ali |
| 11,382,567 B2 | 7/2022 | O'Brien et al. |
| 11,389,093 B2 | 7/2022 | Triman et al. |
| D960,913 S | 8/2022 | Kiikkala |
| 11,406,286 B2 | 8/2022 | Al-Ali et al. |
| 11,417,426 B2 | 8/2022 | Muhsin et al. |
| 11,439,329 B2 | 9/2022 | Lamego |
| 11,445,948 B2 | 9/2022 | Scruggs et al. |
| D965,789 S | 10/2022 | Al-Ali et al. |
| D966,914 S | 10/2022 | Avellera |
| D967,433 S | 10/2022 | Al-Ali et al. |
| 11,457,810 B2 | 10/2022 | Van Tassel et al. |
| 11,464,410 B2 | 10/2022 | Muhsin |
| 11,504,058 B1 | 11/2022 | Sharma et al. |
| 11,504,066 B1 | 11/2022 | Dalvi et al. |
| D971,933 S | 12/2022 | Ahmed |
| D973,072 S | 12/2022 | Ahmed |
| D973,685 S | 12/2022 | Ahmed |
| D973,686 S | 12/2022 | Ahmed |
| 11,517,229 B2 | 12/2022 | Huang et al. |
| 11,534,086 B2 | 12/2022 | Garai et al. |
| D974,193 S | 1/2023 | Forrest et al. |
| D978,884 S | 2/2023 | Cabrera |
| D979,516 S | 2/2023 | Al-Ali et al. |
| D980,091 S | 3/2023 | Forrest et al. |
| 11,596,363 B2 | 3/2023 | Lamego |

(56) References Cited

U.S. PATENT DOCUMENTS

| | | |
|---|---|---|
| 11,627,919 B2 | 4/2023 | Kiani et al. |
| 11,637,437 B2 | 4/2023 | Al-Ali et al. |
| D985,498 S | 5/2023 | Al-Ali et al. |
| 11,653,862 B2 | 5/2023 | Dalvi et al. |
| D989,112 S | 6/2023 | Muhsin et al. |
| D989,327 S | 6/2023 | Al-Ali et al. |
| 11,678,829 B2 | 6/2023 | Al-Ali et al. |
| 11,679,579 B2 | 6/2023 | Al-Ali |
| 11,684,296 B2 | 6/2023 | Vo et al. |
| 11,692,934 B2 | 7/2023 | Normand et al. |
| 11,701,043 B2 | 7/2023 | Al-Ali et al. |
| D997,365 S | 8/2023 | Hwang |
| 11,721,105 B2 | 8/2023 | Ranasinghe et al. |
| 11,730,379 B2 | 8/2023 | Ahmed et al. |
| D998,625 S | 9/2023 | Indorf et al. |
| D998,630 S | 9/2023 | Indorf et al. |
| D998,631 S | 9/2023 | Indorf et al. |
| D999,244 S | 9/2023 | Indorf et al. |
| D999,245 S | 9/2023 | Indorf et al. |
| D999,246 S | 9/2023 | Indorf et al. |
| 11,766,198 B2 | 9/2023 | Pauley et al. |
| D1,000,975 S | 10/2023 | Al-Ali et al. |
| 11,803,198 B2 | 10/2023 | Weiler |
| 11,803,623 B2 | 10/2023 | Kiani et al. |
| 11,832,940 B2 | 12/2023 | Diab et al. |
| D1,010,816 S | 1/2024 | Cook |
| D1,011,730 S | 1/2024 | Jagroop |
| D1,013,179 S | 1/2024 | Al-Ali et al. |
| 11,872,156 B2 | 1/2024 | Telfort et al. |
| 11,872,369 B1 | 1/2024 | Schiff |
| 11,879,960 B2 | 1/2024 | Ranasinghe et al. |
| 11,883,129 B2 | 1/2024 | Olsen |
| D1,019,674 S | 3/2024 | Yang |
| D1,022,729 S | 4/2024 | Forrest et al. |
| 11,951,186 B2 | 4/2024 | Krishnamani et al. |
| 11,974,833 B2 | 5/2024 | Forrest et al. |
| 11,986,067 B2 | 5/2024 | Al-Ali et al. |
| 11,986,289 B2 | 5/2024 | Dalvi et al. |
| 11,986,305 B2 | 5/2024 | Al-Ali et al. |
| D1,031,729 S | 6/2024 | Forrest et al. |
| 12,004,869 B2 | 6/2024 | Kiani et al. |
| 12,014,328 B2 | 6/2024 | Wachman et al. |
| D1,034,546 S | 7/2024 | Lange |
| D1,034,655 S | 7/2024 | Chen |
| D1,036,293 S | 7/2024 | Al-Ali et al. |
| D1,037,462 S | 7/2024 | Al-Ali et al. |
| 12,029,844 B2 | 7/2024 | Pauley et al. |
| 12,048,534 B2 | 7/2024 | Vo et al. |
| 12,064,217 B2 | 8/2024 | Ahmed et al. |
| 12,066,426 B1 | 8/2024 | Lapotko et al. |
| D1,040,852 S | 9/2024 | Bache |
| D1,041,511 S | 9/2024 | Indorf et al. |
| D1,042,596 S | 9/2024 | DeJong et al. |
| D1,042,852 S | 9/2024 | Hwang |
| 12,076,159 B2 | 9/2024 | Belur Nagaraj et al. |
| 12,082,926 B2 | 9/2024 | Sharma et al. |
| D1,044,828 S | 10/2024 | Chandran et al. |
| D1,048,571 S | 10/2024 | Yu et al. |
| D1,048,908 S | 10/2024 | Al-Ali et al. |
| 12,106,752 B2 | 10/2024 | Campbell et al. |
| 12,114,974 B2 | 10/2024 | Al-Ali et al. |
| 12,126,683 B2 | 10/2024 | Koo et al. |
| 12,127,838 B2 | 10/2024 | Olsen et al. |
| 12,128,213 B2 | 10/2024 | Kiani et al. |
| 12,131,661 B2 | 10/2024 | Pauley et al. |
| D1,050,910 S | 11/2024 | Al-Ali et al. |
| 12,178,572 B1 | 12/2024 | Pauley et al. |
| 12,178,581 B2 | 12/2024 | Telfort et al. |
| 12,178,852 B2 | 12/2024 | Kiani et al. |
| D1,057,159 S | 1/2025 | DeJong et al. |
| D1,057,160 S | 1/2025 | DeJong et al. |
| 12,198,790 B1 | 1/2025 | Al-Ali |
| 12,200,421 B2 | 1/2025 | Campbell et al. |
| 12,207,901 B1 | 1/2025 | Lapotko et al. |
| D1,060,680 S | 2/2025 | Al-Ali et al. |
| D1,061,585 S | 2/2025 | Indorf |
| D1,063,893 S | 2/2025 | DeJong et al. |
| 12,220,207 B2 | 2/2025 | Telfort et al. |
| 12,235,941 B2 | 2/2025 | Kiani et al. |
| 12,236,767 B2 | 2/2025 | Muhsin |
| D1,066,244 S | 3/2025 | Lim et al. |
| D1,066,672 S | 3/2025 | Al-Ali et al. |
| D1,068,656 S | 4/2025 | Trevisan et al. |
| D1,071,195 S | 4/2025 | Seung |
| D1,072,836 S | 4/2025 | Indorf |
| D1,072,837 S | 4/2025 | Ahmed et al. |
| 12,272,445 B1 | 4/2025 | Kiani |
| D1,078,689 S | 6/2025 | Hwang |
| D1,079,020 S | 6/2025 | Hwang |
| 12,336,796 B2 | 6/2025 | Al-Ali |
| 2001/0011355 A1 | 8/2001 | Kawai |
| 2001/0034477 A1 | 10/2001 | Mansfield et al. |
| 2001/0039483 A1 | 11/2001 | Brand et al. |
| 2001/0046366 A1 | 11/2001 | Susskind |
| 2002/0010401 A1 | 1/2002 | Bushmakin et al. |
| 2002/0045836 A1 | 4/2002 | Alkawwas |
| 2002/0052311 A1 | 5/2002 | Solomon et al. |
| 2002/0058864 A1 | 5/2002 | Mansfield et al. |
| 2002/0063690 A1 | 5/2002 | Chung et al. |
| 2002/0133080 A1 | 9/2002 | Apruzzese et al. |
| 2002/0177758 A1 | 11/2002 | Schoenberg |
| 2003/0013975 A1 | 1/2003 | Kiani |
| 2003/0018243 A1 | 1/2003 | Gerhardt et al. |
| 2003/0027326 A1 | 2/2003 | Ulmsten et al. |
| 2003/0052787 A1 | 3/2003 | Zerhusen et al. |
| 2003/0058838 A1 | 3/2003 | Wengrovitz |
| 2003/0144582 A1 | 7/2003 | Cohen et al. |
| 2003/0156288 A1 | 8/2003 | Barnum et al. |
| 2003/0158466 A1 | 8/2003 | Lynn et al. |
| 2003/0212312 A1 | 11/2003 | Coffin, IV et al. |
| 2003/0216670 A1 | 11/2003 | Beggs |
| 2004/0013647 A1 | 1/2004 | Solomon et al. |
| 2004/0015103 A1 | 1/2004 | Aminian et al. |
| 2004/0064072 A1 | 4/2004 | Shapira |
| 2004/0090742 A1 | 5/2004 | Son et al. |
| 2004/0106163 A1 | 6/2004 | Workman, Jr. et al. |
| 2004/0122787 A1 | 6/2004 | Avinash et al. |
| 2004/0126007 A1 | 7/2004 | Ziel et al. |
| 2004/0147818 A1 | 7/2004 | Levy et al. |
| 2004/0179332 A1 | 9/2004 | Smith et al. |
| 2004/0186357 A1 | 9/2004 | Soderberg et al. |
| 2004/0230179 A1 | 11/2004 | Shehada et al. |
| 2004/0243017 A1 | 12/2004 | Causevic |
| 2004/0254431 A1 | 12/2004 | Shehada et al. |
| 2004/0254432 A1 | 12/2004 | Shehada et al. |
| 2005/0005710 A1 | 1/2005 | Sage, Jr. |
| 2005/0009926 A1 | 1/2005 | Kreye et al. |
| 2005/0020918 A1 | 1/2005 | Wilk et al. |
| 2005/0038332 A1 | 2/2005 | Saidara et al. |
| 2005/0038680 A1 | 2/2005 | McMahon |
| 2005/0055276 A1 | 3/2005 | Kiani et al. |
| 2005/0080336 A1 | 4/2005 | Byrd et al. |
| 2005/0096542 A1 | 5/2005 | Weng et al. |
| 2005/0113653 A1 | 5/2005 | Fox et al. |
| 2005/0124864 A1 | 6/2005 | Mack et al. |
| 2005/0125256 A1 | 6/2005 | Schoenberg |
| 2005/0148882 A1 | 7/2005 | Banet et al. |
| 2005/0164933 A1 | 7/2005 | Tymianski et al. |
| 2005/0191294 A1 | 9/2005 | Arap et al. |
| 2005/0208648 A1 | 9/2005 | Sage, Jr. et al. |
| 2005/0209518 A1 | 9/2005 | Sage, Jr. et al. |
| 2005/0228244 A1 | 10/2005 | Banet |
| 2005/0228299 A1 | 10/2005 | Banet |
| 2005/0234317 A1 | 10/2005 | Kiani |
| 2005/0242946 A1 | 11/2005 | Hubbard, Jr. et al. |
| 2005/0245831 A1 | 11/2005 | Banet |
| 2005/0245839 A1 | 11/2005 | Stivoric et al. |
| 2005/0261594 A1 | 11/2005 | Banet |
| 2005/0261598 A1 | 11/2005 | Banet et al. |
| 2005/0268401 A1 | 12/2005 | Dixon et al. |
| 2005/0277872 A1 | 12/2005 | Colby, Jr. et al. |
| 2006/0009697 A1 | 1/2006 | Banet et al. |
| 2006/0009698 A1 | 1/2006 | Banet et al. |
| 2006/0049936 A1 | 3/2006 | Collins, Jr. et al. |

(56) References Cited

U.S. PATENT DOCUMENTS

| | | |
|---|---|---|
| 2006/0056487 A1 | 3/2006 | Kuroda et al. |
| 2006/0058647 A1 | 3/2006 | Strommer et al. |
| 2006/0064037 A1 | 3/2006 | Shalon et al. |
| 2006/0073719 A1 | 4/2006 | Kiani |
| 2006/0084878 A1 | 4/2006 | Banet et al. |
| 2006/0089543 A1 | 4/2006 | Kim et al. |
| 2006/0094936 A1 | 5/2006 | Russ |
| 2006/0149393 A1 | 7/2006 | Calderon |
| 2006/0155175 A1 | 7/2006 | Ogino et al. |
| 2006/0189871 A1 | 8/2006 | Al-Ali et al. |
| 2006/0200009 A1 | 9/2006 | Wekell et al. |
| 2006/0217684 A1 | 9/2006 | Shehada et al. |
| 2006/0217685 A1 | 9/2006 | Shehada et al. |
| 2006/0224413 A1 | 10/2006 | Kim et al. |
| 2006/0235300 A1 | 10/2006 | Weng et al. |
| 2006/0253042 A1 | 11/2006 | Stahmann et al. |
| 2006/0279426 A1 | 12/2006 | Bonnet et al. |
| 2006/0282021 A1 | 12/2006 | DeVaul et al. |
| 2006/0286861 A1 | 12/2006 | Avevor et al. |
| 2007/0000490 A1 | 1/2007 | DeVries et al. |
| 2007/0021675 A1 | 1/2007 | Childre et al. |
| 2007/0027368 A1 | 2/2007 | Collins et al. |
| 2007/0032733 A1 | 2/2007 | Burton et al. |
| 2007/0032748 A1 | 2/2007 | McNeil et al. |
| 2007/0055116 A1 | 3/2007 | Clark et al. |
| 2007/0055544 A1 | 3/2007 | Jung et al. |
| 2007/0060798 A1 | 3/2007 | Krupnik et al. |
| 2007/0073116 A1 | 3/2007 | Kiani et al. |
| 2007/0088406 A1 | 4/2007 | Bennett et al. |
| 2007/0096897 A1 | 5/2007 | Weiner |
| 2007/0100222 A1 | 5/2007 | Mastrototaro et al. |
| 2007/0118399 A1 | 5/2007 | Avinash et al. |
| 2007/0132597 A1 | 6/2007 | Rodgers |
| 2007/0140475 A1 | 6/2007 | Kurtock et al. |
| 2007/0142715 A1 | 6/2007 | Banet et al. |
| 2007/0156033 A1 | 7/2007 | Causey et al. |
| 2007/0157285 A1 | 7/2007 | Frank et al. |
| 2007/0159332 A1 | 7/2007 | Koblasz |
| 2007/0163589 A1 | 7/2007 | DeVries et al. |
| 2007/0180140 A1 | 8/2007 | Welch et al. |
| 2007/0185390 A1 | 8/2007 | Perkins et al. |
| 2007/0185393 A1 | 8/2007 | Zhou et al. |
| 2007/0232941 A1 | 10/2007 | Rabinovich |
| 2007/0244377 A1 | 10/2007 | Cozad et al. |
| 2007/0244724 A1 | 10/2007 | Pendergast et al. |
| 2007/0250286 A1 | 10/2007 | Duncan et al. |
| 2007/0254593 A1 | 11/2007 | Jollota et al. |
| 2007/0255114 A1 | 11/2007 | Ackermann et al. |
| 2007/0255116 A1 | 11/2007 | Mehta et al. |
| 2007/0255250 A1 | 11/2007 | Moberg et al. |
| 2007/0276261 A1 | 11/2007 | Banet et al. |
| 2007/0276262 A1 | 11/2007 | Banet et al. |
| 2007/0276632 A1 | 11/2007 | Banet et al. |
| 2007/0288263 A1 | 12/2007 | Rodgers |
| 2008/0000479 A1 | 1/2008 | Elaz et al. |
| 2008/0003200 A1 | 1/2008 | Arap et al. |
| 2008/0021731 A1 | 1/2008 | Rodgers |
| 2008/0021854 A1 | 1/2008 | Jung et al. |
| 2008/0033661 A1 | 2/2008 | Syroid et al. |
| 2008/0051670 A1 | 2/2008 | Banet et al. |
| 2008/0053438 A1 | 3/2008 | DeVries et al. |
| 2008/0058614 A1 | 3/2008 | Banet et al. |
| 2008/0058657 A1 | 3/2008 | Schwartz et al. |
| 2008/0064965 A1 | 3/2008 | Jay et al. |
| 2008/0077026 A1 | 3/2008 | Banet et al. |
| 2008/0082004 A1 | 4/2008 | Banet et al. |
| 2008/0082145 A1 | 4/2008 | Skwarek |
| 2008/0088467 A1 | 4/2008 | Al-Ali |
| 2008/0090626 A1 | 4/2008 | Griffin et al. |
| 2008/0091089 A1 | 4/2008 | Guillory et al. |
| 2008/0091090 A1 | 4/2008 | Guillory et al. |
| 2008/0091471 A1 | 4/2008 | Michon et al. |
| 2008/0094228 A1 | 4/2008 | Welch et al. |
| 2008/0097167 A1 | 4/2008 | Yudkovitch et al. |
| 2008/0099366 A1 | 5/2008 | Niemiec et al. |
| 2008/0103375 A1 | 5/2008 | Kiani |
| 2008/0114220 A1 | 5/2008 | Banet et al. |
| 2008/0119412 A1 | 5/2008 | Tymianski et al. |
| 2008/0129518 A1 | 6/2008 | Carlton-Foss |
| 2008/0138278 A1 | 6/2008 | Scherz et al. |
| 2008/0169922 A1 | 7/2008 | Issokson |
| 2008/0171919 A1 | 7/2008 | Stivoric et al. |
| 2008/0188795 A1 | 8/2008 | Katz et al. |
| 2008/0194918 A1 | 8/2008 | Kulik et al. |
| 2008/0208912 A1 | 8/2008 | Garibaldi |
| 2008/0214949 A1 | 9/2008 | Stivoric et al. |
| 2008/0221396 A1 | 9/2008 | Garces et al. |
| 2008/0221399 A1 | 9/2008 | Zhou et al. |
| 2008/0221418 A1 | 9/2008 | Al-Ali et al. |
| 2008/0221461 A1 | 9/2008 | Zhou et al. |
| 2008/0228077 A1 | 9/2008 | Wilk et al. |
| 2008/0275309 A1 | 11/2008 | Stivoric et al. |
| 2008/0281167 A1 | 11/2008 | Soderberg et al. |
| 2008/0281168 A1 | 11/2008 | Gibson et al. |
| 2008/0281181 A1 | 11/2008 | Manzione et al. |
| 2008/0281234 A1 | 11/2008 | Goris |
| 2008/0287751 A1 | 11/2008 | Stivoric et al. |
| 2008/0292172 A1 | 11/2008 | Assmann et al. |
| 2008/0300020 A1 | 12/2008 | Nishizawa et al. |
| 2008/0312542 A1 | 12/2008 | Banet et al. |
| 2008/0319275 A1 | 12/2008 | Chiu et al. |
| 2008/0319282 A1 | 12/2008 | Tran |
| 2008/0319327 A1 | 12/2008 | Banet et al. |
| 2008/0319354 A1 | 12/2008 | Bell et al. |
| 2009/0005651 A1 | 1/2009 | Ward et al. |
| 2009/0018409 A1 | 1/2009 | Banet et al. |
| 2009/0018422 A1 | 1/2009 | Banet et al. |
| 2009/0018453 A1 | 1/2009 | Banet et al. |
| 2009/0018808 A1 | 1/2009 | Bronstein et al. |
| 2009/0024008 A1 | 1/2009 | Brunner et al. |
| 2009/0036759 A1 | 2/2009 | Ault et al. |
| 2009/0044334 A1 | 2/2009 | Parsell et al. |
| 2009/0052623 A1 | 2/2009 | Tome et al. |
| 2009/0054735 A1 | 2/2009 | Higgins et al. |
| 2009/0054743 A1 | 2/2009 | Wekell et al. |
| 2009/0062682 A1 | 3/2009 | Bland et al. |
| 2009/0069642 A1 | 3/2009 | Gao et al. |
| 2009/0069868 A1 | 3/2009 | Bengtsson et al. |
| 2009/0076342 A1 | 3/2009 | Amurthur |
| 2009/0093687 A1 | 4/2009 | Telfort et al. |
| 2009/0095926 A1 | 4/2009 | MacNeish, III |
| 2009/0099480 A1 | 4/2009 | Salgo et al. |
| 2009/0112072 A1 | 4/2009 | Banet et al. |
| 2009/0118628 A1 | 5/2009 | Zhou et al. |
| 2009/0119843 A1 | 5/2009 | Rodgers et al. |
| 2009/0124867 A1 | 5/2009 | Hirsch et al. |
| 2009/0131759 A1 | 5/2009 | Sims et al. |
| 2009/0143832 A1 | 6/2009 | Saba |
| 2009/0157058 A1 | 6/2009 | Ferren et al. |
| 2009/0171170 A1 | 7/2009 | Li et al. |
| 2009/0171225 A1 | 7/2009 | Gadodia et al. |
| 2009/0177090 A1 | 7/2009 | Grunwald et al. |
| 2009/0182287 A1 | 7/2009 | Kassab |
| 2009/0221937 A1 | 9/2009 | Smith |
| 2009/0226372 A1 | 9/2009 | Ruoslahti et al. |
| 2009/0247984 A1 | 10/2009 | Lamego et al. |
| 2009/0254003 A1 | 10/2009 | Buckman |
| 2009/0264778 A1 | 10/2009 | Markowitz et al. |
| 2009/0275844 A1 | 11/2009 | Al-Ali |
| 2009/0281462 A1 | 11/2009 | Heliot et al. |
| 2009/0309755 A1 | 12/2009 | Williamson et al. |
| 2009/0322540 A1 | 12/2009 | Richardson et al. |
| 2010/0004518 A1 | 1/2010 | Vo et al. |
| 2010/0010385 A1 | 1/2010 | Skelton et al. |
| 2010/0030040 A1 | 2/2010 | Poeze et al. |
| 2010/0030094 A1 | 2/2010 | Lundback |
| 2010/0036209 A1 | 2/2010 | Ferren et al. |
| 2010/0063365 A1 | 3/2010 | Pisani et al. |
| 2010/0099964 A1 | 4/2010 | O'Reilly et al. |
| 2010/0113894 A1 | 5/2010 | Padiy |
| 2010/0121217 A1 | 5/2010 | Padiy et al. |
| 2010/0121226 A1 | 5/2010 | Ten Kate et al. |
| 2010/0125217 A1 | 5/2010 | Kuo et al. |
| 2010/0130875 A1 | 5/2010 | Banet et al. |

(56) References Cited

U.S. PATENT DOCUMENTS

| | | |
|---|---|---|
| 2010/0144627 A1 | 6/2010 | Vitek et al. |
| 2010/0160794 A1 | 6/2010 | Banet et al. |
| 2010/0160795 A1 | 6/2010 | Banet et al. |
| 2010/0160796 A1 | 6/2010 | Banet et al. |
| 2010/0160797 A1 | 6/2010 | Banet et al. |
| 2010/0160798 A1 | 6/2010 | Banet et al. |
| 2010/0168536 A1 | 7/2010 | Banet et al. |
| 2010/0168589 A1 | 7/2010 | Banet et al. |
| 2010/0185101 A1 | 7/2010 | Sakai et al. |
| 2010/0198622 A1 | 8/2010 | Gajic et al. |
| 2010/0210958 A1 | 8/2010 | Manwaring et al. |
| 2010/0234718 A1 | 9/2010 | Sampath et al. |
| 2010/0261982 A1 | 10/2010 | Noury et al. |
| 2010/0270257 A1 | 10/2010 | Wachman et al. |
| 2010/0298650 A1 | 11/2010 | Moon et al. |
| 2010/0298651 A1 | 11/2010 | Moon et al. |
| 2010/0298652 A1 | 11/2010 | McCombie et al. |
| 2010/0298653 A1 | 11/2010 | McCombie et al. |
| 2010/0298654 A1 | 11/2010 | McCombie et al. |
| 2010/0298655 A1 | 11/2010 | McCombie et al. |
| 2010/0298656 A1 | 11/2010 | McCombie et al. |
| 2010/0298657 A1 | 11/2010 | McCombie et al. |
| 2010/0298658 A1 | 11/2010 | McCombie et al. |
| 2010/0298659 A1 | 11/2010 | McCombie et al. |
| 2010/0298660 A1 | 11/2010 | McCombie et al. |
| 2010/0298661 A1 | 11/2010 | McCombie et al. |
| 2010/0298742 A1 | 11/2010 | Perlman et al. |
| 2010/0305412 A1 | 12/2010 | Darrah et al. |
| 2010/0312103 A1 | 12/2010 | Gorek et al. |
| 2010/0317951 A1 | 12/2010 | Rutkowski et al. |
| 2010/0324384 A1 | 12/2010 | Moon et al. |
| 2010/0324385 A1 | 12/2010 | Moon et al. |
| 2010/0324386 A1 | 12/2010 | Moon et al. |
| 2010/0324387 A1 | 12/2010 | Moon et al. |
| 2010/0324388 A1 | 12/2010 | Moon et al. |
| 2010/0324389 A1 | 12/2010 | Moon et al. |
| 2011/0021930 A1 | 1/2011 | Mazzeo et al. |
| 2011/0023130 A1 | 1/2011 | Gudgel et al. |
| 2011/0028806 A1 | 2/2011 | Merritt et al. |
| 2011/0028809 A1 | 2/2011 | Goodman |
| 2011/0040197 A1 | 2/2011 | Welch et al. |
| 2011/0046495 A1 | 2/2011 | Osypka |
| 2011/0046498 A1 | 2/2011 | Klap et al. |
| 2011/0066051 A1 | 3/2011 | Moon et al. |
| 2011/0077473 A1 | 3/2011 | Lisogurski |
| 2011/0077488 A1 | 3/2011 | Buxton et al. |
| 2011/0078596 A1 | 3/2011 | Rawlins et al. |
| 2011/0080294 A1 | 4/2011 | Tanishima et al. |
| 2011/0082711 A1 | 4/2011 | Poeze et al. |
| 2011/0087081 A1 | 4/2011 | Kiani et al. |
| 2011/0087084 A1 | 4/2011 | Jeong et al. |
| 2011/0087117 A1 | 4/2011 | Tremper et al. |
| 2011/0087756 A1 | 4/2011 | Biondi |
| 2011/0098583 A1 | 4/2011 | Pandia et al. |
| 2011/0105956 A1 | 5/2011 | Hirth |
| 2011/0110560 A1 | 5/2011 | Adhikari |
| 2011/0118561 A1 | 5/2011 | Tari et al. |
| 2011/0118573 A1 | 5/2011 | Mckenna |
| 2011/0137297 A1 | 6/2011 | Kiani et al. |
| 2011/0152629 A1 | 6/2011 | Eaton et al. |
| 2011/0172498 A1 | 7/2011 | Olsen et al. |
| 2011/0172967 A1 | 7/2011 | Al-Ali et al. |
| 2011/0184252 A1 | 7/2011 | Archer et al. |
| 2011/0184253 A1 | 7/2011 | Archer et al. |
| 2011/0201972 A1 | 8/2011 | Ten Kate |
| 2011/0208073 A1 | 8/2011 | Matsukawa et al. |
| 2011/0212090 A1 | 9/2011 | Pedersen et al. |
| 2011/0213225 A1 | 9/2011 | Bernstein et al. |
| 2011/0214501 A1 | 9/2011 | Ross et al. |
| 2011/0224498 A1 | 9/2011 | Banet et al. |
| 2011/0224499 A1 | 9/2011 | Banet et al. |
| 2011/0224500 A1 | 9/2011 | Banet et al. |
| 2011/0224506 A1 | 9/2011 | Moon et al. |
| 2011/0224507 A1 | 9/2011 | Banet et al. |
| 2011/0224508 A1 | 9/2011 | Moon et al. |
| 2011/0224556 A1 | 9/2011 | Moon et al. |
| 2011/0224557 A1 | 9/2011 | Banet et al. |
| 2011/0224564 A1 | 9/2011 | Moon et al. |
| 2011/0227739 A1 | 9/2011 | Gilham et al. |
| 2011/0230791 A1 | 9/2011 | Ten Kate et al. |
| 2011/0257489 A1 | 10/2011 | Banet et al. |
| 2011/0257544 A1 | 10/2011 | Kaasinen et al. |
| 2011/0257551 A1 | 10/2011 | Banet et al. |
| 2011/0257552 A1 | 10/2011 | Banet et al. |
| 2011/0257553 A1 | 10/2011 | Banet et al. |
| 2011/0257554 A1 | 10/2011 | Banet et al. |
| 2011/0257555 A1 | 10/2011 | Banet et al. |
| 2011/0263950 A1 | 10/2011 | Larson et al. |
| 2011/0264035 A1 | 10/2011 | Yodfat et al. |
| 2011/0288421 A1 | 11/2011 | Banet et al. |
| 2011/0295094 A1 | 12/2011 | Doyle et al. |
| 2012/0001751 A1 | 1/2012 | Baker et al. |
| 2012/0004579 A1 | 1/2012 | Luo et al. |
| 2012/0029300 A1 | 2/2012 | Paquet |
| 2012/0029304 A1 | 2/2012 | Medina et al. |
| 2012/0029879 A1 | 2/2012 | Sing et al. |
| 2012/0059230 A1 | 3/2012 | Teller et al. |
| 2012/0059283 A1 | 3/2012 | Gravem et al. |
| 2012/0071771 A1 | 3/2012 | Behar |
| 2012/0075464 A1 | 3/2012 | Derenne et al. |
| 2012/0088999 A1 | 4/2012 | Bishay et al. |
| 2012/0095352 A1 | 4/2012 | Tran |
| 2012/0095778 A1 | 4/2012 | Gross et al. |
| 2012/0101353 A1 | 4/2012 | Reggiardo et al. |
| 2012/0101411 A1 | 4/2012 | Hausdorff et al. |
| 2012/0101770 A1 | 4/2012 | Grabiner et al. |
| 2012/0108983 A1 | 5/2012 | Banet et al. |
| 2012/0117209 A1 | 5/2012 | Sinha |
| 2012/0123231 A1 | 5/2012 | O'Reilly |
| 2012/0123799 A1 | 5/2012 | Nolen et al. |
| 2012/0136221 A1 | 5/2012 | Killen et al. |
| 2012/0165629 A1 | 6/2012 | Merritt et al. |
| 2012/0179011 A1 | 7/2012 | Moon et al. |
| 2012/0184120 A1 | 7/2012 | Basta et al. |
| 2012/0190949 A1 | 7/2012 | McCombie et al. |
| 2012/0197619 A1 | 8/2012 | Namer Yelin et al. |
| 2012/0203078 A1 | 8/2012 | Sze et al. |
| 2012/0209084 A1 | 8/2012 | Olsen et al. |
| 2012/0226117 A1 | 9/2012 | Lamego et al. |
| 2012/0226160 A1 | 9/2012 | Kudoh |
| 2012/0239434 A1 | 9/2012 | Breslow et al. |
| 2012/0242501 A1 | 9/2012 | Tran et al. |
| 2012/0282583 A1 | 11/2012 | Thaler et al. |
| 2012/0283524 A1 | 11/2012 | Kiani et al. |
| 2012/0284053 A1 | 11/2012 | Rosenfeld |
| 2012/0293323 A1 | 11/2012 | Kaib et al. |
| 2012/0294801 A1 | 11/2012 | Scherz et al. |
| 2012/0314901 A1 | 12/2012 | Hanson |
| 2012/0315867 A1 | 12/2012 | Davis et al. |
| 2013/0006131 A1 | 1/2013 | Narayan et al. |
| 2013/0006151 A1 | 1/2013 | Main et al. |
| 2013/0023775 A1 | 1/2013 | Lamego et al. |
| 2013/0035603 A1 | 2/2013 | Jarausch et al. |
| 2013/0046197 A1 | 2/2013 | Dlugos, Jr. et al. |
| 2013/0054180 A1 | 2/2013 | Barfield |
| 2013/0060147 A1 | 3/2013 | Welch et al. |
| 2013/0096405 A1 | 4/2013 | Garfio |
| 2013/0099936 A1 | 4/2013 | Azimi |
| 2013/0099937 A1 | 4/2013 | Azimi |
| 2013/0109929 A1 | 5/2013 | Menzel |
| 2013/0109937 A1 | 5/2013 | Banet et al. |
| 2013/0116515 A1 | 5/2013 | Banet et al. |
| 2013/0120147 A1 | 5/2013 | Narasimhan et al. |
| 2013/0120152 A1 | 5/2013 | Narasimhan et al. |
| 2013/0122849 A1 | 5/2013 | Doezema |
| 2013/0130622 A1 | 5/2013 | Yang et al. |
| 2013/0138395 A1 | 5/2013 | Baggen et al. |
| 2013/0155889 A1 | 6/2013 | Brownworth et al. |
| 2013/0214850 A1 | 8/2013 | Aga et al. |
| 2013/0245487 A1 | 9/2013 | Aga et al. |
| 2013/0261494 A1 | 10/2013 | Bloom et al. |
| 2013/0281875 A1 | 10/2013 | Narasimhan et al. |
| 2013/0296672 A1 | 11/2013 | O'Neil et al. |
| 2013/0317333 A1 | 11/2013 | Yun et al. |

(56) References Cited

U.S. PATENT DOCUMENTS

| | | |
|---|---|---|
| 2013/0317393 A1 | 11/2013 | Weiss et al. |
| 2013/0340176 A1 | 12/2013 | Stevens et al. |
| 2013/0342691 A1 | 12/2013 | Lewis et al. |
| 2013/0345921 A1 | 12/2013 | Al-Ali et al. |
| 2014/0005502 A1 | 1/2014 | Klap et al. |
| 2014/0015687 A1 | 1/2014 | Narasimhan et al. |
| 2014/0019080 A1 | 1/2014 | Chan et al. |
| 2014/0022081 A1 | 1/2014 | Ribble et al. |
| 2014/0025010 A1 | 1/2014 | Stroup et al. |
| 2014/0046674 A1 | 2/2014 | Rosenfeld |
| 2014/0051946 A1 | 2/2014 | Arne |
| 2014/0066795 A1 | 3/2014 | Ferdosi et al. |
| 2014/0073982 A1 | 3/2014 | Yang et al. |
| 2014/0081099 A1 | 3/2014 | Banet et al. |
| 2014/0088385 A1 | 3/2014 | Moon et al. |
| 2014/0121543 A1 | 5/2014 | Chan et al. |
| 2014/0128778 A1 | 5/2014 | Chan et al. |
| 2014/0129178 A1 | 5/2014 | Meduna et al. |
| 2014/0142445 A1 | 5/2014 | Banet et al. |
| 2014/0152673 A1 | 6/2014 | Lynn et al. |
| 2014/0163393 A1 | 6/2014 | McCombie et al. |
| 2014/0166076 A1 | 6/2014 | Kiani et al. |
| 2014/0180160 A1 | 6/2014 | Brown et al. |
| 2014/0187973 A1 | 7/2014 | Brown et al. |
| 2014/0200415 A1 | 7/2014 | McCombie et al. |
| 2014/0200474 A1 | 7/2014 | Selvaraj et al. |
| 2014/0206976 A1 | 7/2014 | Thompson |
| 2014/0228692 A1 | 8/2014 | Chan et al. |
| 2014/0235964 A1 | 8/2014 | Banet et al. |
| 2014/0249431 A1 | 9/2014 | Banet et al. |
| 2014/0249432 A1 | 9/2014 | Banet et al. |
| 2014/0249433 A1 | 9/2014 | Banet et al. |
| 2014/0249434 A1 | 9/2014 | Banet et al. |
| 2014/0249435 A1 | 9/2014 | Banet et al. |
| 2014/0249440 A1 | 9/2014 | Banet et al. |
| 2014/0249441 A1 | 9/2014 | Banet et al. |
| 2014/0249442 A1 | 9/2014 | Banet et al. |
| 2014/0257056 A1 | 9/2014 | Moon et al. |
| 2014/0257057 A1 | 9/2014 | Reis Cunha et al. |
| 2014/0257850 A1 | 9/2014 | Walker et al. |
| 2014/0266690 A1 | 9/2014 | McKinley |
| 2014/0266787 A1 | 9/2014 | Tran |
| 2014/0275817 A1 | 9/2014 | Script |
| 2014/0275845 A1 | 9/2014 | Eagon et al. |
| 2014/0275871 A1 | 9/2014 | Lamego et al. |
| 2014/0275872 A1 | 9/2014 | Merritt et al. |
| 2014/0275888 A1 | 9/2014 | Wegerich et al. |
| 2014/0275932 A1 | 9/2014 | Zadig |
| 2014/0276127 A1 | 9/2014 | Ferdosi et al. |
| 2014/0276145 A1 | 9/2014 | Banet et al. |
| 2014/0276175 A1 | 9/2014 | Banet et al. |
| 2014/0276238 A1 | 9/2014 | Osorio |
| 2014/0278201 A1* | 9/2014 | Shimizu ............... G01K 7/427 702/131 |
| 2014/0288947 A1 | 9/2014 | Simpson et al. |
| 2014/0301893 A1 | 10/2014 | Stroup et al. |
| 2014/0316217 A1 | 10/2014 | Purdon et al. |
| 2014/0316218 A1 | 10/2014 | Purdon et al. |
| 2014/0323897 A1 | 10/2014 | Brown et al. |
| 2014/0323898 A1 | 10/2014 | Purdon et al. |
| 2014/0343889 A1 | 11/2014 | Ben Shalom et al. |
| 2014/0375428 A1 | 12/2014 | Park |
| 2015/0005600 A1 | 1/2015 | Blank et al. |
| 2015/0011907 A1 | 1/2015 | Purdon et al. |
| 2015/0020571 A1 | 1/2015 | Chan et al. |
| 2015/0045628 A1 | 2/2015 | Moghadam et al. |
| 2015/0055681 A1 | 2/2015 | Tsuchida |
| 2015/0057562 A1 | 2/2015 | Linders et al. |
| 2015/0073241 A1 | 3/2015 | Lamego |
| 2015/0080754 A1 | 3/2015 | Purdon et al. |
| 2015/0087923 A1 | 3/2015 | Bardy et al. |
| 2015/0094559 A1 | 4/2015 | Russell |
| 2015/0094618 A1 | 4/2015 | Russell et al. |
| 2015/0099950 A1 | 4/2015 | Al-Ali et al. |
| 2015/0109442 A1 | 4/2015 | Derenne et al. |
| 2015/0112264 A1 | 4/2015 | Kamen et al. |
| 2015/0126822 A1 | 5/2015 | Chavan et al. |
| 2015/0126882 A1 | 5/2015 | Chavan et al. |
| 2015/0130613 A1 | 5/2015 | Fullam |
| 2015/0161876 A1 | 6/2015 | Castillo |
| 2015/0164410 A1 | 6/2015 | Selvaraj et al. |
| 2015/0164411 A1 | 6/2015 | Selvaraj et al. |
| 2015/0164417 A1 | 6/2015 | Tupin, Jr. |
| 2015/0164437 A1 | 6/2015 | McCombie et al. |
| 2015/0173654 A1 | 6/2015 | Bélanger et al. |
| 2015/0190086 A1 | 7/2015 | Chan et al. |
| 2015/0219542 A1 | 8/2015 | Kent |
| 2015/0221202 A1 | 8/2015 | Russell et al. |
| 2015/0248833 A1 | 9/2015 | Arne |
| 2015/0254956 A1 | 9/2015 | Shen et al. |
| 2015/0272481 A1 | 10/2015 | Glaser et al. |
| 2015/0282717 A1 | 10/2015 | McCombie et al. |
| 2015/0320339 A1 | 11/2015 | Larson et al. |
| 2016/0004952 A1 | 1/2016 | Mei |
| 2016/0022224 A1 | 1/2016 | Banet et al. |
| 2016/0038061 A1 | 2/2016 | Kechichian et al. |
| 2016/0045163 A1 | 2/2016 | Weisner et al. |
| 2016/0095549 A1 | 4/2016 | Chang |
| 2016/0100776 A1 | 4/2016 | Najafi |
| 2016/0119210 A1 | 4/2016 | Koehler |
| 2016/0143546 A1 | 5/2016 | McCombie et al. |
| 2016/0183794 A1 | 6/2016 | Gannon et al. |
| 2016/0183875 A1 | 6/2016 | Yang et al. |
| 2016/0206277 A1 | 7/2016 | Bidichandani et al. |
| 2016/0228050 A1 | 8/2016 | Sugla et al. |
| 2016/0242654 A1 | 8/2016 | Quinlan |
| 2016/0242681 A1 | 8/2016 | Shen et al. |
| 2016/0256080 A1 | 9/2016 | Shen et al. |
| 2016/0275776 A1 | 9/2016 | Shen et al |
| 2016/0278652 A1 | 9/2016 | Kaib et al. |
| 2016/0278691 A1 | 9/2016 | Larson et al. |
| 2016/0278692 A1 | 9/2016 | Larson et al. |
| 2016/0296159 A1 | 10/2016 | Larson et al. |
| 2016/0296160 A1 | 10/2016 | Larson et al. |
| 2016/0302698 A1 | 10/2016 | Perlman |
| 2016/0302715 A1 | 10/2016 | Larson et al. |
| 2016/0328991 A1 | 11/2016 | Simpson |
| 2016/0338640 A1 | 11/2016 | Chan et al. |
| 2016/0338641 A1 | 11/2016 | Chan et al. |
| 2016/0367170 A1 | 12/2016 | Larson et al. |
| 2017/0000410 A1 | 1/2017 | Chan et al. |
| 2017/0020429 A1 | 1/2017 | Chan et al. |
| 2017/0024748 A1 | 1/2017 | Haider |
| 2017/0027498 A1 | 2/2017 | Larson et al. |
| 2017/0049365 A1 | 2/2017 | Perlman et al. |
| 2017/0053083 A1 | 2/2017 | Perlman |
| 2017/0055887 A1 | 3/2017 | Al-Ali |
| 2017/0150893 A1 | 6/2017 | McCombie et al. |
| 2017/0156618 A1 | 6/2017 | Narasimhan et al. |
| 2017/0173632 A1 | 6/2017 | Al-Ali |
| 2017/0184630 A1 | 6/2017 | Chan et al. |
| 2017/0202473 A1 | 7/2017 | Narasimhan et al. |
| 2017/0238812 A1 | 8/2017 | Atlas |
| 2017/0251974 A1 | 9/2017 | Shreim et al. |
| 2017/0311116 A1 | 10/2017 | Aga et al. |
| 2017/0311862 A1 | 11/2017 | Aga et al. |
| 2017/0311904 A1 | 11/2017 | Davis |
| 2017/0366615 A1 | 12/2017 | Azimi |
| 2018/0028072 A1 | 2/2018 | Shi |
| 2018/0035889 A1 | 2/2018 | Liou et al. |
| 2018/0035909 A1 | 2/2018 | Hadley et al. |
| 2018/0042559 A1 | 2/2018 | Cabrera |
| 2018/0064348 A1 | 3/2018 | Tsuchimoto |
| 2018/0064361 A1 | 3/2018 | Yang et al. |
| 2018/0064595 A1 | 3/2018 | Srinivasan |
| 2018/0078174 A1 | 3/2018 | Chan et al. |
| 2018/0078189 A1 | 3/2018 | Chan et al. |
| 2018/0078190 A1 | 3/2018 | Chan et al. |
| 2018/0078219 A1 | 3/2018 | Selvaraj |
| 2018/0146862 A1 | 5/2018 | Moon et al. |
| 2018/0160909 A1* | 6/2018 | Damania ............... G01K 1/024 |
| 2018/0189235 A1 | 7/2018 | Chan et al. |
| 2018/0192965 A1 | 7/2018 | Rose |
| 2018/0220966 A1 | 8/2018 | Cohen |

(56) References Cited

U.S. PATENT DOCUMENTS

| | | |
|---|---|---|
| 2018/0242926 A1 | 8/2018 | Muhsin et al. |
| 2018/0246639 A1 | 8/2018 | Han |
| 2018/0247712 A1 | 8/2018 | Muhsin et al. |
| 2018/0249961 A1 | 9/2018 | Ferdosi et al. |
| 2018/0289289 A1 | 10/2018 | Chan et al. |
| 2018/0303365 A1 | 10/2018 | Selvaraj et al. |
| 2018/0303434 A1 | 10/2018 | Selvaraj et al. |
| 2018/0310879 A1 | 11/2018 | Chan et al. |
| 2018/0338708 A1 | 11/2018 | Chan et al. |
| 2019/0038455 A1 | 2/2019 | Heitz et al. |
| 2019/0042614 A1 | 2/2019 | Wickenhauser |
| 2019/0059777 A1 | 2/2019 | Aga et al. |
| 2019/0060543 A1 | 2/2019 | Khanal |
| 2019/0082968 A1 | 3/2019 | Karnik et al. |
| 2019/0090781 A1 | 3/2019 | Selvaraj et al. |
| 2019/0150788 A1 | 5/2019 | Selvaraj et al. |
| 2019/0183425 A1 | 6/2019 | Ferdosi et al. |
| 2019/0221803 A1 | 7/2019 | Moore et al. |
| 2019/0223722 A1 | 7/2019 | Xi |
| 2019/0238546 A1 | 8/2019 | Petersen et al. |
| 2019/0239787 A1 | 8/2019 | Pauley et al. |
| 2019/0272916 A1 | 9/2019 | Selvaraj et al. |
| 2019/0320906 A1 | 10/2019 | Olsen |
| 2019/0336010 A1 | 11/2019 | Selvaraj et al. |
| 2019/0350665 A1 | 11/2019 | Furutani et al. |
| 2019/0388013 A1 | 12/2019 | Achmann et al. |
| 2019/0388030 A1 | 12/2019 | Colliou et al. |
| 2020/0011746 A1 | 1/2020 | Allen et al. |
| 2020/0027568 A1 | 1/2020 | Foshee, Jr. |
| 2020/0046231 A1 | 2/2020 | Ferdosi et al. |
| 2020/0054218 A1 | 2/2020 | Xi |
| 2020/0054246 A1 | 2/2020 | Banet et al. |
| 2020/0060869 A1 | 2/2020 | Telfort et al. |
| 2020/0069252 A1 | 3/2020 | Upadhya et al. |
| 2020/0077951 A1 | 3/2020 | Nallathambi et al. |
| 2020/0085310 A1 | 3/2020 | Zahner et al. |
| 2020/0111552 A1 | 4/2020 | Ahmed |
| 2020/0113520 A1 | 4/2020 | Abdul-Hafiz et al. |
| 2020/0138314 A1 | 5/2020 | Doctor et al. |
| 2020/0138368 A1 | 5/2020 | Kiani et al. |
| 2020/0138399 A1 | 5/2020 | Li et al. |
| 2020/0163597 A1 | 5/2020 | Dalvi et al. |
| 2020/0253474 A1 | 8/2020 | Muhsin et al. |
| 2020/0253544 A1 | 8/2020 | Belur Nagaraj et al. |
| 2020/0268260 A1 | 8/2020 | Tran |
| 2020/0275841 A1 | 9/2020 | Telfort et al. |
| 2020/0288983 A1 | 9/2020 | Telfort et al. |
| 2020/0329983 A1 | 10/2020 | Al-Ali et al. |
| 2020/0329993 A1 | 10/2020 | Al-Ali et al. |
| 2020/0390336 A1 | 12/2020 | Mensch et al. |
| 2021/0022628 A1 | 1/2021 | Telfort et al. |
| 2021/0104173 A1 | 4/2021 | Pauley et al. |
| 2021/0113121 A1 | 4/2021 | Diab et al. |
| 2021/0117525 A1 | 4/2021 | Kiani et al. |
| 2021/0118581 A1 | 4/2021 | Kiani et al. |
| 2021/0121582 A1 | 4/2021 | Krishnamani et al. |
| 2021/0161465 A1 | 6/2021 | Barker et al. |
| 2021/0177305 A1 | 6/2021 | Shen et al. |
| 2021/0186337 A1 | 6/2021 | Matsunaga et al. |
| 2021/0236729 A1 | 8/2021 | Kiani et al. |
| 2021/0256835 A1 | 8/2021 | Ranasinghe et al. |
| 2021/0275095 A1 | 9/2021 | Sarussi et al. |
| 2021/0275101 A1 | 9/2021 | Vo et al. |
| 2021/0290060 A1 | 9/2021 | Ahmed |
| 2021/0290072 A1 | 9/2021 | Forrest |
| 2021/0290080 A1 | 9/2021 | Ahmed |
| 2021/0290120 A1 | 9/2021 | Al-Ali |
| 2021/0290177 A1 | 9/2021 | Novak, Jr. |
| 2021/0290184 A1 | 9/2021 | Ahmed |
| 2021/0296008 A1 | 9/2021 | Novak, Jr. |
| 2021/0321917 A1 | 10/2021 | Choi et al. |
| 2021/0330228 A1 | 10/2021 | Olsen et al. |
| 2021/0386368 A1 | 12/2021 | Carlsson et al. |
| 2021/0386382 A1 | 12/2021 | Olsen et al. |
| 2021/0402110 A1 | 12/2021 | Pauley et al. |
| 2022/0026946 A1 | 1/2022 | Wen |
| 2022/0031171 A1 | 2/2022 | van der Linden et al. |
| 2022/0039707 A1 | 2/2022 | Sharma et al. |
| 2022/0053892 A1 | 2/2022 | Al-Ali et al. |
| 2022/0071562 A1 | 3/2022 | Kiani |
| 2022/0095930 A1 | 3/2022 | Li et al. |
| 2022/0096603 A1 | 3/2022 | Kiani et al. |
| 2022/0133184 A1 | 5/2022 | Garai |
| 2022/0151521 A1 | 5/2022 | Krishnamani et al. |
| 2022/0157146 A1 | 5/2022 | Putterman |
| 2022/0218244 A1 | 7/2022 | Kiani et al. |
| 2022/0273924 A1 | 9/2022 | Kamen |
| 2022/0287574 A1 | 9/2022 | Telfort et al. |
| 2022/0296161 A1 | 9/2022 | Al-Ali et al. |
| 2022/0361819 A1 | 11/2022 | Al-Ali et al. |
| 2022/0370012 A1 | 11/2022 | Golenberg et al. |
| 2022/0379059 A1 | 12/2022 | Yu et al. |
| 2022/0392610 A1 | 12/2022 | Kiani et al. |
| 2022/0395402 A1 | 12/2022 | Trabish |
| 2023/0028745 A1 | 1/2023 | Al-Ali |
| 2023/0038389 A1 | 2/2023 | Vo |
| 2023/0045647 A1 | 2/2023 | Vo |
| 2023/0058052 A1 | 2/2023 | Al-Ali |
| 2023/0058342 A1 | 2/2023 | Kiani |
| 2023/0069789 A1 | 3/2023 | Koo et al. |
| 2023/0087671 A1 | 3/2023 | Telfort et al. |
| 2023/0110152 A1 | 4/2023 | Forrest et al. |
| 2023/0111198 A1 | 4/2023 | Yu et al. |
| 2023/0115397 A1 | 4/2023 | Vo et al. |
| 2023/0116371 A1 | 4/2023 | Mills et al. |
| 2023/0135297 A1 | 5/2023 | Kiani et al. |
| 2023/0138098 A1 | 5/2023 | Telfort et al. |
| 2023/0145155 A1 | 5/2023 | Krishnamani et al. |
| 2023/0147750 A1 | 5/2023 | Barker et al. |
| 2023/0148928 A1 | 5/2023 | O'Dane |
| 2023/0210417 A1 | 7/2023 | Al-Ali et al. |
| 2023/0222805 A1 | 7/2023 | Muhsin et al. |
| 2023/0222887 A1 | 7/2023 | Muhsin et al. |
| 2023/0226331 A1 | 7/2023 | Kiani et al. |
| 2023/0284916 A1 | 9/2023 | Telfort |
| 2023/0284943 A1 | 9/2023 | Scruggs et al. |
| 2023/0293047 A1 | 9/2023 | Chun |
| 2023/0301562 A1 | 9/2023 | Scruggs et al. |
| 2023/0346993 A1 | 11/2023 | Kiani et al. |
| 2023/0368221 A1 | 11/2023 | Haider |
| 2023/0371893 A1 | 11/2023 | Al-Ali et al. |
| 2023/0389837 A1 | 12/2023 | Krishnamani et al. |
| 2024/0016418 A1 | 1/2024 | Devadoss et al. |
| 2024/0016419 A1 | 1/2024 | Devadoss et al. |
| 2024/0047061 A1 | 2/2024 | Al-Ali et al. |
| 2024/0049310 A1 | 2/2024 | Al-Ali et al. |
| 2024/0049986 A1 | 2/2024 | Al-Ali et al. |
| 2024/0081656 A1 | 3/2024 | DeJong et al. |
| 2024/0122486 A1 | 4/2024 | Kiani |
| 2024/0180456 A1 | 6/2024 | Al-Ali |
| 2024/0188872 A1 | 6/2024 | Al-Ali et al. |
| 2024/0245855 A1 | 7/2024 | Vo et al. |
| 2024/0252046 A1 | 8/2024 | Jansen et al. |
| 2024/0260894 A1 | 8/2024 | Olsen |
| 2024/0267698 A1 | 8/2024 | Telfort et al. |
| 2024/0277233 A1 | 8/2024 | Al-Ali |
| 2024/0277280 A1 | 8/2024 | Al-Ali |
| 2024/0298920 A1 | 9/2024 | Fernkvist et al. |
| 2024/0306985 A1 | 9/2024 | Vo et al. |
| 2024/0324953 A1 | 10/2024 | Telfort |
| 2024/0380246 A1 | 11/2024 | Moran |
| 2024/0380247 A1 | 11/2024 | Moran |
| 2024/0404549 A1 | 12/2024 | Campbell et al. |
| 2025/0000458 A1 | 1/2025 | Abdul-Hafiz et al. |
| 2025/0037836 A1 | 1/2025 | Kiani |
| 2025/0100482 A1 | 3/2025 | Al-Ali et al. |
| 2025/0118415 A1 | 4/2025 | Olsen |

FOREIGN PATENT DOCUMENTS

| | | |
|---|---|---|
| CN | 104127181 | 11/2014 |
| CN | 203914879 | 11/2014 |
| CN | 104586398 | 5/2015 |
| CN | 103308069 | 6/2015 |

(56) References Cited

FOREIGN PATENT DOCUMENTS

| | | |
|---|---|---|
| CN | 104688196 | 6/2015 |
| CN | 204394477 | 6/2015 |
| CN | 104739420 | 7/2015 |
| CN | 204468059 | 7/2015 |
| CN | 106934444 | 7/2017 |
| EP | 0 735 499 | 10/1996 |
| GB | 6115451 | 1/2021 |
| JP | 10-336064 | 12/1998 |
| JP | 2002-513602 | 5/2002 |
| JP | 2002-542493 | 12/2002 |
| JP | 2003-521985 | 7/2003 |
| JP | 2003-322569 | 11/2003 |
| JP | 2005-218036 | 8/2005 |
| JP | 2005-237479 | 9/2005 |
| JP | 2005-295375 | 10/2005 |
| JP | 2007-095365 | 4/2007 |
| JP | 2007-174051 | 7/2007 |
| JP | 2007-296266 | 11/2007 |
| JP | 2008-027030 | 2/2008 |
| JP | 2008-519635 | 6/2008 |
| JP | 2009-017959 | 1/2009 |
| JP | 2009-529930 | 8/2009 |
| JP | 2010-000286 | 1/2010 |
| JP | 2010-524510 | 7/2010 |
| JP | 2011-510363 | 3/2011 |
| JP | 2012-502671 | 2/2012 |
| JP | 2012-237670 | 12/2012 |
| JP | 2013-034511 | 2/2013 |
| JP | 2013-044625 | 3/2013 |
| JP | 2013-526900 | 6/2013 |
| JP | 2013-544616 | 12/2013 |
| JP | D1531996 | 7/2015 |
| JP | 2017-184844 | 10/2017 |
| JP | D1700151 | 1/2021 |
| JP | 2002-065640 | 3/2022 |
| JP | D1751168 | 10/2022 |
| KR | 301000495.0000 | 10/2018 |
| KR | 301222494.0000 | 10/2022 |
| WO | WO 98/029790 | 7/1998 |
| WO | WO 99/013766 | 3/1999 |
| WO | WO 00/063713 | 10/2000 |
| WO | WO 2004/056266 | 7/2004 |
| WO | WO 2004/059551 | 7/2004 |
| WO | WO 2009/036313 | 3/2009 |
| WO | WO 2010/125016 | 11/2010 |
| WO | WO 2010/135518 | 11/2010 |
| WO | WO 2011/002904 | 1/2011 |
| WO | WO 2013/056160 | 4/2013 |
| WO | WO 2013/119982 | 8/2013 |
| WO | WO 2013/120014 | 8/2013 |
| WO | WO 2014/047205 | 3/2014 |
| WO | WO 2014/083888 | 6/2014 |
| WO | WO 2014/197822 | 12/2014 |
| WO | WO 2015/054665 | 4/2015 |
| WO | WO 2015/074007 | 5/2015 |
| WO | WO 2015/123157 | 8/2015 |
| WO | WO 2015/172246 | 11/2015 |
| WO | WO 2016/058032 | 4/2016 |
| WO | WO 2016/185905 | 11/2016 |
| WO | WO 2017/040700 | 3/2017 |
| WO | WO 2018/071715 | 4/2018 |
| WO | WO 2018/152566 | 8/2018 |
| WO | WO 2019/065029 | 4/2019 |
| WO | WO 2019/111764 | 6/2019 |
| WO | WO 2019/161277 | 8/2019 |
| WO | WO 2021/189002 | 9/2021 |
| WO | WO 2023/049712 | 3/2023 |
| WO | WO 2024/036327 | 2/2024 |

OTHER PUBLICATIONS

US 9,241,629 B2, 01/2016, Yang et al. (withdrawn)
US 2024/0016391 A1, 01/2024, Lapotko et al. (withdrawn)
Aminian et al., "Spatio-Temporal Parameters of Gait Measured by an Ambulatory System Using Miniature Gyroscopes", Journal of Biomechanics, 2002, vol. 35, pp. 689-699.
Anliker et al., "AMON: A Wearable Multiparameter Medical Monitoring and Alert System", IEEE Transactions on Information Technology in Biomedicine, vol. 8, No. 4, Dec. 2004, pp. 415-427.
Asada et al., "Mobile Monitoring with Wearable Photoplethysmographic Biosensors", IEEE Engineering in Medicine and Biology Magazine, May/Jun. 2003, pp. 28-40.
Ayello et al., "How and Why to Do Pressure Ulcer Risk Assessment", Advances in Skin & Wound Care, May/Jun. 2002, vol. 15, No. 3, pp. 125-133.
Bergstrom et al., "A Prospective Study of Pressure Sore Risk Among Institutionalized Elderly", Journal of the American Geriatrics Society, Aug. 1992, vol. 40, No. 8, pp. 747-758.
Bourke et al., "Evaluation of a Threshold-Based Tri-Axial Accelerometer Fall Detection Algorithm", Gait & Posture, vol. 26, 2007, pp. 194-199.
Campo et al., "Wireless Fall Sensor with GPS Location for Monitoring the Elderly", 30th Annual International IEEE EMBS Conference Vancouver, British Columbia, Canada, Aug. 20-24, 2008, pp. 498-501.
Caporusso et al., "A Pervasive Solution for Risk Awareness in the Context of Fall Prevention", Pervasive Health, 2009, pp. 8.
Capuano et al., "Remote Telemetry—New Twists for Old Technology", Nursing Management, Jul. 1995, vol. 26, No. 7, pp. 26-32.
Chen et al., "In-Bed Fibre Optic Breathing and Movement Sensor for Non-Intrusive Monitoring", Proceedings of SPIE vol. 7173, 2009, pp. 6.
Chen et al., "Wearable Sensors for Reliable Fall Detection", Proceedings of the 2005 IEEE Engineering in Medicine and Biology 27th Annual Conference, Shanghai, China, Sep. 1-4, 2005, pp. 3551-3554.
Degen et al., "Speedy: A Fall Detector in a Wrist Watch", Proceedings of the Seventh IEEE International Symposium on Wearable Computers (ISWC'03), 2003, pp. 184-187.
Dhillon et al., "Towards the Prevention of Pressure Ulcers with a Wearable Patient Posture Monitor Based on Adaptive Accelerometer Alignment", 34th Annual International Conference of the IEEE EMBS, San Diego, CA, Aug. 28-Sep. 1, 2012, pp. 4513-4516.
Di Rienzo et al., "MagIC System: a New Textile-Based Wearable Device for Biological Signal Monitoring. Applicability in Daily Life and Clinical Setting", Proceedings of the 2005 IEEE Engineering in Medicine and Biology 27th Annual Conference Shanghai, China, Sep. 1-4, 2005, pp. 7167-7169.
Dinh et al, "A Fall and Near-Fall Assessment and Evaluation System", The Open Biomedical Engineering Journal, 2009, vol. 3, pp. 1-7.
Elmer-Dewitt, Philip, "Apple's iWatch: The killer apps may be in hospitals, not health clubs", Fortune.com, Feb. 3, 2014, http://fortune.com/2014/02/03/apples-iwatch-the-killer-apps-may-be-in-hospitals-not-health-clubs/, 4 pages.
Giansanti et al., "Assessment of Fall-Risk by Means of a Neural Network Based on Parameters Assessed by a Wearable Device During Posturography", Medical Engineering & Physics, vol. 30, 2008, pp. 367-372.
Giansanti, Daniele, "Investigation of Fall-Risk Using a Wearable Device with Accelerometers and Rate Gyroscopes", Institute of Physics Publishing, Physiological Measurement, vol. 27, 2006, pp. 1081-1090.
Grundy et al., "Telemedicine in Critical Care: An Experiment in Health Care Delivery", JACEP, Oct. 1977, vol. 6, No. 10, pp. 439-444.
Grundy et al., "Telemedicine in Critical Care: Problems in Design, Implementation and Assessment", Jul. 1982, vol. 10, No. 7, pp. 471-475.
Gunningberg et al., "Accuracy in the Recording of Pressure Ulcers and Prevention after Implementing an Electronic Health Record in Hospital Care", Quality Safe Health Care, 2008, vol. 17, pp. 281-285.
Gunningberg et al., "Improved Quality and Comprehensiveness in Nursing Documentation of Pressure Ulcers after Implementing an Electronic Health Record in Hospital Care", Journal of Clinical Nursing, 2009, vol. 18, pp. 1557-1564.

(56) References Cited

OTHER PUBLICATIONS

Harada et al., "Portable Orientation Estimation Device Based on Accelerometers, Magnetometers and Gyroscope Sensors for Sensor Network", IEEE Conference on Multisensor Fusion and Integration for Intelligent Systems 2003, 2003, pp. 191-196.
Hwang et al., "Development of Novel Algorithm and Real-time Monitoring Ambulatory System Using Bluetooth Module for Fall Detection in the Elderly", Proceedings of the 26th Annual International Conference of the IEEE EMBS, Sep. 1-5, 2004, pp. 2204-2207.
Kang et al., "A Wrist-Worn Integrated Health Monitoring Instrument with a Tele-Reporting Device for Telemedicine and Telecare", IEEE Transaction on Instrumentation and Measurement, vol. 55, No. 5, Oct. 2006, pp. 1655-1661.
Kärki et al., "Pressure Mapping System for Physiological Measurements", XVIII IMEKO World Congress, Metrology for a Sustainable Development, Sep. 17-22, 2006, Rio de Janeiro, Brazil, pp. 5.
Li et al., "Accurate, Fast Fall Detection Using Gyroscopes and Accelerometer-Derived Posture Information", Conference Paper, Sixth International Workshop on Wearable and Implantable Body Sensor Networks, BSN 2009, Berkeley, CA, USA, Jun. 3-5, 2009, pp. 6.
Lindemann et al., "Evaluation of a Fall Detector Based on Accelerometers: A Pilot Study", Medical & Biological Engineering & Computing, vol. 43, 2005, pp. 548-551.
Linder-Ganz et al., "Real-Time Continuous Monitoring of Sub-Dermal Tissue Stresses Under the Ischial Tuberosities in Individuals with Spinal Cord Injury", Proceedings of the ASME 2008 Summer Bioengineering Conference (SBC2008), Jun. 25-29, 2008, Marriott Resort, Marco Island, Florida, pp. 2.
Luo et al., "A Dynamic Motion Pattern Analysis Approach to Fall Detection", 2004 IEEE International Workshop on Biomedical Circuits & Systems, Dec. 1-3, 2004, pp. S2.1-5-S2.1-8.
"Masimo Announces FDA Clearance of Centroid™", Business Wire, Jun. 25, 2020, pp. 3.
Mathie et al., "A System for Monitoring Posture and Physical Activity Using Accelerometers", Engineering in Medicine and Biology Society, 2001. Proceedings of the 23rd Annual International Conference of the IEEE, Oct. 25-28, 2001, pp. 3654-3657.
McInerney, Joan A., "Reducing Hospital-Acquired Pressure Ulcer Prevalence Through a Focused Prevention Program", Advances in Skin & Wound Care, vol. 21, No. 2, Feb. 2008, pp. 75-78.
Merbitz et al., "Wheelchair Push-ups: Measuring Pressure Relief Frequency", Archives of Physical Medicine and Rehabilitation, vol. 66, No. 7, Jul. 1985, pp. 433-438.
Narayanan et al., "Falls Management: Detection and Prevention, Using a Waist-Mounted Triaxial Accelerometer", Proceedings of the 29th Annual International Conference of the IEEE EMBS Cité Internationale, Lyon, France, Aug. 23-26, 2007, pp. 4037-4040.
Noury, Norbert, "A Smart Sensor for the Remote Follow up of Activity and Fall Detection of the Elderly", 2nd Annual International IEEE-EMBS Special Topic Conference on Microtechnologies in Medicine & Biology, May 2-4, 2002, pp. 314-317.
Nyan et al., "A Wearable System for Pre-Impact Fall Detection", Journal of Biomechanics, vol. 41, 2008, pp. 3475-3481.
Nyan et al., "Garment-Based Detection of Falls and Activities of Daily Living Using 3-Axis MEMS Accelerometer", Institute of Physics Publishing, International MEMS Conference 2006, Journal of Physics: Conference Series 34, 2006, pp. 1059-1067.
O'Donovan et al., "A Context Aware Wireless Body Area Network", Pervasive Health, 2009, pp. 8.
Pannurat et al., "Automatic Fall Monitoring: A Review", Sensors, 2014, vol. 14, pp. 12900-12936.
Pérolle et al., "Automatic Fall Detection and Activity Monitoring for Elderly", Jan. 2007, pp. 5.
Po et al., "Overview of MEMSWear II—Incorporating MEMS Technology Into Smart Shirt for Geriatric Care", Institute of Physics Publishing, International MEMS Conference 2006, Journal of Physics: Conference Series 34, 2006, pp. 1079-1085.
Prado et al., "Distributed Intelligent Architecture for Falling Detection and Physical Activity Analysis in the Elderly", Proceedings of the Second Joint EMBS/BMES Conference, Oct. 23-26, 2002, pp. 1910-1911.
Rithalia et al., "Quantification of Pressure Relief Using Interface Pressure and Tissue Perfusion in Alternating Pressure Air Mattresses", Archives of Physical Medicine and Rehabilitation, vol. 81, Oct. 2000, pp. 1364-1369.
Rysavy, Peter, "Making the Call with Two-Way Paging", Network Computing, Published Jan. 15, 1997, www.rysavy.com/Articles/twoway.htm, pp. 5.
Sakai et al., "Continuous Monitoring of Interface Pressure Distribution in Intensive Care Patients for Pressure Ulcer Prevention", Journal of Advanced Nursing, vol. 65, No. 4, 2009, pp. 809-817.
Spillman Jr., et al., "A 'Smart' Bed for Non-Intrusive Monitoring of Patient Physiological Factors", Measurement Science and Technology, Aug. 2004, vol. 15, No. 8, pp. 1614-1620.
Lötters et al., "Procedure for in-use Calibration of Triaxial Accelerometers in Medical Applications", Sensors and Actuators A: Physical, Jun. 15, 1998, vol. 68, No. 1-3, pp. 221-228.
Virtual Expo Group, Home Page. (HJ30049031) in 1 page.
Wachter et al., "The Employment of an Iterative Design Process to Develop a Pulmonary Graphical Display", Journal of the American Medical Informatics Association, vol. 10, No. 4, Jul./Aug. 2003, pp. 363-372.
Webster, John G., "A Pressure Mat for Preventing Pressure Sores", IEEE Engineering in Medicine & Biology Society 11th Annual International Conference, 1989, pp. 2.
Williams et al., "A Remote Electronic Monitoring System for the Prevention of Pressure Sores", Proceedings of the 19th International Conference, IEEE/EMBS Oct. 30-Nov. 2, 1997, Chicago, IL, pp. 1076-1079.
Wu et al., "Portable Preimpact Fall Detector with Inertial Sensors", IEEE Transactions on Neural Systems and Rehabilitation Engineering, vol. 16, No. 2, Apr. 2008, pp. 178-183.
International Search Report & Written Opinion in PCT Application No. PCT/US2013/025384, dated Aug. 6, 2013.
International Preliminary Report on Patentability & Written Opinion in PCT Application No. PCT/US2013/025384, dated Aug. 12, 2014.
International Search Report & Written Opinion in PCT Application No. PCT/US2016/049751, dated Mar. 13, 2017.
International Preliminary Report on Patentability & Written Opinion in PCT Application No. PCT/US2016/049751, dated Mar. 6, 2018.
International Search Report & Written Opinion in PCT Application No. PCT/US2017/056405, dated Jan. 26, 2018.
International Preliminary Report on Patentability & Written Opinion in PCT Application No. PCT/US2017/056405, dated Apr. 25, 2019.
International Search Report & Written Opinion in PCT Application No. PCT/US2021/023331, dated Jun. 22, 2021.
International Search Report & Written Opinion in PCT Application No. PCT/US2022/076733, dated Dec. 16, 2022.
"Diabetic Danica Explains Dexcom Share", YouTube.com, https://www.youtube.com/watch?v=5YZkK34ELeg, May 24, 2017, 1 page.
Larsen, Katrina, "The 4 Best CGM Devices for Measuring Blood Sugar in 2024", https://www.nutrisense.io/blog/best-continuous-glucose-monitors?utm_source=google&utm_medium=cpc&utm_campaign=ggl_search_us_dsa_purchas, Jan. 5, 2024, pp. 10.
Masimo, "Radius T°™ Wearable Thermometer", Oct. 9, 2020, https://www.masimo.com/en-us/product/all-brands/137728.html, retrieved Jul. 17, 2024, pp. 2.
Milberger, Carol, "The Best Continuous Glucose Monitors", https://www.wired.com/gallery/the-best-continuous-glucose-monitors/, Nov. 27, 2023, pp. 9.

* cited by examiner

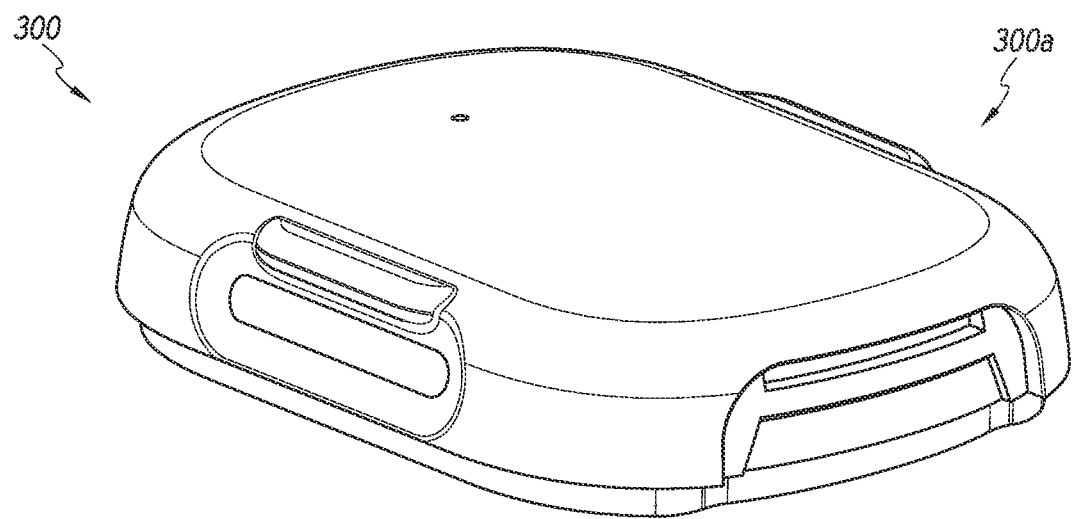
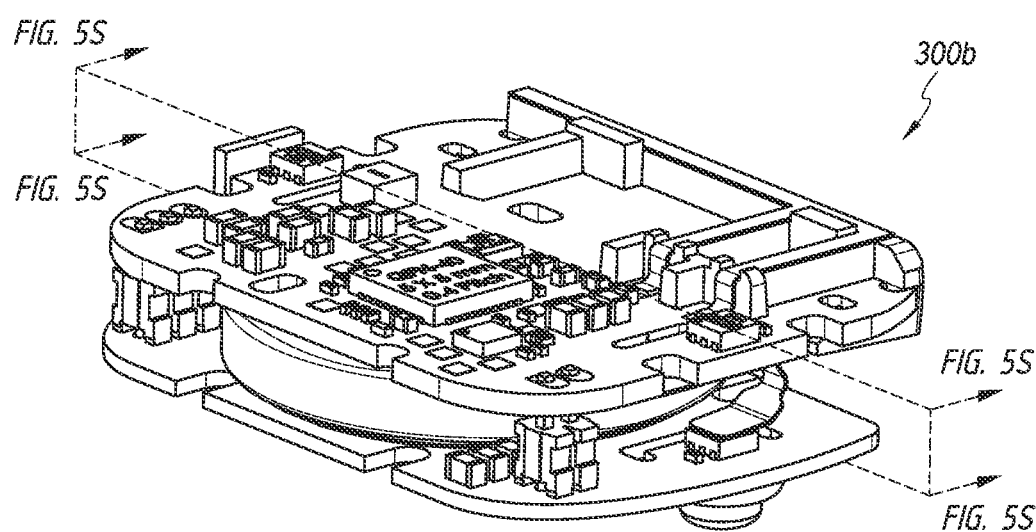
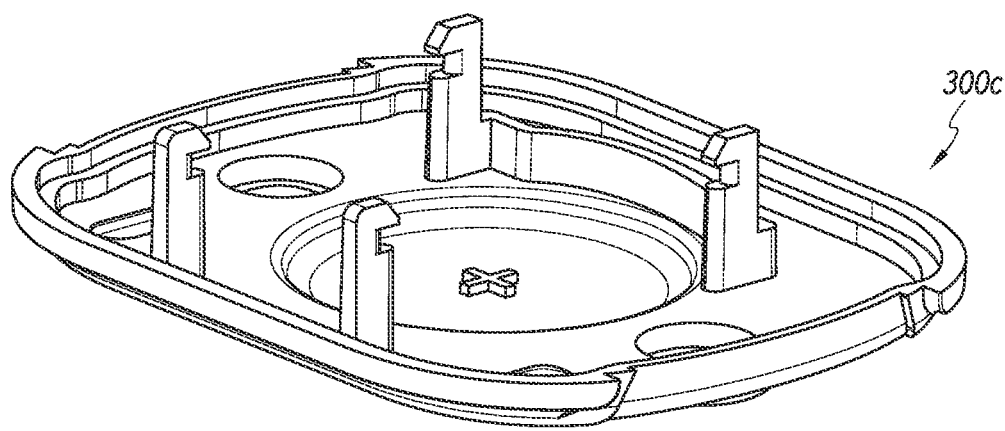
FIG. 5F

WEARABLE DEVICE FOR NONINVASIVE BODY TEMPERATURE MEASUREMENT

INCORPORATION BY REFERENCE TO ANY PRIORITY APPLICATIONS

The present application claims priority to U.S. Provisional Application No. 63/261,500, filed Sep. 22, 2021, titled "Wearable Device for Noninvasive Body Temperature Measurement", which is hereby incorporated by reference in its entirety.

TECHNICAL FIELD

The present disclosure relates to devices, methods, and/or systems for monitoring a subject's physiological information. More specifically, the present disclosure describes, among other things, a wearable device for measuring a subject's body temperature.

BACKGROUND

Core body temperature is an important vital sign used by clinicians to monitor and/or manage the condition of a subject (for example, a patient). Core body temperature is the internal temperature of a subject. Internal body temperatures are typically maintained within a specific range in order for the body to carry out essential functions. Variations in core body temperature can be indicative of a deteriorating condition of a subject and can negatively impact the body's ability to maintain critical life-sustaining functions.

SUMMARY

Despite the importance of core body temperature as a vital sign, many commonly employed devices, methods, and/or systems for estimating (via noninvasive or minimally invasive means) core body temperature based on skin surface or peripheral measurements lack accuracy. Skin surface temperature, typically measured using single point measurement devices or heat flux measurement devices, can vary dramatically from core body temperature in some cases depending on physiology of the subject such as properties of the subject's skin (for example, thickness, impedance), condition of the subject's skin when measurements are taken (for example, moisture/sweat), environment of the subject, perfusion, and/or other conditions. Temperature measurements obtained with a thermometer at a subject's periphery (such as at the subject's armpit, rectum, or under a subject's tongue) also do not represent a true measurement of internal body temperature, but rather, simply an approximation. The present disclosure provides improved devices, methods, and systems for noninvasively determining a subject's internal body temperature based upon temperature measurements obtained from the subject's skin.

Various implementations of the disclosed wearable devices include multiple temperature sensors operably positioned in different locations with respect to one another and with respect to the wearer's skin when in use. Such configurations can allow temperature to be determined at each of these different locations and compared with one another. In some implementations, thermal paths (which may be referred to as "thermal flow paths" or "heat flow paths" or "thermal energy paths") between pairs of temperature sensors are defined by air and/or a thermally conductive element, which can provide additional information where thermal properties (for example, thermal conductivity values) are known. Temperature values at various ones of the temperature sensors and differences between such values can be utilized to provide more accurate estimates of internal body temperature of a subject. Some implementations of the wearable devices disclosed herein include two pairs of temperature sensors aligned with one another, where one of each pair is positioned farther from the subject's skin (when the wearable device is in use) and the other one of each pair is positioned closer to the subject's skin. Some implementations include an air gap (which can act as a thermal insulator) between one of such pairs and a thermally conductive element (for example, a metallic material) between the other one of such pairs. Temperature values determined based on each of the temperature sensors (and/or each of the pairs of temperature sensors) can be compared and/or otherwise utilized to approximate internal body temperature value(s) of the subject. In various implementations, one or more thermally conductive probes can be utilized to transmit energy from a substrate of the wearable device (which can adhere to the subject's skin) toward aligned temperature sensor(s).

Some implementations of the disclosed wearable devices (or portions of such devices) can be disposable, which can reduce the risk of cross-contamination between multiple subjects. Some implementations of the disclosed wearable devices (or portions of such devices) can be waterproof, thereby allowing the subject to carry out ordinary activities (for example, showering) without disrupting operation of the wearable device. Some implementations of the disclosed wearable devices include two separable components (which may also be referred to as "separate portions" or "first and second portions"). In such implementations, a first one of the components can be configured to secure to a portion of a subject (for example, skin of the user) and a second one of the components can be configured to secure (for example, removably secure) to the first component. In some implementations, the first and second components are configured such that separation thereof is inhibited or prevented when the first component is secured to the subject but is allowed when the first component is not secured to the subject. Such implementations can be advantageous in scenarios where it is desirable to inhibit or prevent a user from interfering with operation of the wearable device. For example, in some implementations, the wearable device includes a button configured to transition the wearable device (or a portion thereof such as the second component discussed above) between non-operational and operational modes. In some of such implementations, such button is inaccessible (for example, to the subject wearing the wearable device and/or to another person, such as a caregiver) unless the first and second components are separated from one another. Such implementations can advantageously prevent a subject (for example, a child) from intentionally or unintentionally turning the wearable device off when the wearable device is secured to the subject (which can ensure proper compliance in some situations).

Disclosed herein is a wearable device configured to secure to skin of a user and noninvasively measure body temperature of the user, the wearable device comprising: a first pair of temperature sensors, said first pair of temperature sensors comprising a first temperature sensor and a second temperature sensor, each of said first and second temperature sensors configured to generate one or more signals responsive to detected thermal energy, said first temperature sensor operably positioned to be closer to the user's skin than the second temperature sensor when the wearable device is secured to the user's skin; a second pair of temperature sensors spaced from said first pair of temperature sensors, said second pair of temperature sensors comprising a third temperature sensor and a fourth temperature sensor, each of said third and fourth temperature sensors configured to generate one or more signals responsive to detected thermal energy, said third temperature sensor operably positioned to be closer to the user's skin than the fourth temperature sensor when the wearable device is secured to the user's skin; a thermally conductive element positioned at least partially between the third and fourth temperature sensors; and one or more hardware processors. The one or more hardware processors can be configured to: receive said one or more signals generated by each of said first and second temperature sensors; and receive said one or more signals generated by each of said third and fourth temperature sensors. The one or more hardware processors can be configured to determine one or more body temperature values of the user based on at least: a first comparison between said one or more signals generated by said first temperature sensor and said one or more signals generated by said second temperature sensor; and a second comparison between said one or more signals generated by said third temperature sensor and said one or more signals generated by said fourth temperature sensor.

In some implementations, the first pair of temperature sensors are thermally insulated from one another by an air gap. In some implementations: the wearable device further comprises a first circuit board and a second circuit board, the first and second circuit boards spaced from one another, the first circuit board positioned closer to the skin of the user than the second circuit board when the wearable device is secured to the user's skin; said first temperature sensor is mounted to the first circuit board and the second temperature sensor is mounted to the second circuit board; said third temperature sensor is mounted to the first circuit board and spaced from the first temperature sensor; said fourth temperature sensor is mounted to the second circuit board and spaced from the second temperature sensor; a distance between the first temperature sensor and the second circuit board at least partially defines said air gap; and said thermally conductive element is positioned between the third temperature sensor and a portion of the second circuit board that is adjacent to the fourth temperature sensor.

In some implementations: said first circuit board comprises a first surface and a second surface; said second circuit board comprises a first surface and a second surface; said first surface of the first circuit board faces toward the second surface of the second circuit board; said first and third temperature sensors are mounted on the first surface of the first circuit board; said second and fourth temperature sensors are mounted on the first surface of the second circuit board; and said thermally conductive element is positioned between the third temperature sensor and a portion of the second surface of the second circuit board that is adjacent to the fourth temperature sensor. In some implementations, said second circuit board comprises at least one opening positioned between the fourth temperature sensor and a portion of said thermally conductive element, said at least one opening configured to allow thermal energy to pass from the thermally conductive element through the second circuit board and to the fourth temperature sensor. In some implementations, said first and second temperature sensors are substantially aligned with one another and wherein said third and fourth temperature sensors are substantially aligned with one another.

In some implementations, said thermally conductive element comprises a metal strip. In some implementations, said metal strip comprises copper. In some implementations, the first and second circuit boards are arranged to be substantially parallel to one another. In some implementations, said one or more hardware processors are further configured to determine said one or more body temperature values based on: a third comparison between said one or more signals generated by at least one of the first pair of temperature sensors and said one or more signals generated by at least one of the second pair of temperature sensors. In some implementations, said one or more hardware processors are further configured to determine said one or more body temperature values based on: a third comparison between said one or more signals generated by the first temperature sensor and said one or more signals generated by the fourth temperature sensor.

In some implementations, the wearable device comprises a first portion configured to be secured to the user's skin and a second portion configured to removably secure to the first portion, and wherein the one or more hardware processors, the thermally conductive element, the first pair of temperature sensors, and the second pair of temperature sensors are positioned within the second portion of the wearable device. In some implementations, the first portion comprises a frame and a substrate coupled to the frame, the substrate configured to secure to the user's skin, and wherein the second portion comprises a housing. In some implementations, the housing comprises a first shell and a second shell, and wherein the first and second shells are permanently secured together. In some implementations, none of the first temperature sensor, second temperature sensor, third temperature sensor, and fourth temperature sensor contact the user's skin when the wearable device is secured to the user.

Disclosed herein is a wearable device configured to secure to skin of a user and noninvasively measure body temperature of the user, the wearable device comprising: a first pair of temperature sensors, said first pair of temperature sensors comprising a first temperature sensor and a second temperature sensor, each of said first and second temperature sensors configured to generate one or more signals responsive to detected thermal energy, said first temperature sensor operably positioned to be closer to the user's skin than the second temperature sensor when the wearable device is secured to the user's skin; a second pair of temperature sensors spaced from said first pair of temperature sensors, said second pair of temperature sensors comprising a third temperature sensor and a fourth temperature sensor, each of said third and fourth temperature sensors configured to generate one or more signals responsive to detected thermal energy, said third temperature sensor operably positioned to be closer to the user's skin than the fourth temperature sensor when the wearable device is secured to the user's skin; a thermally conductive element positioned at least partially between the third and fourth temperature sensors; and one or more hardware processors. The one or more hardware processors can be configured to: receive said one or more signals generated by each of said first and second temperature sensors; receive said one or more signals generated by each of said third and fourth temperature sensors; determine a first temperature gradient based on said one or more signals generated by each of the first pair of temperature sensors; determine a second temperature gradient based on said one or more signals generated by each of the second pair of temperature sensors; and determine one or more body temperature values of the user based on at least said first and second temperature gradients.

In some implementations, the first pair of temperature sensors are thermally insulated from one another by an air gap. In some implementations: the wearable device further comprises a first circuit board and a second circuit board, the first and second circuit boards spaced from one another, the first circuit board positioned closer to the skin of the user than the second circuit board when the wearable device is secured to the user's skin; said first temperature sensor is mounted to the first circuit board and said second temperature sensor is mounted to the second circuit board; said third temperature sensor is mounted to the first circuit board and spaced from the first temperature sensor; said fourth temperature sensor is mounted to the second circuit board and spaced from the second temperature sensor; a distance between the first temperature sensor and the second circuit board at least partially defines said air gap; and said thermally conductive element is positioned between the third temperature sensor and a portion of the second circuit board that is adjacent to the fourth temperature sensor. In some implementations: said first circuit board comprises a first surface and a second surface; said second circuit board comprises a first surface and a second surface; said first surface of the first circuit board faces toward the second surface of the second circuit board; said first and third temperature sensors are mounted on the first surface of the first circuit board; said second and fourth temperature sensors are mounted on the first surface of the second circuit board; and said thermally conductive element is positioned between the third temperature sensor and a portion of the second surface of the second circuit board that is adjacent to the fourth temperature sensor. In some implementations, said second circuit board comprises at least one opening positioned between the fourth temperature sensor and a portion of said thermally conductive element, said at least one opening configured to allow thermal energy to pass from the thermally conductive element through the second circuit board and to the fourth temperature sensor.

In some implementations, said first and second temperature sensors are substantially aligned with one another and said third and fourth temperature sensors are substantially aligned with one another. In some implementations, said thermally conductive element comprises a metal strip. In some implementations, said metal strip comprises copper. In some implementations, the first and second circuit boards are arranged to be substantially parallel to one another. In some implementations, the wearable device comprises a first portion configured to be secured to the user's skin and a second portion configured to removably secure to the first portion, and the one or more hardware processors, the thermally conductive element, the first pair of temperature sensors, and the second pair of temperature sensors are positioned within the second portion of the wearable device. In some implementations, the first portion comprises a frame and a substrate coupled to the frame, the substrate configured to secure to the user's skin, and the second portion comprises a housing. In some implementations, the housing comprises a first shell and a second shell, and the first and second shells are permanently secured together.

Disclosed herein is a wearable device configured for noninvasive measurement of body temperature of a user, the wearable device comprising: a housing; a substrate coupled to the housing and configured to secure to skin of the user; a circuit board positioned within a portion of the housing and comprising a first surface and a second surface, wherein the second surface is configured to be positioned closer to the substrate than the first surface when the wearable device is in use; a first temperature sensor mounted to the first surface of the circuit board; a first thermally conductive probe positioned adjacent the second surface of the circuit board and substantially aligned with the first temperature sensor; a second temperature sensor mounted to the first surface of the circuit board and spaced away from the first temperature sensor; and a second thermally conductive probe positioned adjacent the second surface of the circuit board and substantially aligned with the second temperature sensor, the second thermally conductive probe spaced away from the first thermally conductive probe. In some implementations: the first and second thermally conductive probes contact the substrate and the substrate is positioned between the user's skin and the first and second thermally conductive probes when the wearable device is in use; the first and second thermally conductive probes are configured to transmit thermal energy of the user toward the first and second temperature sensors; and the wearable device is configured to determine body temperature of the user based at least on one or more signals generated by each of the first and second temperature sensors responsive to said thermal energy.

In some implementations, the first thermally conductive probe comprises a first end and a second end opposite the first end, the first end configured to contact the substrate when the wearable device is in use and the second end in contact with the second surface of the circuit board. In some implementations, the second thermally conductive probe comprises a first end and a second end opposite the first end, the first end configured to contact the substrate when the wearable device is in use and the second end in contact with the second surface of the circuit board. In some implementations, the wearable device further comprises: at least one opening in the circuit board positioned at least partially between the second end of the first thermally conductive probe and the first temperature sensor, said at least one opening configured to allow thermal energy to pass from the second end of the first thermally conductive probe through the circuit board and to the first temperature sensor; and at least one opening in the circuit board positioned at least partially between the second end of the second thermally conductive probe and the second temperature sensor, said at least one opening configured to allow thermal energy to pass from the second end of the second thermally conductive probe through the circuit board and to the second temperature sensor.

In some implementations: said at least one opening in the circuit board positioned at least partially between the second end of the first thermally conductive probe and the first temperature sensor comprises a first plurality of openings; and said at least one opening in the circuit board positioned at least partially between the second end of the second thermally conductive probe and the second temperature sensor comprises a second plurality of openings.

In some implementations, each of said first plurality of openings is filled with a thermally conductive material, and wherein each of said second plurality of openings is filled with said thermally conductive material. In some implementations, said thermally conductive material comprises copper. In some implementations, each of said first plurality of openings is not filled with a material, and wherein each of said second plurality of opening is not filled with a material. In some implementations, said first temperature sensor and said first thermally conductive probe are substantially aligned along a first axis and wherein said second temperature sensor and second thermally conductive probe are substantially aligned along a second axis, and wherein the first and second axes are substantially parallel to one another. In some implementations, each of the first and second thermally conductive probes comprise a metallic material. In some implementations, each of the first and second temperature sensors is an integrated circuit (IC)

temperature sensor. In some implementations, each of the first and second temperature sensors is a thermistor. In some implementations, a cross-section of each of the first and second thermally conductive probes is circular.

In some implementations, said wearable device comprises: a first portion comprising said substrate and a frame coupled to said substrate; and a second portion comprising said housing that is removably securable to said frame, wherein said circuit board and said first and second temperature sensors are positioned within said housing. In some implementations, said housing comprises a first opening and a second opening, and wherein the first thermally conductive probe extends through said first opening and said second thermally conductive probe extends through said second opening. In some implementations: the housing comprises a first shell and a second shell; the first shell is configured to be positioned closer to the substrate than the second shell when the housing is secured to the frame; and the first shell comprises the first and second openings. In some implementations, the wearable device further comprises one or more hardware processors configured to determine said body temperature of the user based at least on said one or more signals generated by each of the first and second temperature sensors responsive to said thermal energy.

Disclosed herein is a wearable device configured for noninvasive measurement of body temperature of a user, the wearable device comprising a first portion and a second portion configured to be removably secured to the first portion of the wearable device. The first portion can comprise: a frame; and a substrate coupled to the frame and configured to secure to skin of the user. The second portion can comprise: a housing configured to mechanically connect to the frame of the first portion of the wearable device; and a first temperature sensor positioned within the housing. The wearable device can be configured to determine body temperature based at least on one or more signals generated by the first temperature sensor responsive to thermal energy.

In some implementations, the first portion of the wearable device does not include any electronic components. In some implementations, the first portion of the wearable device does not include a temperature sensor. In some implementations, the first portion of the wearable device does not include a power source. In some implementations, the second portion of the wearable device further comprises a second temperature sensor positioned within the housing and spaced from the first temperature sensor, wherein the wearable device is configured to determine body temperature based at least on one or more signals generated by the first and second temperature sensors responsive to said thermal energy. In some implementations: the second portion of the wearable device further comprises a circuit board positioned within the housing and comprising a first surface and a second surface; the second surface is positioned closer to the substrate than the first surface when the first and second portions of the wearable device are secured together; and the first and second temperature sensors are mounted to the first surface of the circuit board.

In some implementations: the frame comprises an opening; the substrate is configured to be positioned between the opening of the frame and the user's skin when the wearable device is in use; the housing comprises a first opening. The second portion of the wearable device can further comprise: a first thermally conductive probe positioned adjacent the second surface of the circuit board and substantially aligned with the first temperature sensor, the first thermally conductive probe extending through the first opening of the housing. The opening of the frame can allow the first thermally conductive probe to contact the substrate when the first and second portions of the wearable device are secured together. The first thermally conductive probe can transmit thermal energy of the user toward the first temperature sensor. In some implementations, the housing further comprises a second opening that is spaced from the first opening of the housing and the second portion of the wearable device further comprises: a second thermally conductive probe positioned adjacent the second surface of the circuit board and substantially aligned with the second temperature sensor, the second thermally conductive probe spaced away from the first thermally conductive probe and extending through the second opening of the housing. The opening of the frame can allow the second thermally conductive probe to contact the substrate when the first and second portions of the wearable device are secured together. The second thermally conductive probe can transmit thermal energy of the user toward the second temperature sensor.

In some implementations, the housing comprises a first shell and a second shell, the first shell positioned closer to the substrate than the second shell when the first and second portions of the wearable device are secured together. In some implementations, the housing comprises at least one recess and the frame comprises at least one protrusion configured to engage the at least one recess to allow the first portion to secure to the second portion. In some implementations: the frame comprises a rim, a first arm extending outward from the rim, and a second arm extending outward from the rim and spaced from the first arm, said rim comprising said opening of the frame; the first arm comprises a first protrusion and the second arm comprises a second protrusion; the housing comprises a first recess and a second recess spaced from the first recess; and the first and second protrusions are configured to engage the first and second recesses to allow the first portion to secure to the second portion. In some implementations: the first arm is located at a first end of the frame and the second arm is located at a second end of the frame that is opposite the first end of the frame; and the first recess is located at a first end of the housing and the second recess is located at a second end of the housing that is opposite the first end of the housing.

In some implementations: the frame further comprises a first side and a second side opposite the first side; and application of opposing forces on the first and second sides of the frame causes movement of the first and second protrusions out of engagement with the first and second recesses of the housing such that the housing can be removed from the frame. In some implementations, said first and second sides of the frame are defined by the rim of the frame. In some implementations: said application of opposing forces on the first and second sides of the frame causes said first and second arms to flex outward from each other in opposite directions. In some implementations: said application of said opposing forces on the first and second sides of the frame causes the first and second arms to move from a first position to a second position; free ends of the first and second arms are positioned closer to one another when in the first position than when in the second position; and removal of said application of said opposing forces on the first and second sides of the frame causes the first and second arms to move from the second position to the first position. In some implementations, the first and second arms extend generally perpendicular to the rim. In some implementations, the first and second arms extend in the same direction. In some implementations, the second portion of the wearable device further comprises a button configured to allow the wearable device to be transitioned from an operational mode to a non-operational mode, and wherein, said button faces toward the substrate when the first and second portions are secured together.

In some implementations, the second portion of the wearable device further comprises a button configured to allow the wearable device to be transitioned from an operational mode to a non-operational mode, and wherein, said button is inaccessible when the first and second portions are secured together. In some implementations, when the wearable device is in said non-operational mode, the wearable device does not determine body temperature of the user. In some implementations, the second portion of the wearable device comprises a communication module configured to allow the wearable device to wirelessly transmit said determined body temperature to a separate device.

Disclosed herein is a wearable device configured for noninvasive measurement of body temperature of a user, the wearable device comprising: a housing; a substrate coupled to the housing and configured to secure to skin of the user; a first circuit board positioned within a portion of the housing and comprising a first surface and a second surface, wherein the second surface of the first circuit board is configured to be positioned closer to the substrate than the first surface of the first circuit board; a second circuit board positioned within a portion of the housing and spaced from the first circuit board by a gap, the second circuit board comprising a first surface and a second surface, wherein the second circuit board is configured to be positioned farther from the substrate than the first circuit board; a first temperature sensor mounted to the first surface of the first circuit board; a thermally conductive probe positioned adjacent the second surface of the first circuit board and substantially aligned with the first temperature sensor, wherein the thermally conductive probe contacts the substrate and the substrate is positioned between the user's skin and the thermally conductive probe when the wearable device is in use, and wherein the thermally conductive probe is configured to transmit thermal energy of the user toward the first temperature sensor; and a second temperature sensor mounted to the first surface of the second circuit board and substantially aligned with the first temperature sensor. The wearable device can be configured to determine body temperature based at least on one or more signals generated by the first and second temperature sensors.

In some implementations, the first surface of the first circuit board faces toward the second surface of the second circuit board. In some implementations, the second surface of the second circuit board is configured to be positioned closer to the substrate than the first surface of the second circuit board. In some implementations, the wearable device further comprises a thermally conductive element having a first end secured to the first temperature sensor and a second end secured to a portion of the second surface of the second circuit board that is substantially aligned with the second temperature sensor, wherein the thermally conductive element is configured to at least partially transmit said thermal energy from the first temperature sensor to the second temperature sensor. In some implementations, said thermally conductive element comprises a metallic material. In some implementations, said thermally conductive element comprises copper. In some implementations, an air gap is positioned between the first temperature sensor and a portion of the second surface of the second circuit board that is substantially aligned with said second temperature sensor. In some implementations, the wearable device further comprises at least one hole in the first circuit board adjacent the first temperature sensor and at least one hole in the second circuit board adjacent the second temperature sensor. In some implementations, the wearable device further comprises a battery positioned between the first and second circuit boards. In some implementations, the wearable device further comprises: an antenna configured to allow the wearable device to wirelessly communicate with a separate device; and a support structure connected to the second circuit board and configured to position the antenna away from the first surface of the second circuit board, thereby positioning the antenna farther away from the battery and increasing a wireless range of the antenna.

Disclosed herein is a wearable device configured for noninvasive measurement of body temperature of a user, the wearable device comprising: a housing; a substrate configured to be removably coupled to the housing and configured to secure to skin of the user; a circuit board positioned within a portion of the housing and comprising a first surface and a second surface, wherein the second surface is configured to be positioned closer to the substrate than the first surface when the wearable device is in use; a first temperature sensor mounted to the first surface of the circuit board; a thermally conductive probe positioned adjacent the second surface of the circuit board and substantially aligned with the first temperature sensor, wherein the thermally conductive probe contacts the substrate and the substrate is positioned between the user's skin and the thermally conductive probe when the wearable device is in use, and wherein the thermally conductive probe is configured to transmit thermal energy of the user toward the first temperature sensor; a second temperature sensor mounted to the first surface of the circuit board and spaced away from the first temperature sensor; and a thermally conductive element connected to and extending between the first and second temperature sensors. The wearable device can be configured to determine body temperature based at least on one or more signals generated by the first and second temperature sensors.

Disclosed herein is a method of noninvasively measuring body temperature of a user with a wearable device, the method comprising: receiving one or more signals generated by each of a first pair of temperature sensors of the wearable device responsive to detected thermal energy, said first pair of temperature sensors comprising a first temperature sensor and a second temperature sensor, said first temperature sensor operably positioned to be closer to skin of the user than said second temperature sensor when the wearable device is secured to the user's skin; and receiving one or more signals generated by each of a second pair of temperature sensors of the wearable device responsive to detected thermal energy, said second pair of temperature sensors spaced from said first pair of temperature sensors and comprising a third temperature sensor and a fourth temperature sensor, said third temperature sensor operably positioned to be closer to skin of the user than said fourth temperature sensor when the wearable device is secured to the user's skin. The method can further comprise determining, with one or more hardware processors of the wearable device, one or more body temperature values of the user based on at least: a first comparison between the one or more signals generated by said first temperature sensor and the one or more signals generated by said second temperature sensor; and a second comparison between the one or more signals generated by said third temperature sensor and the one or more signals generated by said fourth temperature sensor.

In some implementations, the method further comprises allowing thermal energy to flow through a thermally conductive element positioned at least partially between the third and fourth temperature sensors. In some implementations, said thermally conductive element comprises copper. In some implementations, said determining said one or more body temperature values of the user is further based on a third comparison between said one or more signals generated by at least one of the first pair of temperature sensors and said one or more signals generated by at least one of the second pair of temperature sensors.

Disclosed herein is a method of noninvasively measuring body temperature of a user with a wearable device, the method comprising: receiving one or more signals generated by each of a first pair of temperature sensors of the wearable device responsive to detected thermal energy, said first pair of temperature sensors comprising a first temperature sensor and a second temperature sensor, said first temperature sensor operably positioned to be closer to skin of the user than said second temperature sensor when the wearable device is secured to the user's skin; and receiving one or more signals generated by each of a second pair of temperature sensors of the wearable device responsive to detected thermal energy, said second pair of temperature sensors spaced from said first pair of temperature sensors and comprising a third temperature sensor and a fourth temperature sensor, said third temperature sensor operably positioned to be closer to skin of the user than said fourth temperature sensor when the wearable device is secured to the user's skin. The method can further comprise determining with one or more hardware processors of the wearable device: a first temperature gradient based on the one or more signals generated by each of the first pair of temperature sensors; a second temperature gradient based on the one or more signals generated by each of the second pair of temperature sensors; and one or more body temperature values of the user based on at least said first and second temperature gradients.

Disclosed herein is a wearable device configured to secure to skin of a user, the wearable device comprising: a first pair of temperature sensors, said first pair of temperature sensors comprising a first temperature sensor and a second temperature sensor, said first temperature sensor operably positioned to be closer to the user's skin than the second temperature sensor when the wearable device is secured to the user's skin; and a second pair of temperature sensors spaced from said first pair of temperature sensors, said second pair of temperature sensors comprising a third temperature sensor and a fourth temperature sensor, said third temperature sensor operably positioned to be closer to the user's skin than the fourth temperature sensor when the wearable device is secured to the user's skin. In some implementations, the wearable device further comprises one or more hardware processors configured to: receive one or more signals generated by each of said first temperature sensor, second temperature sensor, third temperature sensor, and fourth temperature sensor responsive to thermal energy; and determine one or more body temperature values of the user based on at least: a first comparison between said one or more signals generated by said first temperature sensor and said one or more signals generated by said second temperature sensor; and a second comparison between said one or more signals generated by said third temperature sensor and said one or more signals generated by said fourth temperature sensor.

In some implementations, the wearable device further comprises a thermally conductive element positioned at least partially between the third and fourth temperature sensors. In some implementations, the first pair of temperature sensors are thermally insulated from one another by an air gap. In some implementations, the wearable device further comprises a first circuit board and a second circuit board, the first and second circuit boards spaced from one another, the first circuit board positioned closer to the skin of the user than the second circuit board when the wearable device is secured to the user's skin; said first temperature sensor is mounted to the first circuit board and the second temperature sensor is mounted to the second circuit board; said third temperature sensor is mounted to the first circuit board and spaced from the first temperature sensor; said fourth temperature sensor is mounted to the second circuit board and spaced from the second temperature sensor; a distance between the first temperature sensor and the second circuit board at least partially defines said air gap; and said thermally conductive element is positioned between the third temperature sensor and a portion of the second circuit board that is adjacent to the fourth temperature sensor. In some implementations, said first circuit board comprises a first surface and a second surface; said second circuit board comprises a first surface and a second surface; said first surface of the first circuit board faces toward the second surface of the second circuit board; said first and third temperature sensors are mounted on the first surface of the first circuit board; said second and fourth temperature sensors are mounted on the first surface of the second circuit board; and said thermally conductive element is positioned between the third temperature sensor and a portion of the second surface of the second circuit board that is adjacent to the fourth temperature sensor. In some implementations, said second circuit board comprises at least one opening positioned between the fourth temperature sensor and a portion of said thermally conductive element, said at least one opening configured to allow thermal energy to pass from the thermally conductive element through the second circuit board and to the fourth temperature sensor.

In some implementations, said first and second temperature sensors are substantially aligned with one another and said third and fourth temperature sensors are substantially aligned with one another. In some implementations, said thermally conductive element comprises a metal strip. In some implementations, said metal strip comprises copper. In some implementations, the first and second circuit boards are arranged to be substantially parallel to one another. In some implementations, said one or more hardware processors are further configured to determine said one or more body temperature values based on: a third comparison between said one or more signals generated by at least one of the first pair of temperature sensors and said one or more signals generated by at least one of the second pair of temperature sensors. In some implementations, said one or more hardware processors are further configured to determine said one or more body temperature values based on: a third comparison between said one or more signals generated by the first temperature sensor and said one or more signals generated by the fourth temperature sensor.

In some implementations, the wearable device comprises a first portion configured to be secured to the user's skin and a second portion configured to removably secure to the first portion, and the one or more hardware processors, the first pair of temperature sensors, and the second pair of temperature sensors are positioned within the second portion of the wearable device. In some implementations, the first portion comprises a frame and a substrate coupled to the frame, the substrate configured to secure to the user's skin, and wherein the second portion comprises a housing. In some implementations, the housing comprises a first shell and a second shell, and wherein the first and second shells are permanently secured together. In some implementations, none of the first temperature sensor, second temperature sensor, third temperature sensor, and fourth temperature sensor contact the user's skin when the wearable device is secured to the user.

For purposes of summarizing the disclosure, certain aspects, advantages, and novel features are discussed herein. It is to be understood that not necessarily all such aspects, advantages, or features will be embodied in any particular implementation of the disclosure, and an artisan would recognize from the disclosure herein a myriad of combinations of such aspects, advantages, or features.

BRIEF DESCRIPTION OF THE DRAWINGS

Certain features of this disclosure are described below with reference to the drawings. The illustrated implementations are intended to illustrate, but not to limit, the implementations. Various features of the different disclosed implementations can be combined to form further implementations, which are part of this disclosure.

FIGS. 5E-5F illustrate top perspective partially exploded views of the hub of FIGS. 5A-5B in accordance with aspects of this disclosure.

FIG. 5O illustrates a bottom perspective partially exploded view of the portion of the hub of FIGS. 5K-5L in accordance with aspects of this disclosure.

DETAILED DESCRIPTION

Various features and advantages of this disclosure will now be described with reference to the accompanying figures. The following description is merely illustrative in nature and is in no way intended to limit the disclosure, its application, or uses. This disclosure extends beyond the specifically disclosed implementations and/or uses and obvious modifications and equivalents thereof. Thus, it is intended that the scope of this disclosure should not be limited by any particular implementation described herein. The features of the illustrated implementations can be modified, combined, removed, and/or substituted as will be apparent to those of ordinary skill in the art upon consideration of the principles disclosed herein.

Figure 8:
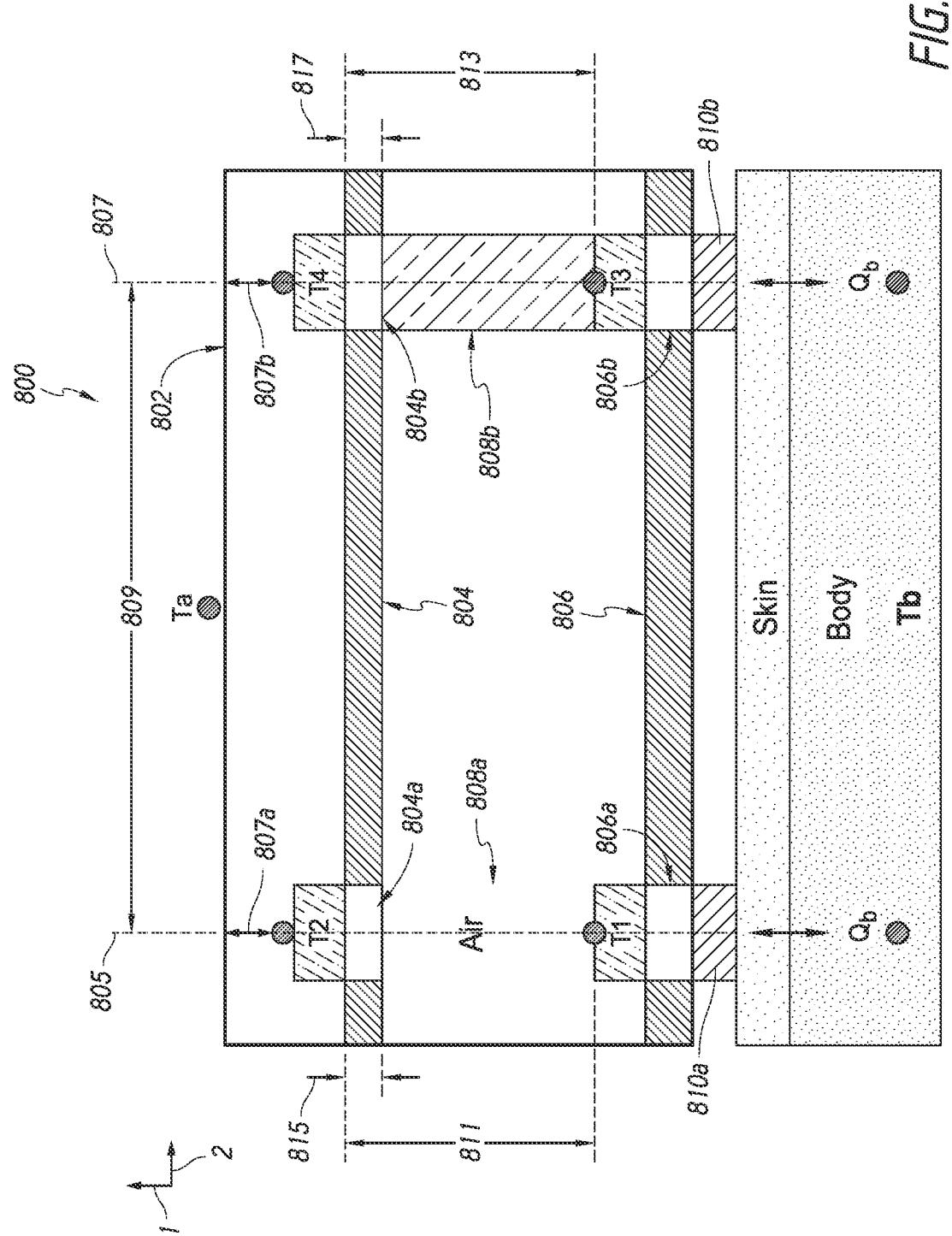
FIG. 8 illustrates a schematic diagram of another implementation of a wearable device in accordance with aspects of this disclosure.

Various wearable devices are disclosed herein which can be utilized to provide improved estimations of internal body temperature (which also may be referred to herein as "core body temperature" or "body temperature"). FIG. 8 shows a schematic diagram of an illustrative wearable device 800. Wearable device 800 can be configured to be secured to a user's skin, for example, via an adhesive material (user can also be referred to herein as "subject" or "wearer"). For example, a portion of wearable device 800 can include an adhesive material (for example, a medical grade adhesive) that can allow wearable device 800 (or a portion thereof) to secure (for example, removably secure) to the user's skin. As another example, in some implementations, wearable device 800 includes one or more substrates coupled to a housing 802 of wearable device 800 and configured to secure wearable device 800 to the user's skin. For example, in some implementations, wearable device 800 can include a substrate that is similar or identical to substrate 250 described elsewhere herein. In some implementations, wearable device 800 includes two separable components (which may also be referred to as "first" and "second" portions of wearable device 800). In some of such implementations, wearable device 800 includes a first component (which may be referred to as a "first portion") that can secure to skin of a user. Additionally, in some of such implementations, wearable device 800 includes a second component (which may be referred to as a "second portion") that may include housing 802 and/or any of the features discussed and/or illustrated as being inside and/or connected to housing 802, such as probe 810a and/or probe 810b, circuit boards 804, 806, thermally conductive element 808b, and/or any of temperature sensors T1-T4, each of which are discussed in more detail below. In some of such implementations, such first and second components of wearable device 800 are removably connectable to one another. In some of such implementations, when the first and second components are connected to one another and when the wearable device 800 is in use, at least a portion of the first component is positioned between: housing 802 (or a portion thereof, such as a bottom portion thereof) and the user's skin; probes 810a, 810b and the user's skin; and/or one or more of temperature sensors T1-T4 and the user's skin. In some implementations, when wearable device 800 is in use (for example, secured to the user's skin), no temperature sensors of the wearable device 800 contact skin of the user. In some implementations, when wearable device 800 is in use (for example, placed adjacent the user's skin) and wearable device 800 includes thermally conductive probe 810a and/or 810b, neither of thermally conductive probes 810a, 810b contact skin of the user.

With continued reference to FIG. 8, wearable device 800 can include a housing 802 that can enclose various electronic components thereof. Such housing 802 can be rigid, for example. Wearable device 800 can include one or more temperature sensors, such as one, two, three, four, five, six, seven, eight, nine or ten or more temperature sensors. Wearable device 800 can include one or more pairs of temperature sensors, such as two pairs of temperature sensors (for example, T1 and T2 being a first pair and T3 and T4 being a second pair as shown in FIG. 8). Although FIG. 8 illustrates wearable device 800 having four temperature sensors—represented by T1, T2, T3, and T4—an alternative number and/or arrangement of temperature sensors is possible. Wearable device 800 (or portions thereof) can be configured to operably position temperature sensors T1, T2, T3, T4 in various locations within housing 802 with respect to each other and/or with respect to the user's skin (when wearable device 800 is positioned adjacent and/or secured to the user's skin). For example, wearable device 800 can include structure(s) that operably position temperature sensors T1, T2, T3, T4. In some implementations, wearable device 800 includes one or more circuit boards within housing 802 that can mount temperature sensors T1, T2, T3, T4. For example, as shown in FIG. 8, wearable device 800 can include circuit boards 804, 806. Circuit boards 804, 806 can be spaced apart from one another within housing 802, for example, by a gap. In some implementations, wearable device 800 includes a battery which is positioned between the first and second circuit boards 804, 806 (for example, that can be similar or identical to battery 332 discussed elsewhere herein). In some implementations, circuit boards 804, 806 are oriented substantially parallel to one another within housing 802, as shown. In some implementations, T1 and T2 are substantially aligned with one another, for example, along an axis 805 that can be substantially parallel to axis 1. Additionally or alternatively, in some implementations, T3 and T4 are substantially aligned with one another, for example, along an axis 807 that can be substantially parallel to axis 1. In some implementations, such axes 805, 807 are substantially parallel to one another. In some implementations, axes 805, 807 are spaced from one another by a distance 809. In some implementations, T1 and T2 are substantially aligned with one another (along axis 805) and are both spaced away from T3 and T4, which are substantially aligned with one another (along axis 807). In some implementations, T1 and T2 are spaced from one another along axis 805 by a distance 811, which can include a thickness 815 of circuit board 804. In some implementations, T3 and T4 are spaced from one another along axis 807 by a distance 813, which can include thickness 815 of circuit board 804. In some implementations, distance 809 is greater than distance 811 and/or distance 813. As shown in FIGS. 8, T2 and T4 can be spaced from an interior surface of the housing 802 (for example, a top interior surface of housing 802) by gaps 807a, 807b. In some implementations, a thermally conductive material is positioned between T2 and such interior surface of housing 802 and/or between T4 and such interior surface of housing 802. Such thermally conductive material can be, for example, thermal putty (for example, a ceramic filled silicone sheet).

In some implementations, circuit boards 804, 806 can include one or more openings adjacent locations wherein temperature sensors T1, T2, T3, T4 are mounted to circuit boards 804, 806. For example, as shown in FIG. 8, circuit board 804 can include an opening 804a adjacent T2 and an opening 804b adjacent T4, and/or circuit board 806 can include an opening 806a adjacent T1 and an opening 806b adjacent T3. In some implementations in which T1 and T2 are substantially aligned and T3 and T4 are substantially aligned, openings 804a, 806a can be substantially aligned with T1 and T2, and openings 804b, 806b can be substantially aligned with T3 and T4. Such openings 804a, 806a, 804b, 806b can help at least partially define a thermal flow path from and/or between T1 and T2 and a thermal flow path from and/or between T3 and T4. While openings 804a, 806a, 804b, 806b are each illustrated as a single opening, each of said openings 804a, 806a, 804b, 806b can be formed as a plurality of openings positioned in circuit boards 804, 806 at least partially adjacent T1, T2, T3, T4. Additionally, although openings 804a, 806a, 804b, 806b are shown as having widths substantially equal to widths of T1-T4, this is not intended to be limiting. The illustrated openings 804a, 806a, 804b, 806b (each of which may comprise a plurality of openings) can have smaller widths than that shown in FIG. 8. Any of openings 804a, 806a, 804b, 806b (each of which may comprise a plurality of openings) can be positioned in portions of circuit boards 804, 806 adjacent to T1-T4. Openings 804a, 806a, 804b, 806b can allow thermal energy to flow through circuit boards 804, 806 to T1-T4, for example. In some implementations, one or more of such openings 804a, 806a, 804b, 806b are filled with a thermally conductive material. Alternatively, in some implementations, one or more of such openings 804a, 806a, 804b, 806b are not filled with a thermally conductive material (for example, are left "void"). In some implementations, opening 804a (which may comprise a plurality of openings) is not filled with a thermally conductive material but one or more of openings 804b, 806a, and/or 806b (each of which may comprise a plurality of openings) are filled with a thermally conductive material. Such thermally conductive material can include a metallic material, such as copper.

In some implementations, wearable device 800 includes thermally conductive probes 810a, 810b. Thermally conductive probes 810a, 810b can be made of a thermally conductive material (for example, a metallic material). In some implementations, probes 810a, 810b are rigid. Thermally conductive probes 810a, 810b (for example, ends thereof) can be positioned and/or secured to a surface of circuit board 806 adjacent T1 and T3 (for example, a "bottom" surface given the view shown in FIG. 8). In some variants, thermally conductive probes 810a, 810b extend through openings 806a, 806b, where such openings 806a, 806b are sized and/or shaped to receive thermally conductive probes 810a, 810b. Advantageously, thermally conductive probes 810a, 810b can transmit thermal energy from the user (for example, thermal energy radiating from the user's skin) to and/or toward T1 and T3, and such thermal energy can flow through openings 806a, 806b to T1 and T3. Although ends of thermally conductive probes 810a, 810b are illustrated as contacting the user's skin in FIG. 8, in some implementations, thermally conductive probes 810a, 810b do not contact the user's skin when the wearable device 800 is secured to the user. For example, as discussed previously, in some implementations, wearable device 800 includes one or more substrates that are configured to be positioned between the user's skin and the thermally conductive probes 810a, 810b when the wearable device 800 is secured to the user. In some implementations, housing 802 includes openings that allow the thermally conductive probes 810a, 810b to extend through the housing 802. Such openings in housing 802 can be positioned along an exterior portion of housing 802 near (for example, underneath) openings 806a, 806b in circuit board 806.

FIG. 8 schematically illustrates flow of thermal energy (represented by $Q_b$) from a user's interior to and/or between the user's skin. As mentioned previously, the user's internal body temperature (represented by Tb in FIG. 8) is an important physiological parameter indicative of the user's condition. However, as also discussed above, it is often difficult to noninvasively approximate Tb based on measuring skin temperature. Various aspects of wearable device 800 can allow for improved noninvasive approximations of Tb.

As shown in FIG. 8, thermal energy flowing from the user's body flows through the user's skin. When wearable device 800 is placed and/or secured to the user's skin, such thermal energy can be transmitted by the thermally conductive probes 810a, 810b to and/or toward T1 and T3, for example, via openings 806a, 806b in circuit board 806. A thermally insulative material can be positioned at least partially between T1 and T2, for example, between T1 and a portion of circuit board 804 that is adjacent to T2. For example, in some implementations, an air gap 808a is present between T1 and circuit board 804, opening 804a, and/or T2, as shown. Additionally, a thermally conductive element 808b can be positioned at least partially between T3 and T4, for example, between T3 and circuit board 804, opening 804b, and/or T4, as shown. T2 and T4, due in part to their positioning in housing 802 and relative to the user's skin when wearable device 800 is secured to the skin, can be more responsive to ambient temperatures (for example, temperature outside housing 802 in the surrounding environment which is represented by Ta in FIG. 8). Additionally, T1 and T3 can be more responsive to the user's temperature since they are positioned closer to the user's skin when wearable device 800 is secured to the user. Although T1 and T3 may, in some implementations, be positioned substantially the same distance from the user's skin when wearable device 800 is secured to the user, temperature values determined from T1 and T3 or determined from signal(s) generated from T1 and T3 can be different at least because of the presence of air gap 808a and thermally conductive element 808b.

Such configurations can facilitate a variety of different temperature measurement determinations using T1, T2, T3, and T4. Further, such configurations can be utilized to compare differences between one or more of temperature sensors T1, T2, T3, T4 and/or compare temperature gradients between T1 and T2, T3 and T4, and/or other gradients (for example, T1 and T3, T2 and T4, among others). Because thermal properties of air gap 808a and thermally conductive element 808b may be known, relationships between temperature values determined using T1, T2, T3, T4 can be utilized to approximate internal body temperature Tb, despite the existence of thermal properties of the user's skin (which typically decrease the accuracy of body temperature estimations in conventional temperature measurement devices). For example, in some implementations, wearable device 800 (for example, one or more processors of wearable device 800) can receive one or more signals from each of T1, T2, T3, T4 and determine one or more body temperature values based on comparisons of such signals. For example, wearable device 800 (for example, one or more processors of wearable device 800) can: receive one or more signals generated by T1 and T2 responsive to detected thermal energy; compare the one or more signals generated by T1 and T2; receive one or more signals generated by T3 and T4 responsive to detected thermal energy; compare the one or more signals generated by T3 and T4; and determine one or more body temperature values of the user based on at least such comparisons. In some implementations, wearable device 800 (for example, one or more processors of wearable device 800) determines the one or more body temperature values of the user based additionally on: a comparison between one or more signals generated by T1 and one or more signals generated by T4; a comparison between one or more signals generated by T2 and one or more signals generated by T3; a comparison between one or more signals generated by T1 and one or more signals generated by T3; and/or a comparison between one or more signals generated by T2 and one or more signals generated by T4.

FIGS. 1A-1H illustrate various views of a wearable device 100 that can measure and/or monitor one or more physiological parameters of a subject, as discussed further below. The wearable device 100 can secure to a portion of a subject's body, such as a torso, chest, back, arm, neck, leg, under the arm (e.g., armpit), among other portions of the subject's body. The wearable device 100 can secure (for example, removably secure) to skin of a subject and continuously and/or noninvasively measure the subject's temperature using one or more temperature sensors. Additionally, as discussed below, the wearable device 100 can continuously or periodically wirelessly transmit temperature data of the subject to a separate device.

Figure 5A:
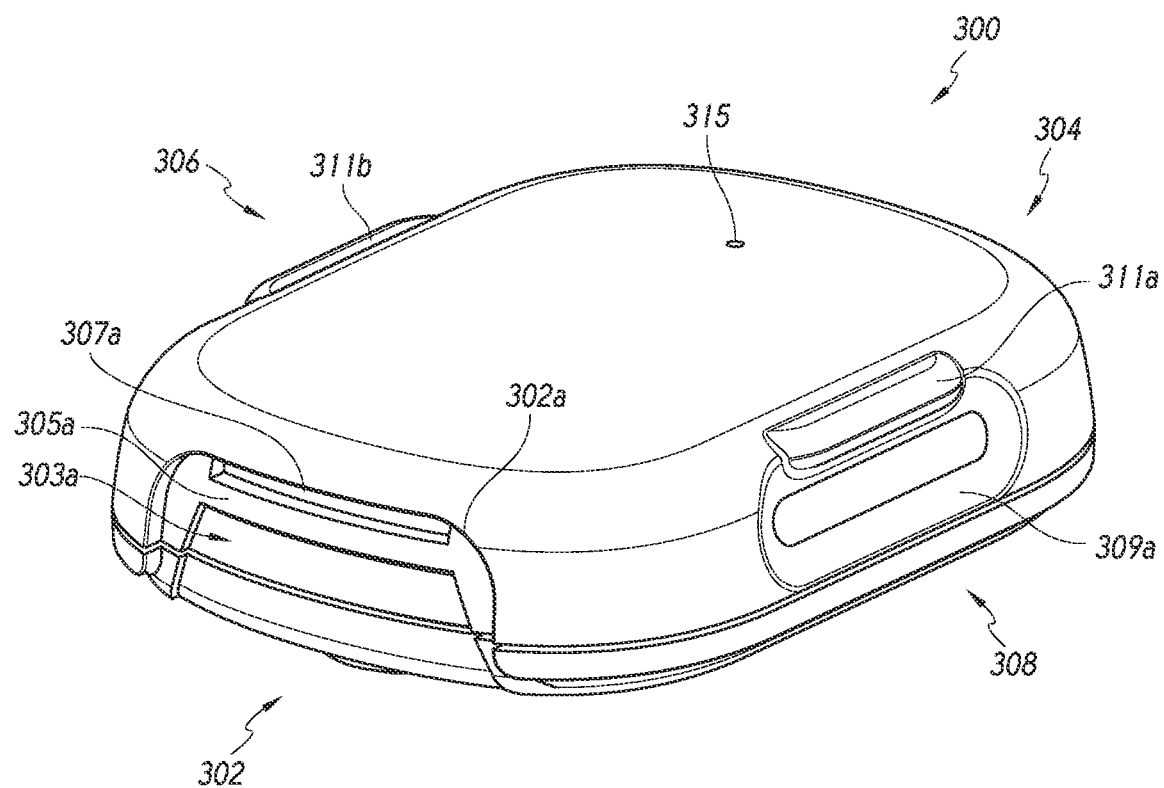
FIGS. 5A-5B illustrate top perspective views of the hub of FIGS. 3A-3B in accordance with aspects of this disclosure.
Figure 5B:
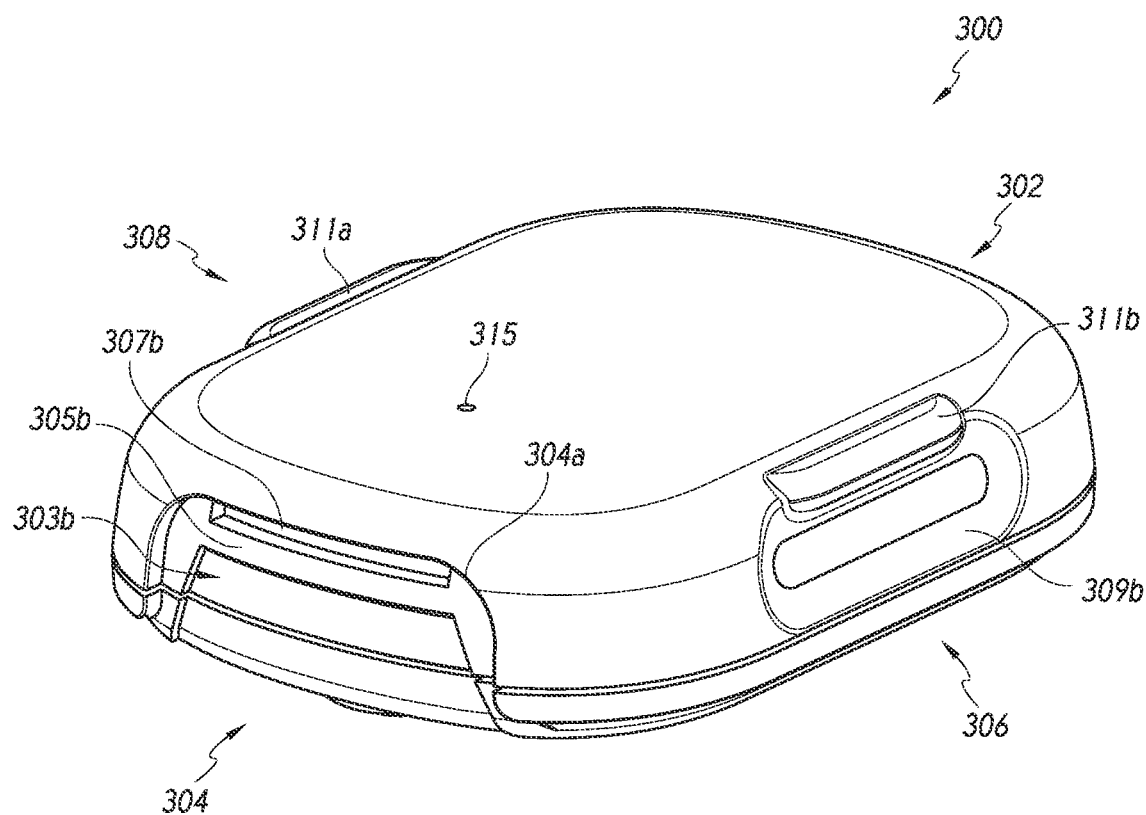
Figure 5C:
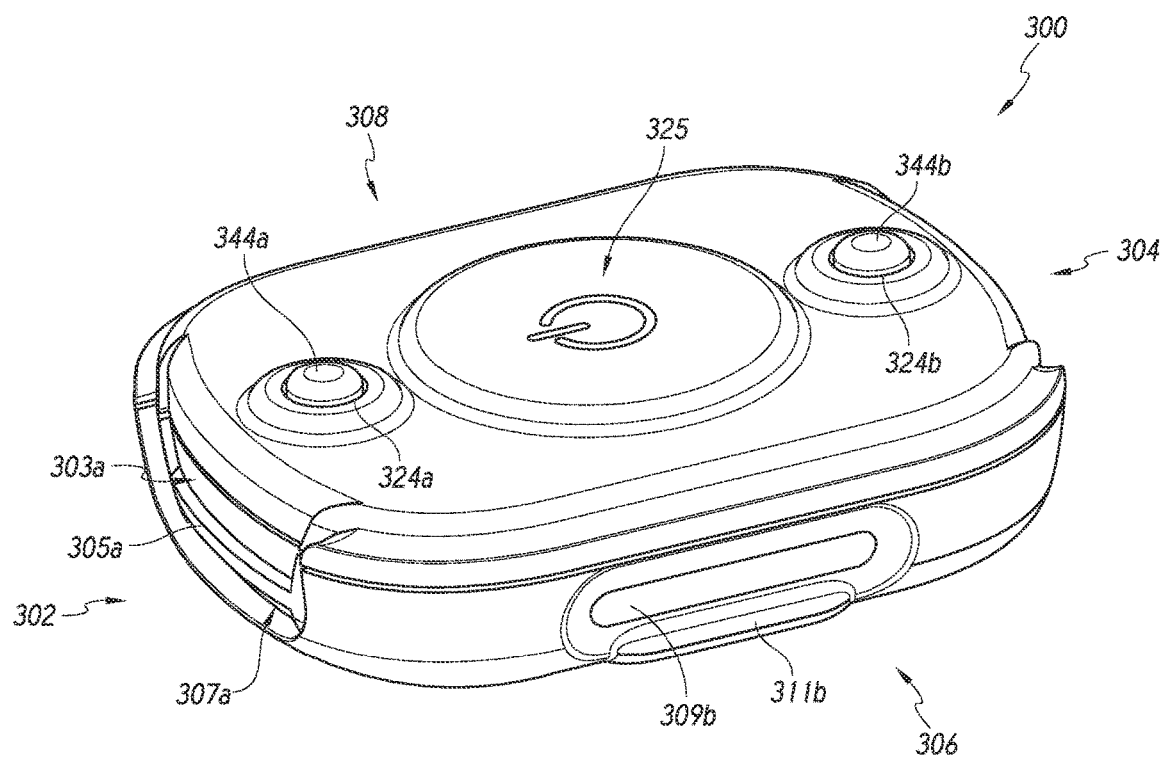
FIG. 5C illustrates a bottom perspective view of the hub of FIGS. 5A-5B in accordance with aspects of this disclosure.
Figure 5D:
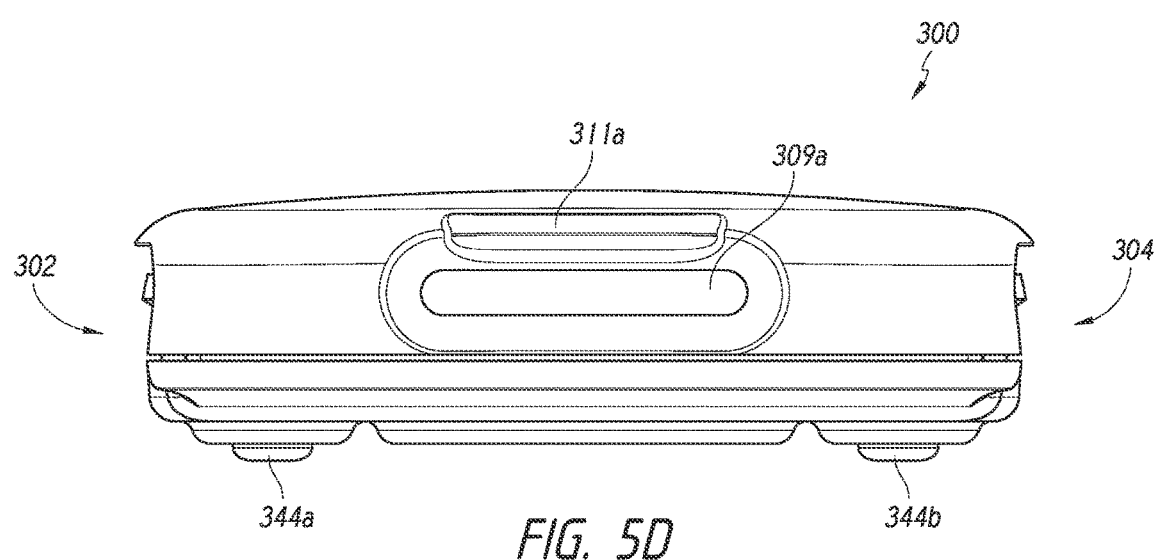
FIG. 5D illustrates a side view of the hub of FIGS. 5A-5B in accordance with aspects of this disclosure.
Figure 5E:
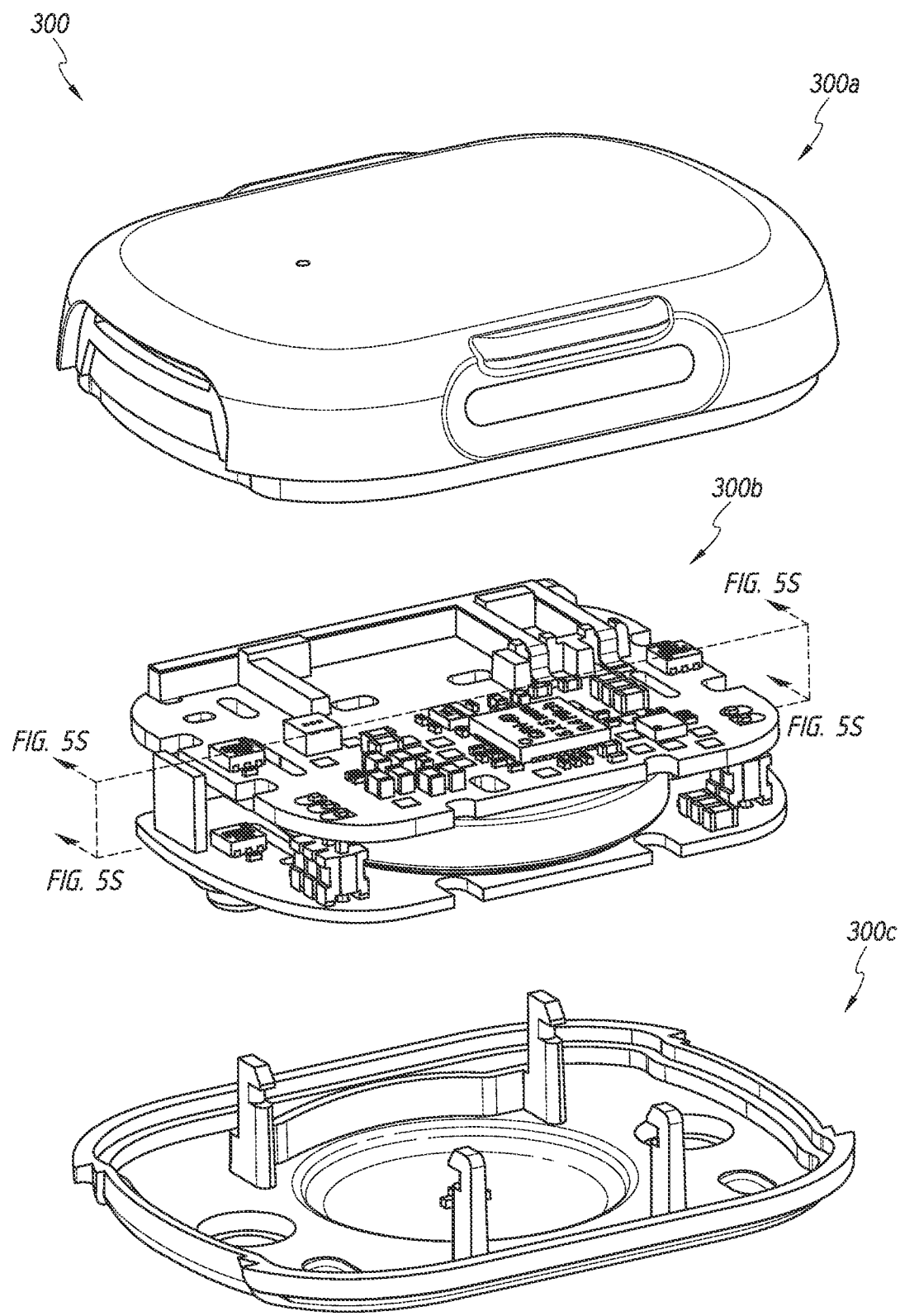
Figure 5G:
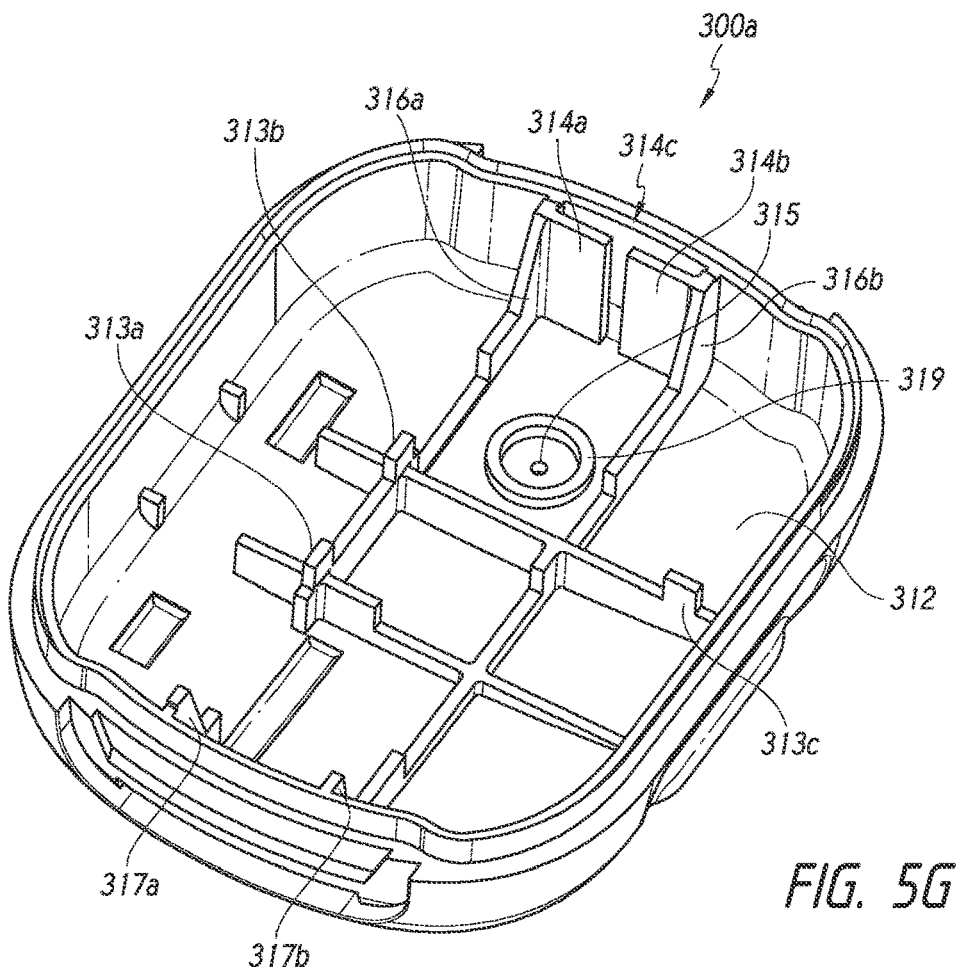
FIGS. 5G-5H illustrate bottom perspective views of a first portion of a housing of the hub of FIGS. 5A-5B in accordance with aspects of this disclosure.
Figure 5H:
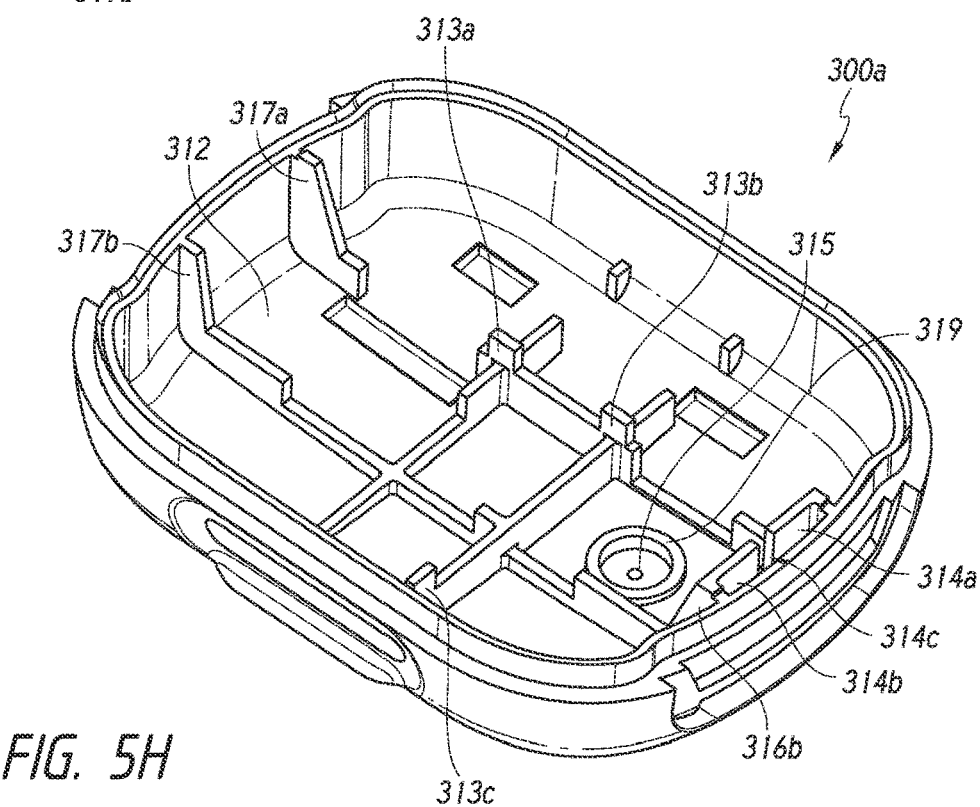
Figure 5I:
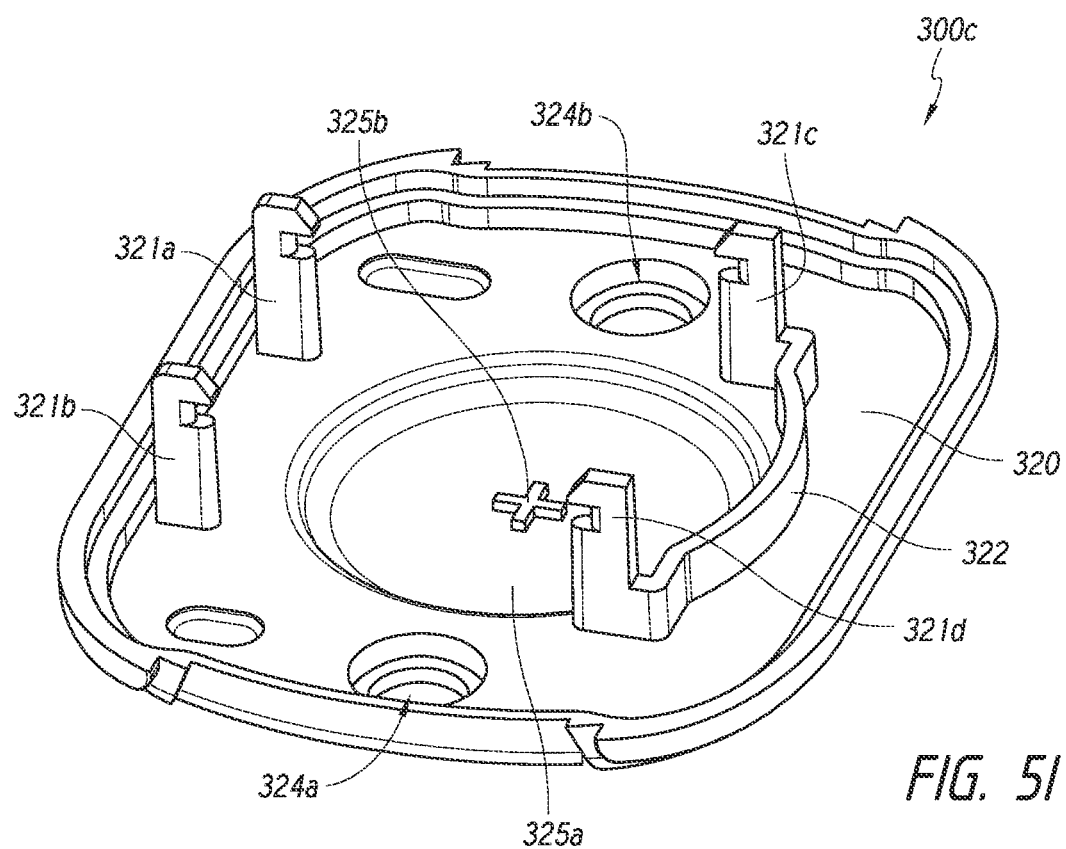
FIGS. 5I-5J illustrate top perspective views of a second portion of the housing of the hub of FIGS. 5A-5B in accordance with aspects of this disclosure.
Figure 5J:
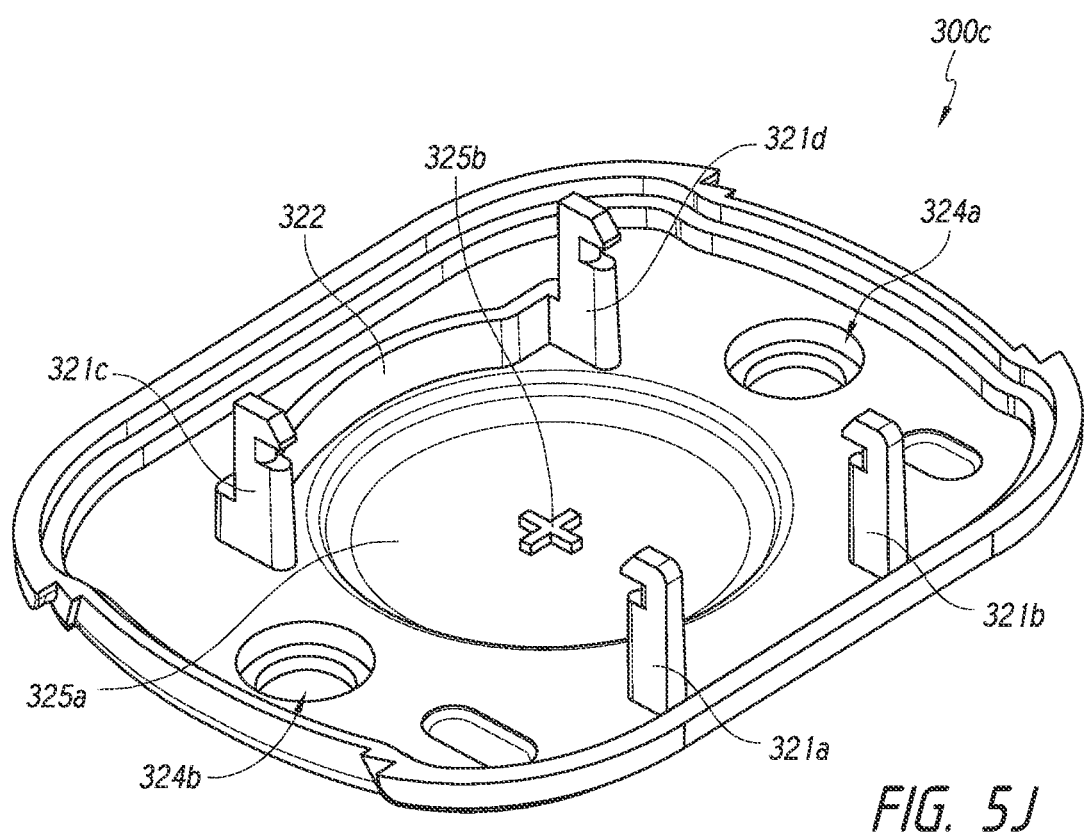
Figure 5K:
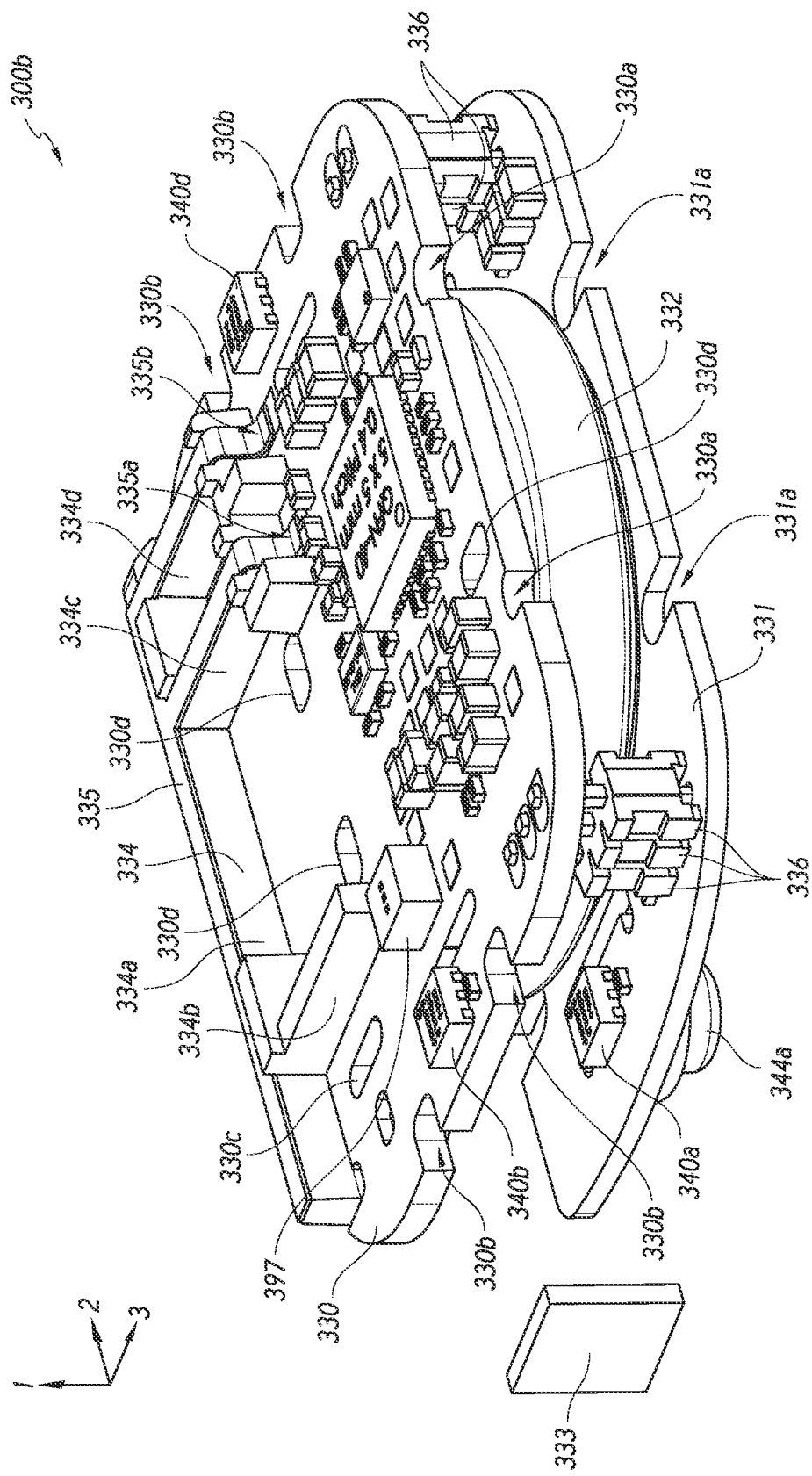
FIGS. 5K-5L illustrate top perspective views of a portion of the hub of FIGS. 5A-5B in accordance with aspects of this disclosure.
Figure 5L:
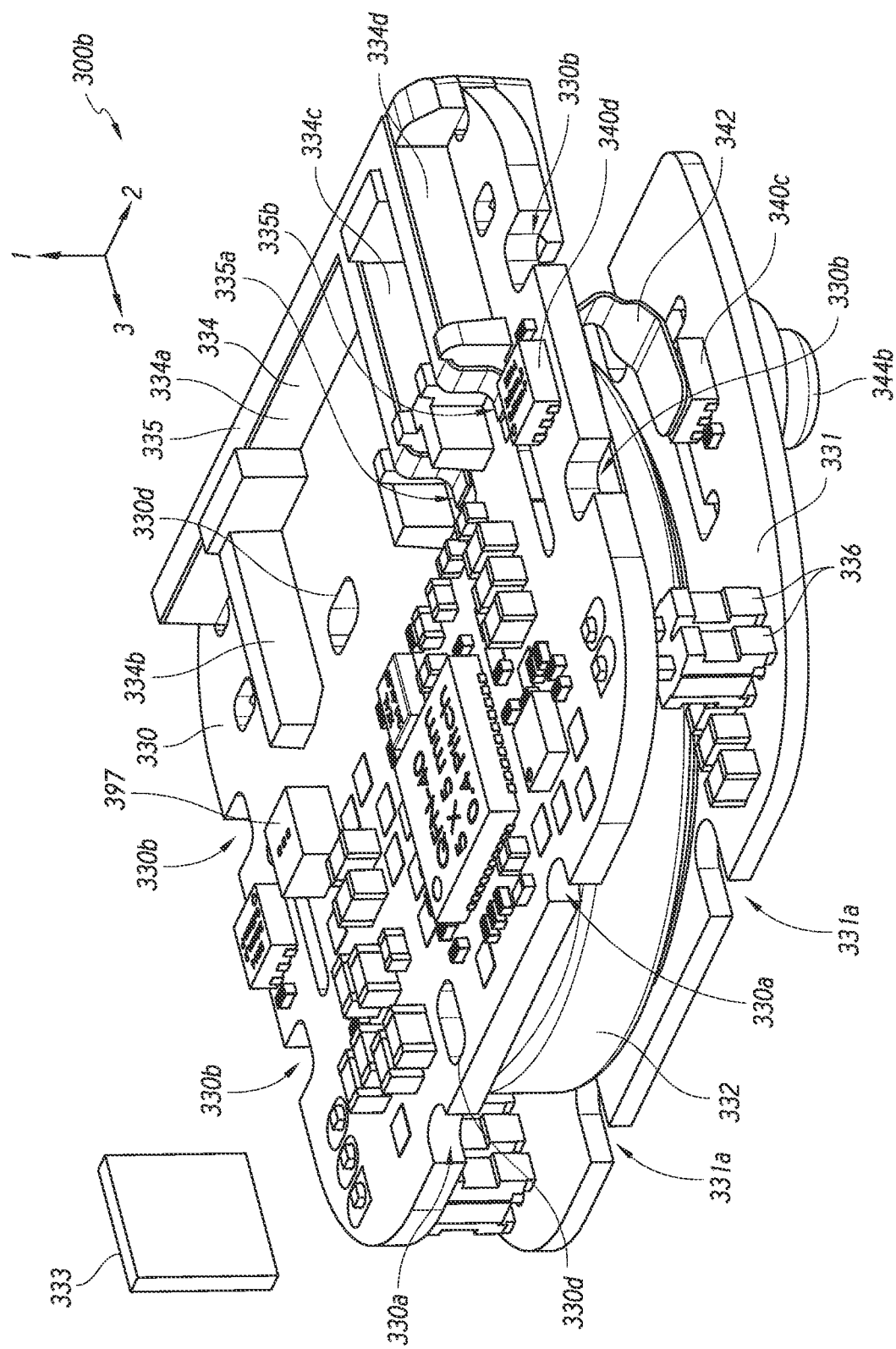
Figure 5M:
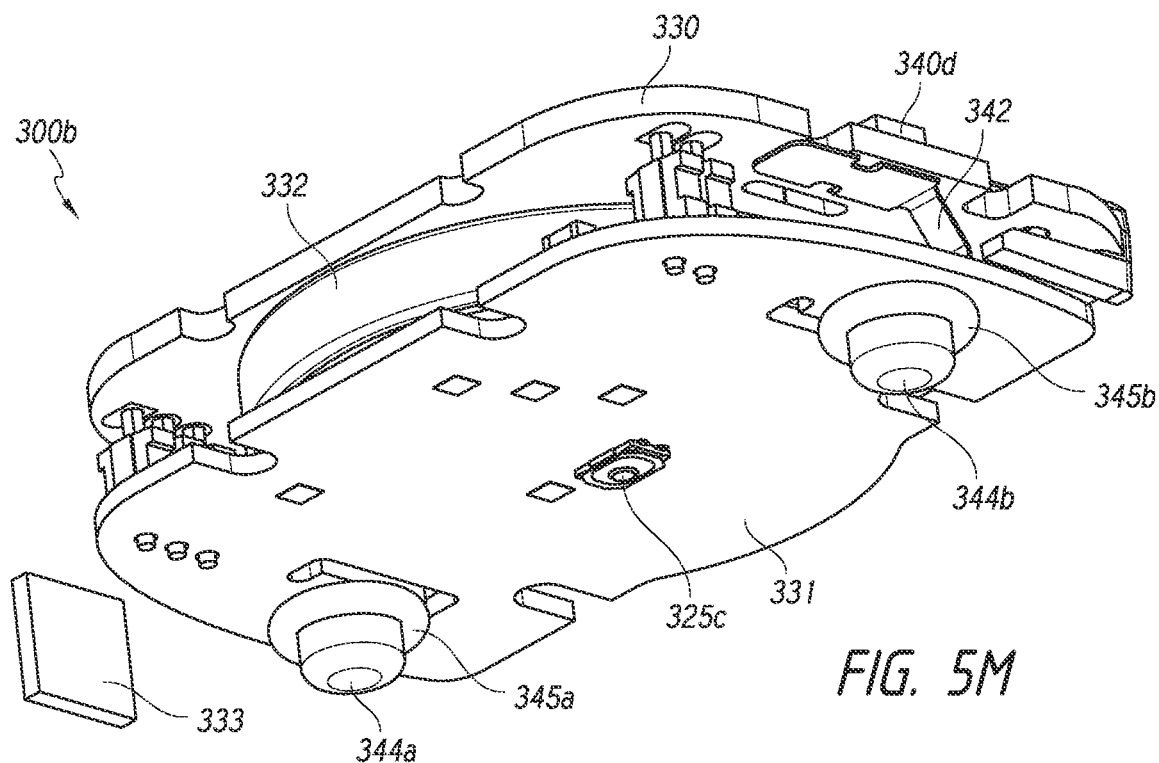
FIGS. 5M-5N illustrate bottom perspective views of the portion of the hub of FIGS. 5K-5L in accordance with aspects of this disclosure.
Figure 5N:
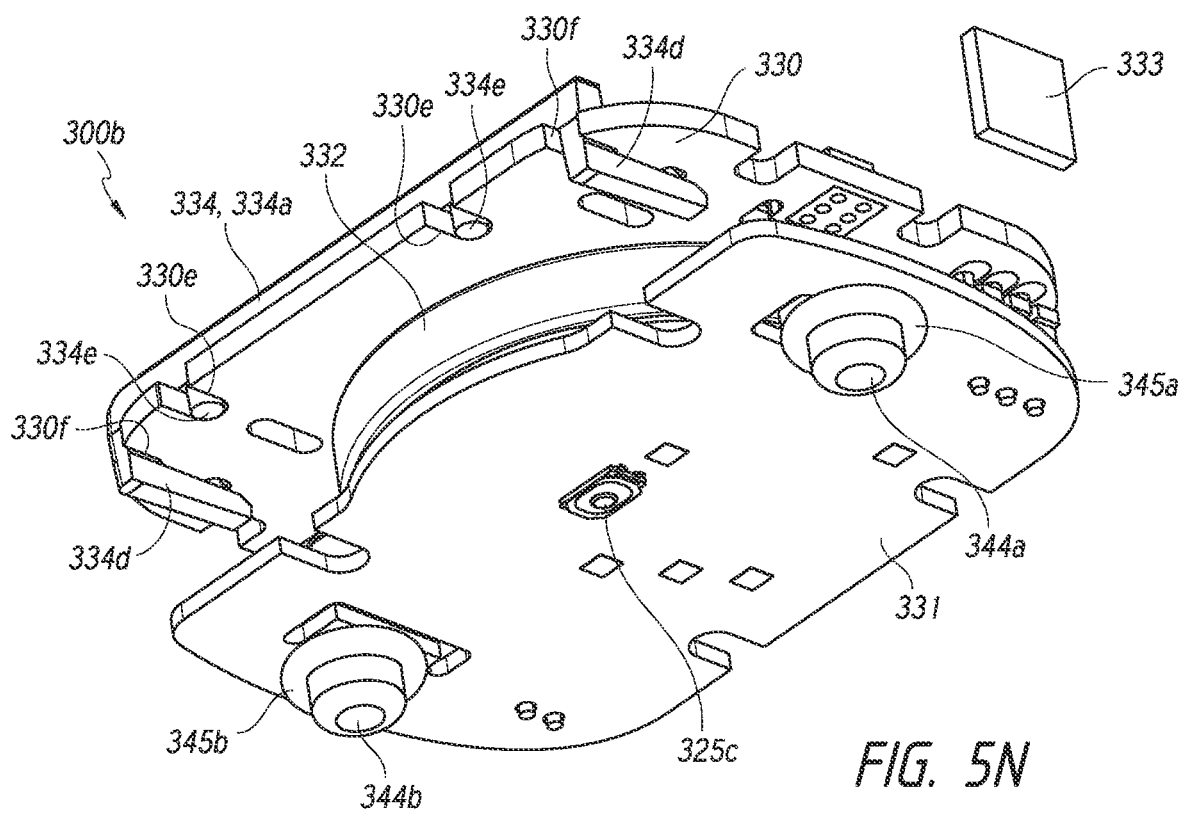
Figure 50:
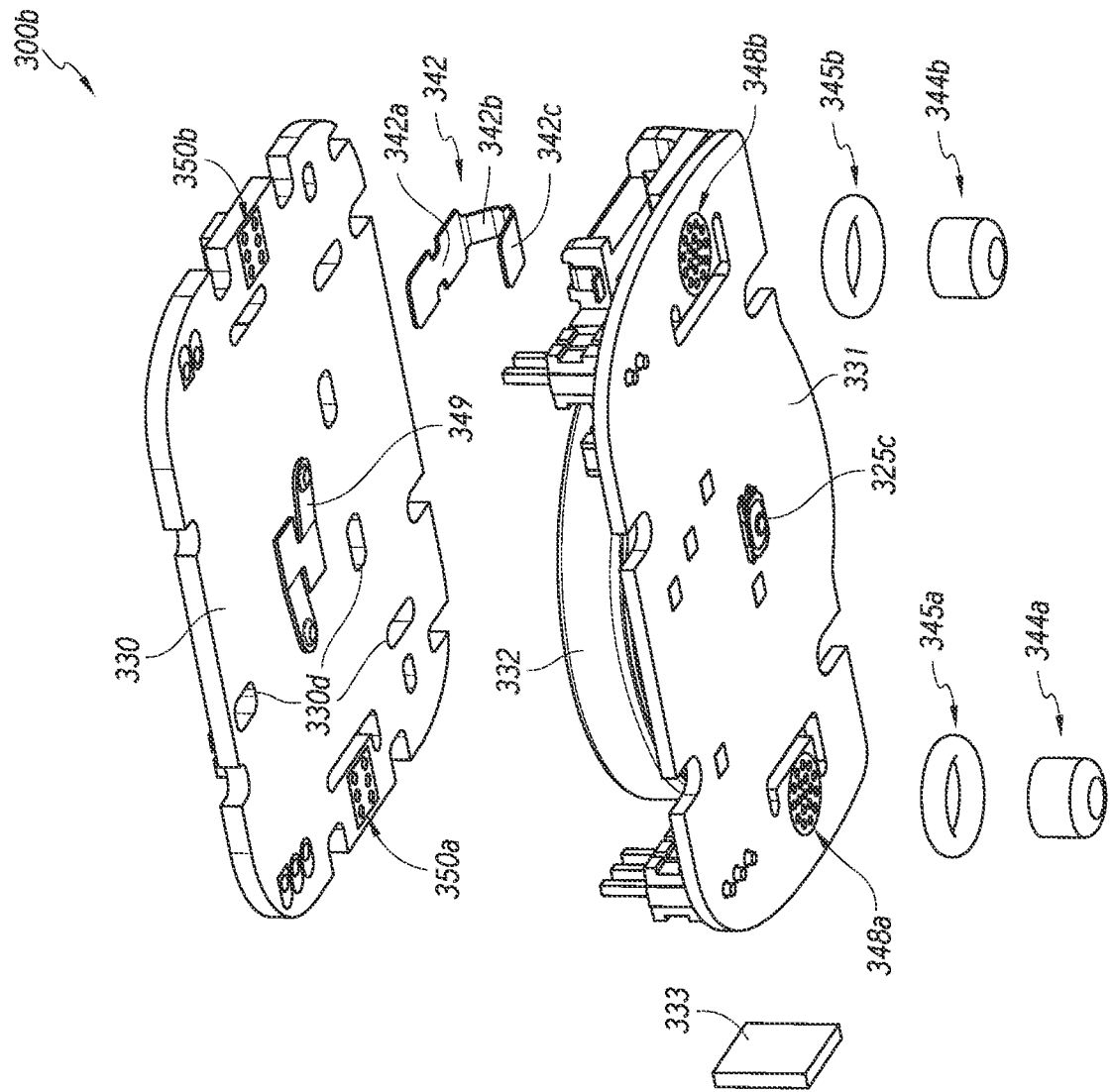
Figure 5P:
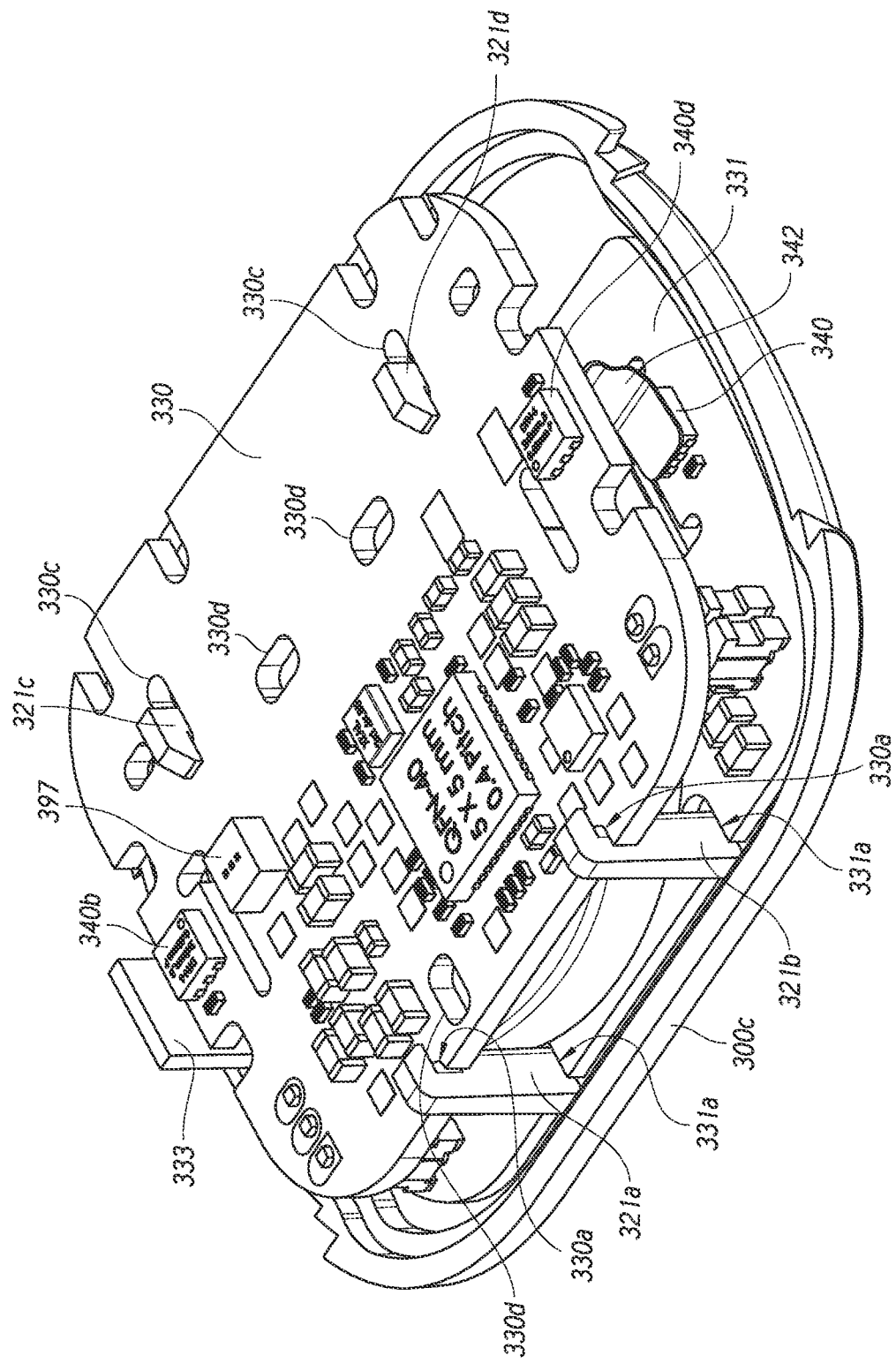
FIG. 5P illustrates a top perspective view of the portion of the hub of FIGS. 5K-5L and the second portion of the housing of FIGS. 5I-5J in accordance with aspects of this disclosure.
Figure 5Q:
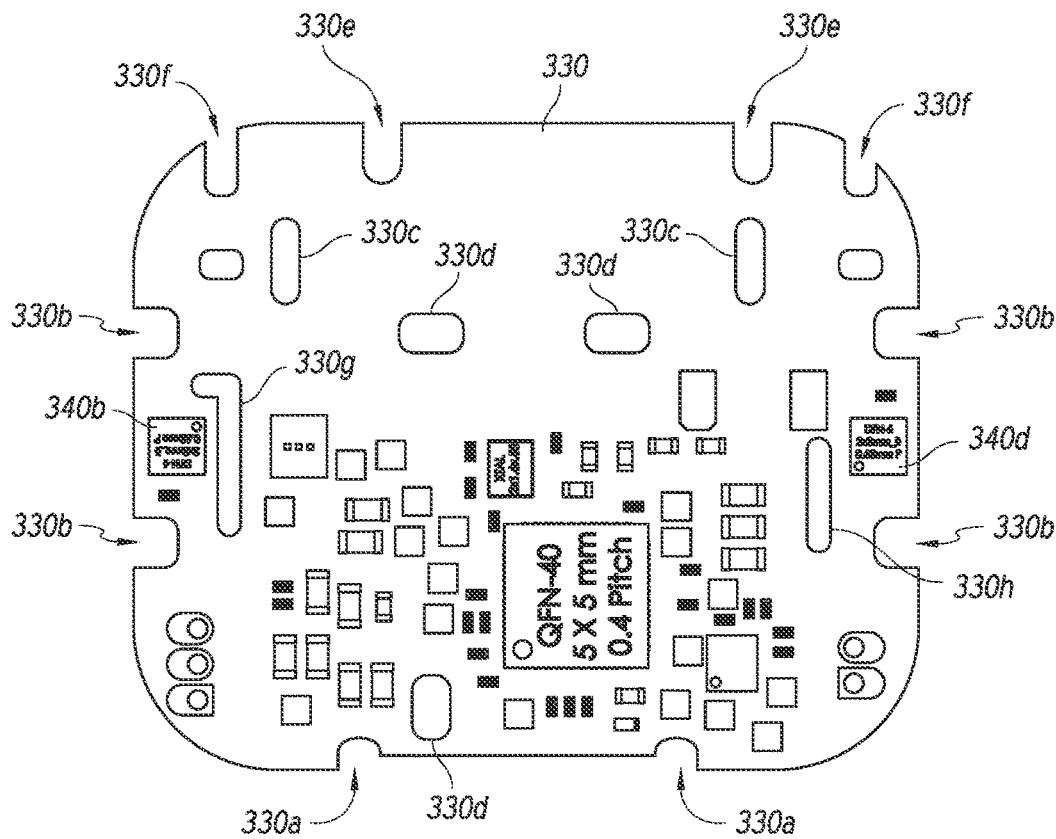
FIG. 5Q illustrates a top view of a circuit board of the hub of FIGS. 5A-5B in accordance with aspects of this disclosure.
Figure 5R:
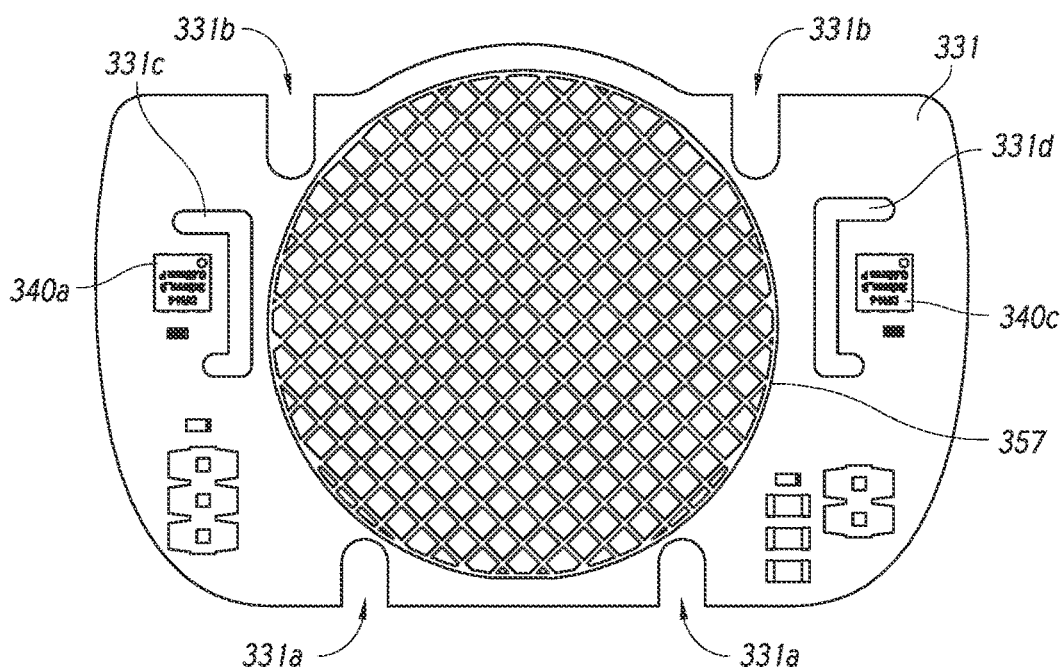
FIG. 5R illustrates a top view of another circuit board of the hub of FIGS. 5A-5B in accordance with aspects of this disclosure.
Figure 5S:
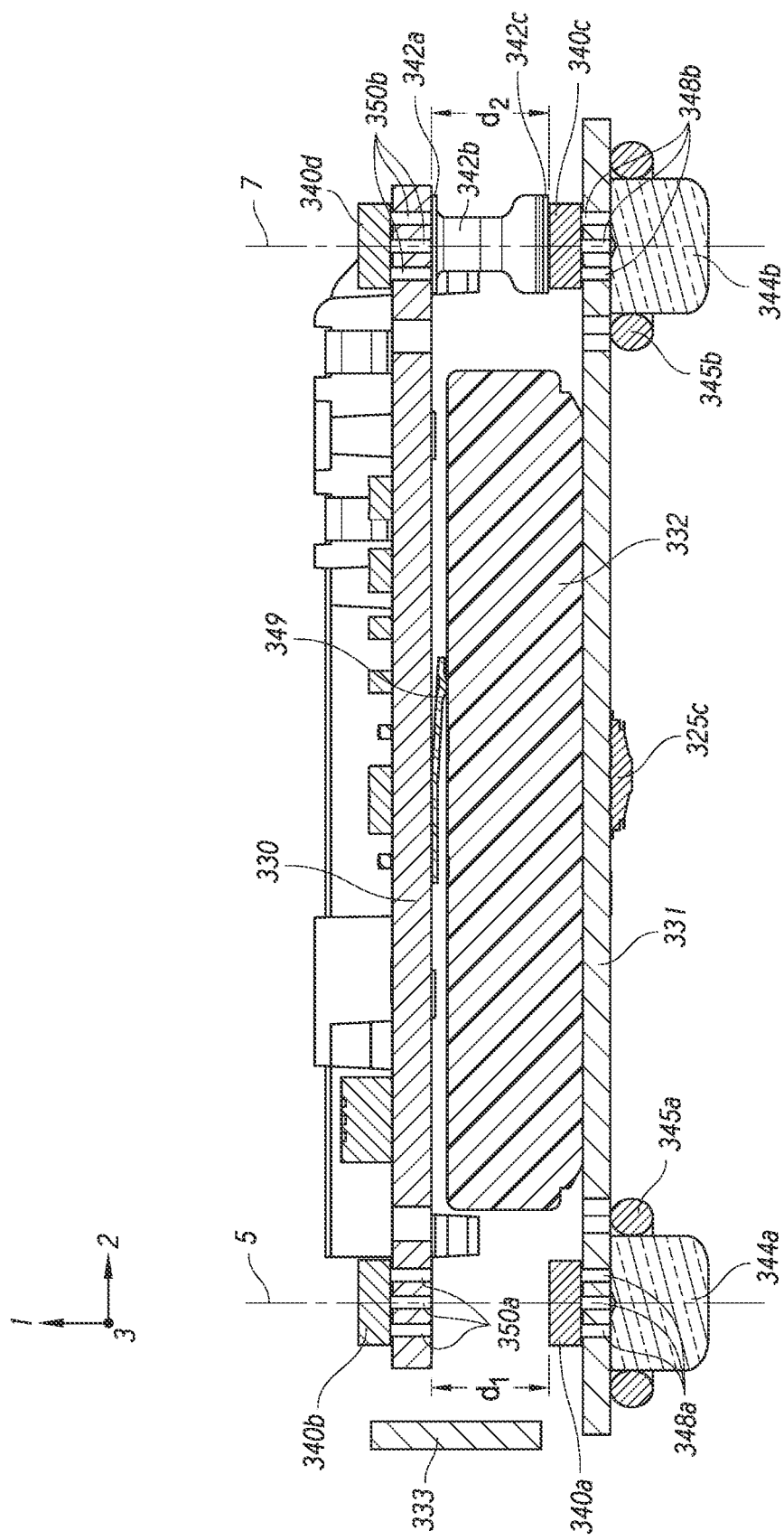
FIG. 5S illustrates a cross-sectional view through the portion of the hub as shown in FIGS. 5E-5F in accordance with aspects of this disclosure.
Figure 5T:
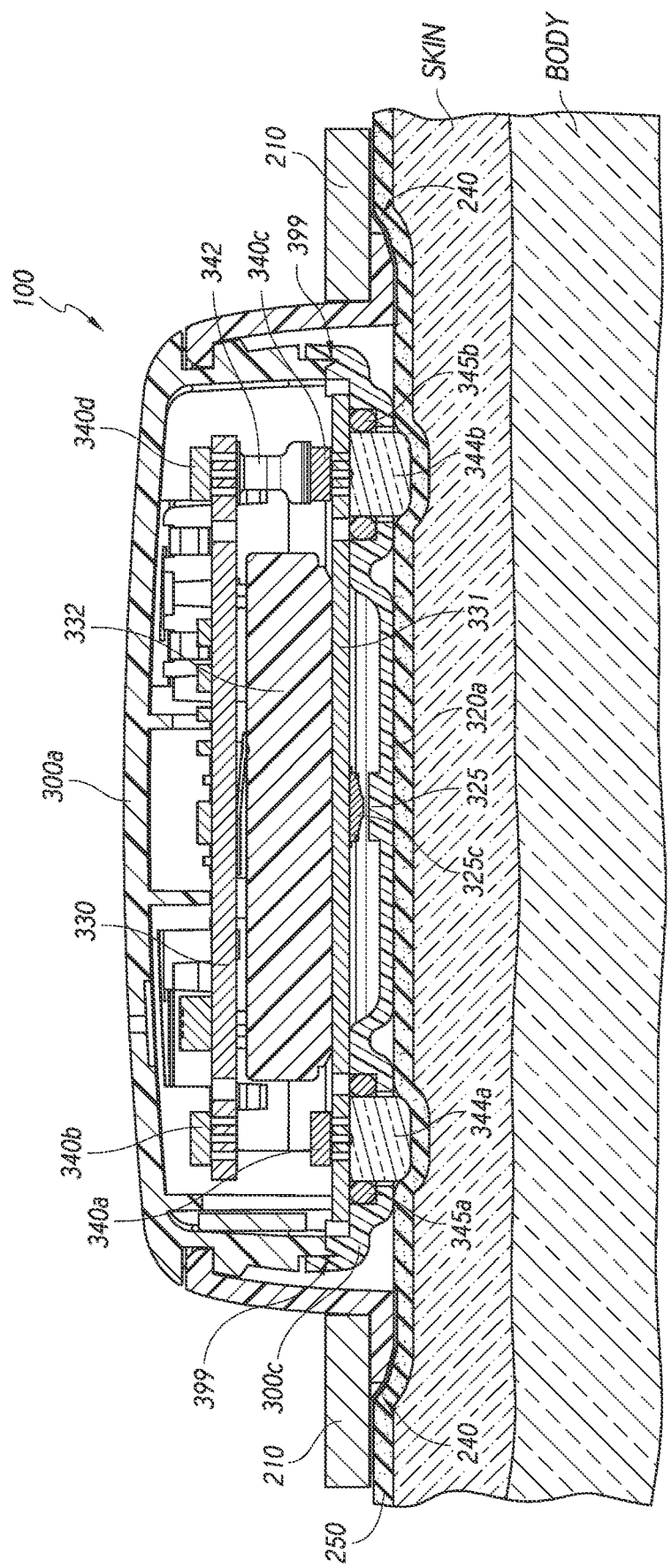
FIG. 5T illustrates a cross-sectional view through the wearable device as shown in FIG. 1C in accordance with aspects of this disclosure.

FIG. 5T, discussed in more detail below, illustrates an example cross-section taken through wearable device 100 when wearable device 100 is secured to skin of a subject. As illustrated in FIG. 5T and as discussed further below, wearable device 100 can include thermally conductive probes 344a, 344b that extend toward the subject's skin and transmit thermal energy from the skin in a direction towards temperature sensors of wearable device 100 (such as temperature sensors 340a, 340c discussed further below). As also discussed below, the thermally conductive probes 344a, 344b can indirectly contact (for example, via substrate 250) and/or apply pressure to the subject's skin, which can facilitate thermal transmissivity. In some implementations, the thermally conductive probes 344a, 344b do not contact the subject's skin when wearable device 100 is secured to the subject. For example, the substrate 250 can be positioned between the thermally conductive probes 344a, 344b and the subject's skin when wearable device 100 is secured to the subject as shown.

Figure 1A:
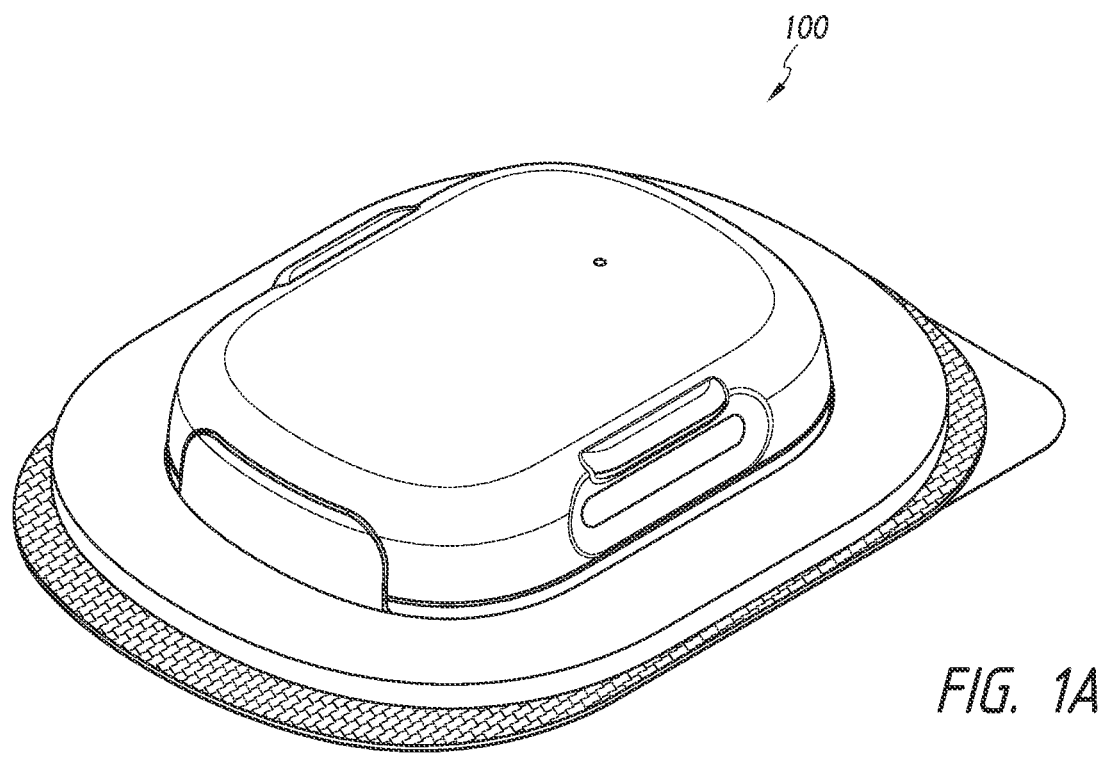
FIGS. 1A-1B illustrate top perspective views of a wearable device in accordance with aspects of this disclosure.
Figure 1B:
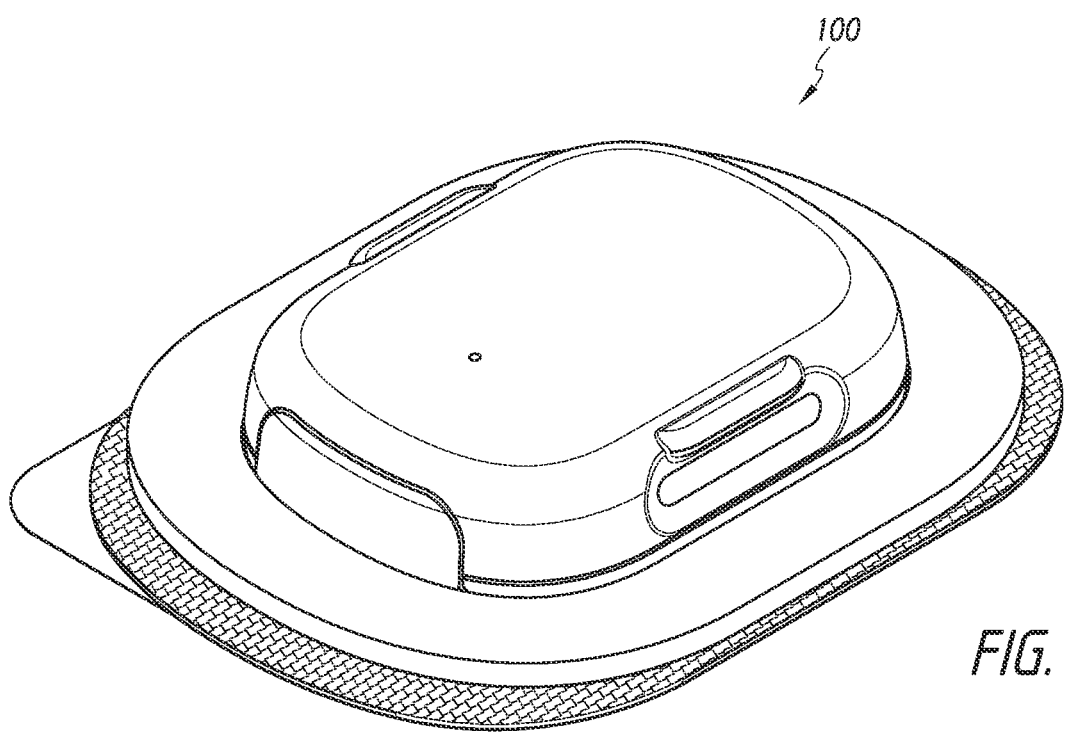
Figure 1C:
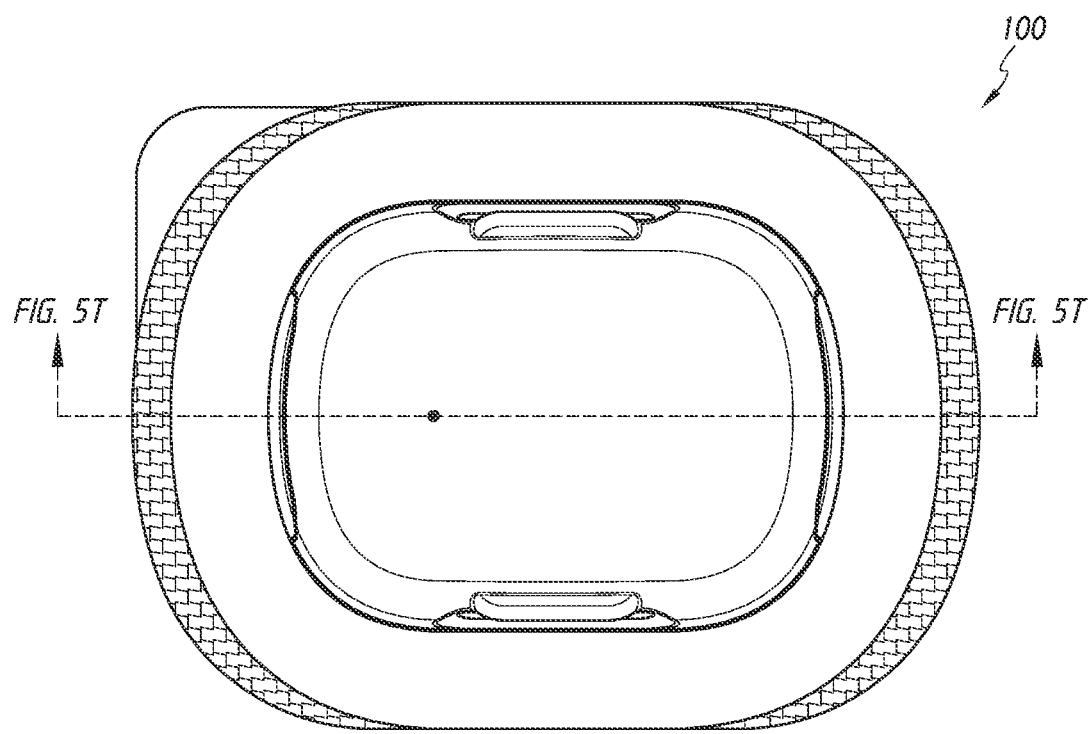
FIG. 1C illustrates a top view of the wearable device of FIGS. 1A-1B in accordance with aspects of this disclosure.
Figure 1D:
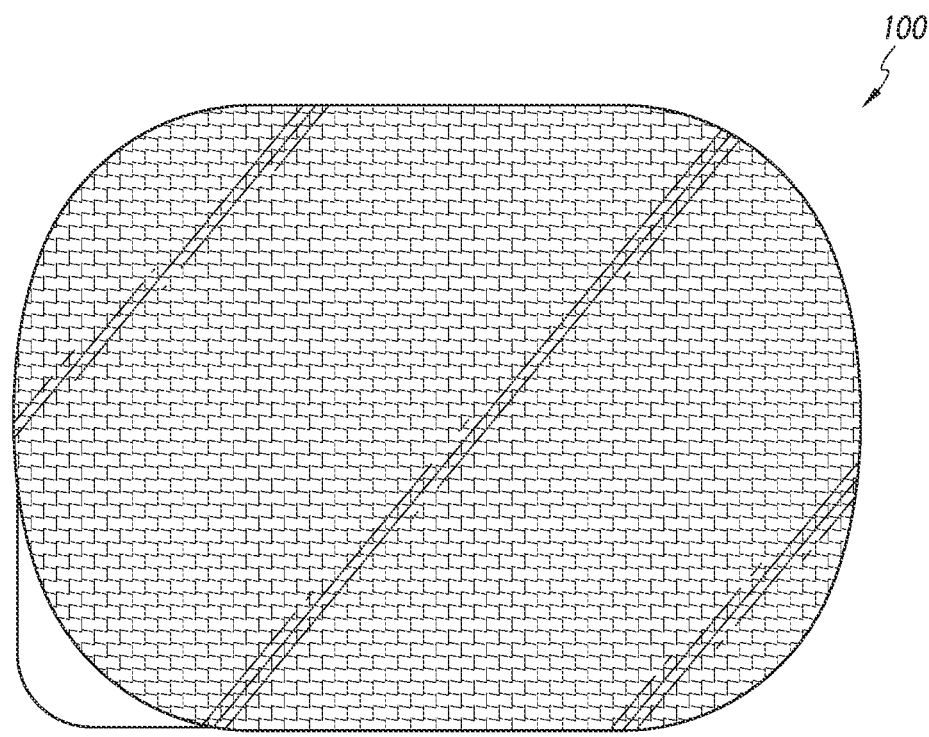
FIG. 1D illustrates a bottom view of the wearable device of FIGS. 1A-1B in accordance with aspects of this disclosure.
Figure 1E:
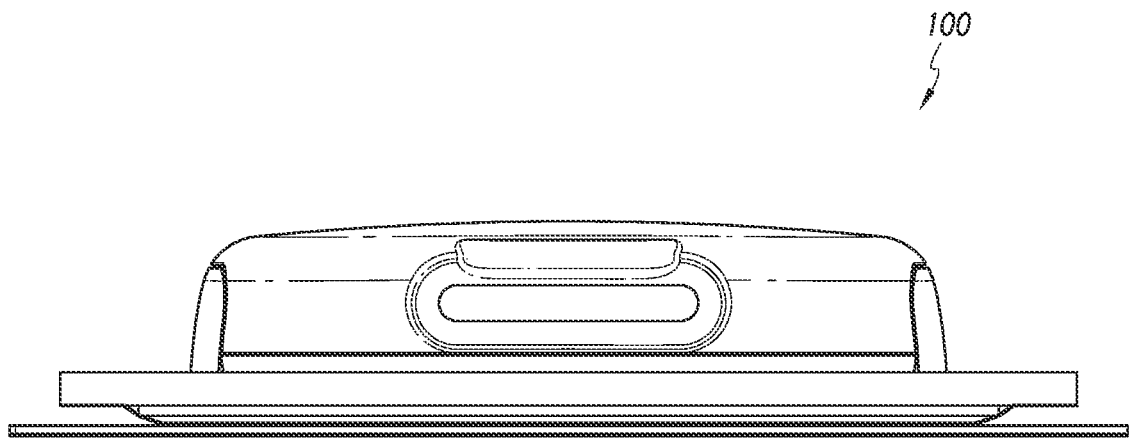
FIG. 1E illustrates a side view of the wearable device of FIGS. 1A-1B in accordance with aspects of this disclosure.
Figure 1F:
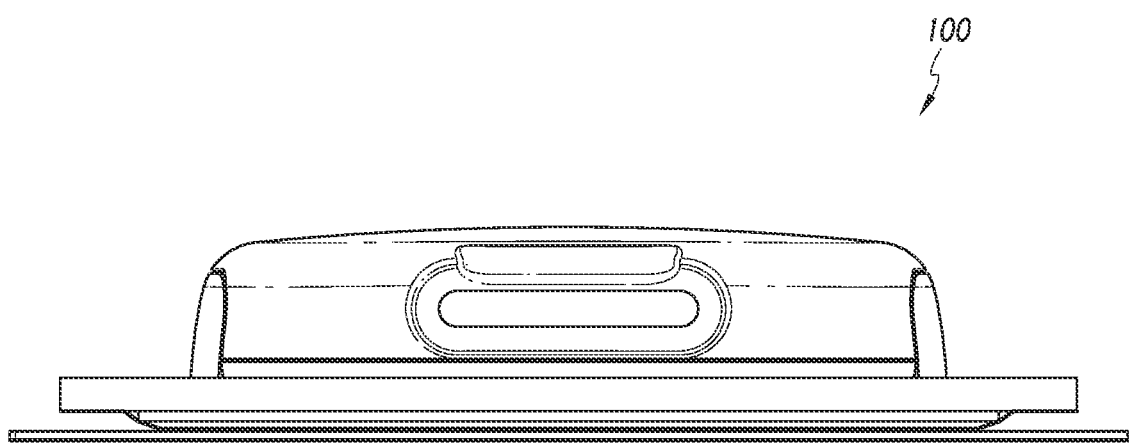
FIG. 1F illustrates another side view of the wearable device of FIGS. 1A-1B in accordance with aspects of this disclosure.
Figure 1G:
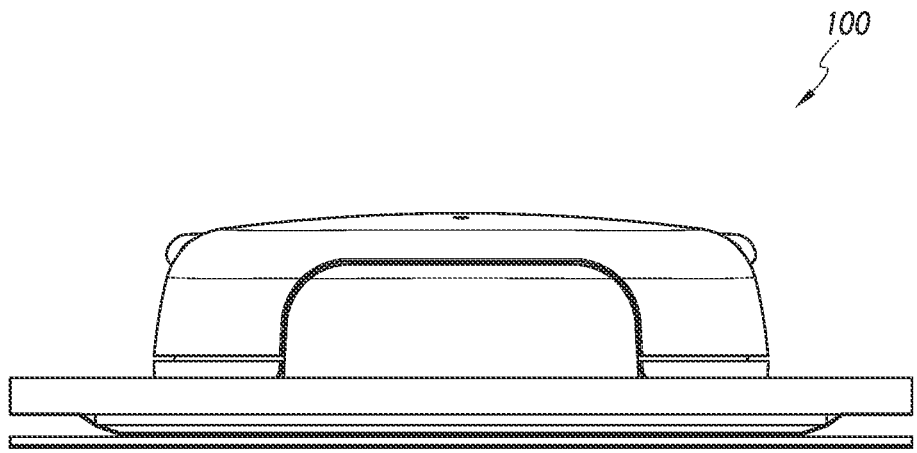
FIG. 1G illustrates a front view of the wearable device of FIGS. 1A-1B in accordance with aspects of this disclosure.
Figure 1H:
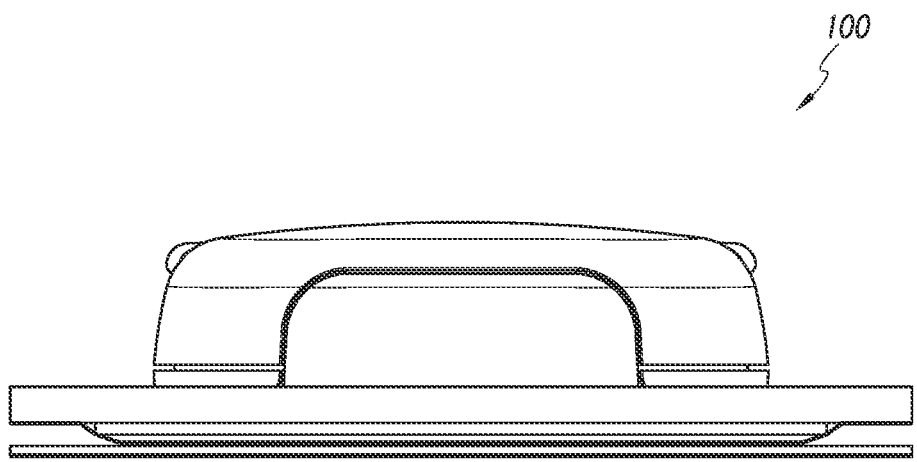
FIG. 1H illustrates a back view of the wearable device of FIGS. 1A-1B in accordance with aspects of this disclosure.
Figure 2:
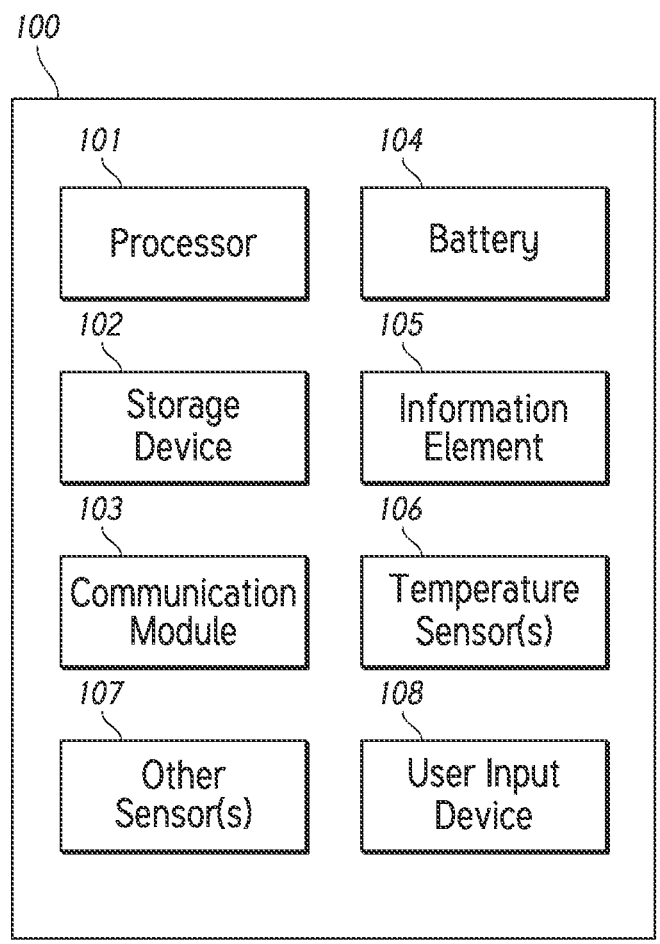
FIG. 2 illustrates a schematic block diagram of the wearable device of FIGS. 1A-1B in accordance with aspects of this disclosure.

FIG. 2 illustrates an example schematic block diagram of wearable device 100. As shown, wearable device 100 can include a processor 101, a storage device 102, a communication module 103, a battery 104, an information element 105, and/or one or more temperature sensors 106. The processor 101 can be configured, among other things, to process data, execute instructions to perform one or more functions, and/or control the operation of wearable device 100. For example, the processor 101 can process physiological data obtained from wearable device 100 and can execute instructions to perform functions related to storing and/or transmitting such physiological data. For example, the processor 101 can process data received from one or more temperature sensors 106 and/or one or more other sensors 107 and can execute instructions to perform functions related to storing and/or transmitting such received data. Additionally or alternatively, processor 101 can process raw data (for example, signal(s)) generated by the one or more temperature sensors 106 and determine body temperature value(s). In some implementations, wearable device 100 includes a plurality of processors (such as two, three, four, or five or more) that can carry out any of the functions described herein with respect to processor 101 (or any of the other processors described herein).

The storage device 102 can include one or more memory devices that store data, including without limitation, dynamic and/or static random access memory (RAM), programmable read-only memory (PROM), erasable programmable read-only memory (EPROM), electrically erasable programmable read-only memory (EEPROM), and the like. Such stored data can be processed and/or unprocessed physiological data obtained from wearable device 100, for example.

The communication module 103 can facilitate communication (via wired and/or wireless connection) between wearable device 100 (and/or components thereof) and separate devices, such as separate monitoring and/or mobile devices. For example, the communication module 103 can be configured to allow wearable device 100 to wirelessly communicate with other devices, systems, and/or networks over any of a variety of communication protocols. The communication module 103 can be configured to use any of a variety of wireless communication protocols, such as Wi-Fi (802.11x), Bluetooth®, ZigBee®, Z-wave®, cellular telephony, infrared, near-field communications (NFC), RFID, satellite transmission, proprietary protocols, combinations of the same, and the like. The communication module 103 can allow data and/or instructions to be transmitted and/or received to and/or from wearable device 100 and separate computing devices. The communication module 103 can be configured to transmit (for example, wirelessly) processed and/or unprocessed physiological or other information to separate computing devices, which can include, among others, a mobile device (for example, an iOS or Android enabled smartphone, tablet, laptop), a desktop computer, a server or other computing or processing device for display and/or further processing, among other things. Such separate computing devices can be configured to store and/or further process the received physiological and/or other information, to display information indicative of or derived from the received information, and/or to transmit information—including displays, alarms, alerts, and notifications—to various other types of computing devices and/or systems that may be associated with a hospital, a caregiver (for example, a primary care provider), and/or a user (for example, an employer, a school, friends, family) that have permission to access the subject's data. As another example, the communication module 103 of wearable device 100 can be configured to wirelessly transmit processed and/or unprocessed obtained physiological information and/or other information (for example, motion and/or location data) to a mobile phone which can include one or more hardware processors configured to execute an application that generates a graphical user interface displaying information representative of the processed or unprocessed physiological and/or other information obtained from wearable device 100. The communication module 103 can be embodied in one or more components that are in communication with each other. The communication module 103 can comprise a wireless transceiver and/or a near field communication (NFC) component. In some implementations, communication module 103 is embodied in an antenna (such as antenna 335) and/or an NFC chip (such as NFC chip 333).

Wearable device 100 can include a battery 104. The battery 104 can provide power for hardware components of wearable device 100 described herein. The battery 104 can be, for example, battery 332, described in more detail below. The battery 104 can be, for example, a lithium battery. Additionally or alternatively, wearable device 100 can be configured to obtain power from a power source that is external to wearable device 100. For example, wearable device 100 can include or can be configured to connect to a cable which can itself connect to an external power source to provide power to wearable device 100.

Wearable device 100 can include an information element 105. The information element 105 can be a memory storage element that stores, in non-volatile memory, information used to help maintain a standard of quality associated with wearable device 100. Illustratively, the information element 105 can store information regarding whether wearable device 100 has been previously activated and whether wearable device 100 has been previously operational for a prolonged period of time, such as, for example, four hours, one day, two days, five days, ten days, twenty days. The information stored in the information element 105 can be used to help detect improper re-use of wearable device 100, for example.

With continued reference to FIG. 2, wearable device 100 can include a user input device 108 that can allow a subject (or a caregiver) to interact with wearable device 100. User input device 108 can be utilized to transition wearable device 100 from a non-operational mode to an operational mode and vice versa, for example, or carry out other actions. Button 325 (see FIG. 5C), discussed further below, can be an implementation of user input device 108. As also discussed further below, button 325 can include an actuator portion (for example, pad 325a and protrusion 325b in FIGS. 5I-5J) and a switch (such as switch 325c in FIGS. 5M-5N).

As shown in FIG. 2, wearable device 100 can include one or more temperature sensors 106 that can be used to continuously or periodically obtain temperature data of a subject. Advantageously, in some implementations, the processor 101 can compare temperature data from more than one temperature sensor 106 to more accurately determine body temperature of the subject. In some variants, wearable device 100 includes one or more temperature sensors 106 and also includes one or more other sensors 107, such as one or more of an accelerometer, a gyroscope, a magnetometer, an oximetry sensor, a moisture sensor, an impedance sensor, an acoustic/respiration sensor, and/or an ECG sensor. In some implementations, wearable device 100 includes one or more temperature sensors 106 and does not include an accelerometer, a gyroscope, a magnetometer, an oximetry sensor, a moisture sensor, an impedance sensor, an acoustic/respiration sensor, and/or an ECG sensor, which can advantageously help conserve battery and processing power and preserve processing capabilities of wearable device 100 where continuous or periodic body temperature values are being determined and/or transmitted. In some implementations, the only type of physiological parameter measured and/or monitored by wearable device 100 is body temperature. Temperature sensors 340a, 340b, 340c, 340d, each of which are discussed in more detail below, can be implementations of the one or more temperature sensors 106. The processor 101 of wearable device 100 can be configured to process obtained physiological information. For example, the processor 101 can be configured to determine body temperature of a user by utilization of one or more temperature sensors 106. Each of the one or more temperature sensors 106 can generate one or more signals responsive to detected thermal energy and such one or more signals can be received by processor 101 for determination of body temperature value(s). Additionally or alternatively, each of the one or more temperature sensors 106 can determine temperature values and transmit such temperature values to processor 101 for determination of body temperature value(s). The one or more temperature sensors 106 can be thermistors or integrated circuit (IC) temperature sensors, for example.

In some implementations, portions of wearable device 100 can be removable from each other. For example, in some implementations, wearable device 100 includes two separable components (which may also be referred to as "first" and "second" portions of wearable device 100). In some of such implementations, wearable device 100 includes a first component (which may be referred to as a "first portion") that can secure (for example, removably secure) to skin of a subject. Additionally, in some of such implementations, wearable device 100 includes a second component (which may be referred to as a "second portion"). Such second portion can include various electronic components, for example, any of those discussed with respect to FIG. 2 and/or any of those discussed with respect to hub 300 further below. Such first portion can include one or more substrates configured to adhere (for example, removably adhere) to skin. In some implementations, such first portion does not include any electronic components, for example, where any and all electronic components of wearable device 100 are contained in the second portion of wearable device 100. Such first and second portions can be configured to mechanical removably secure to one another. In some implementations, such first and second portions are configured to be difficult to detach from one another if the first portion is secured to the user. In some implementations, the intended service lives of the first and second portions are different. For example, the intended service life of the first portion can be less than the intended service life of the second portion, such as where the first portion includes one or more substrates that secure to the user's skin and where the second portion includes electronic components of wearable device 100. In such implementations, the first portion can be disposed of and replaced and the second portion can be secured with a new first portion. This is advantageous where substrate(s) of such first portion lose integrity and/or become degraded after an amount of time than is less than a battery life of the second portion. Implementations of such first and second portions of wearable device 100 can be dock 200 and hub 300 (respectively) discussed further below.

Figure 3A:
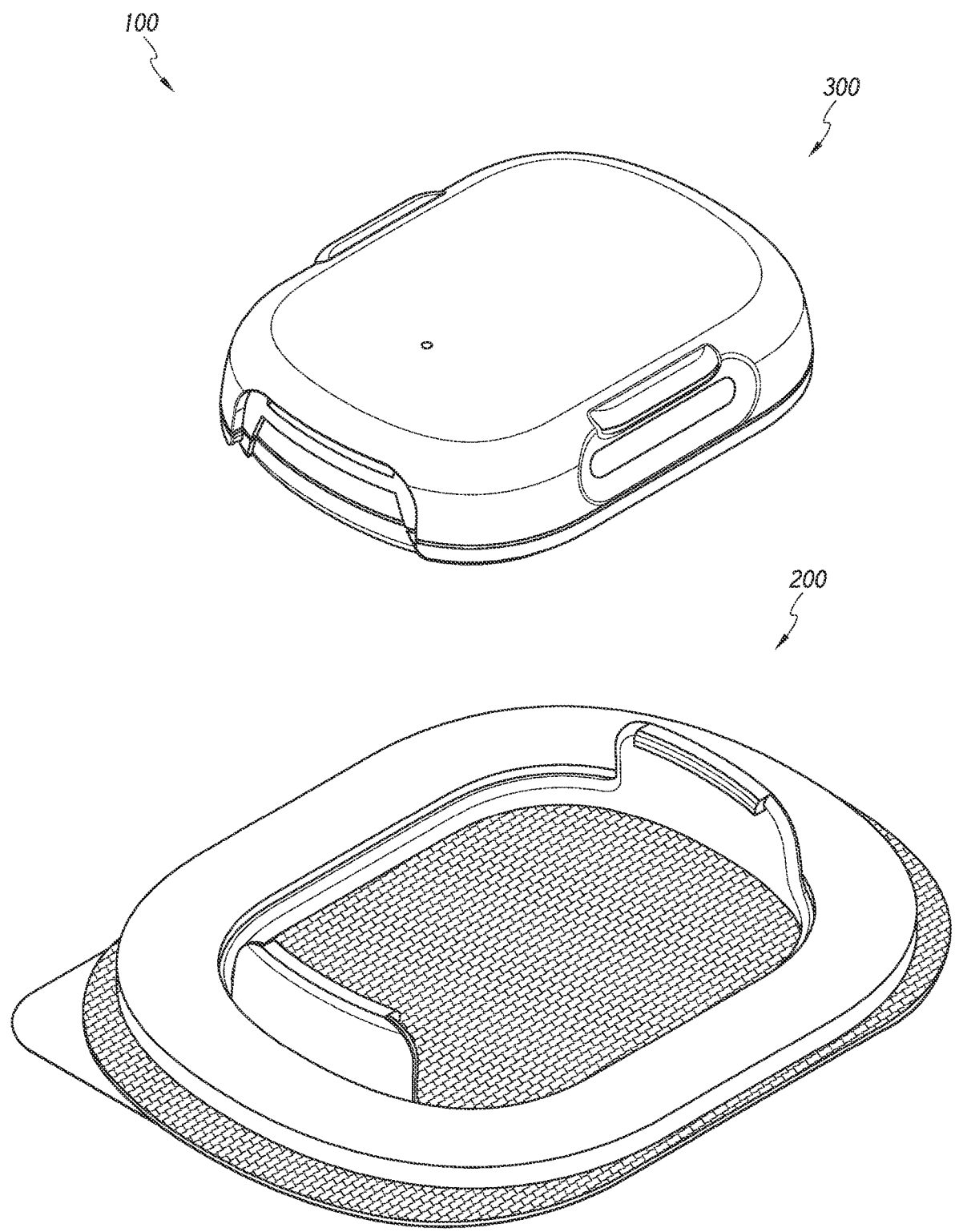
FIGS. 3A-3B illustrate top perspective views of a hub and a dock of the wearable device of FIGS. 1A-1B separated from one another in accordance with aspects of this disclosure.
Figure 3B:
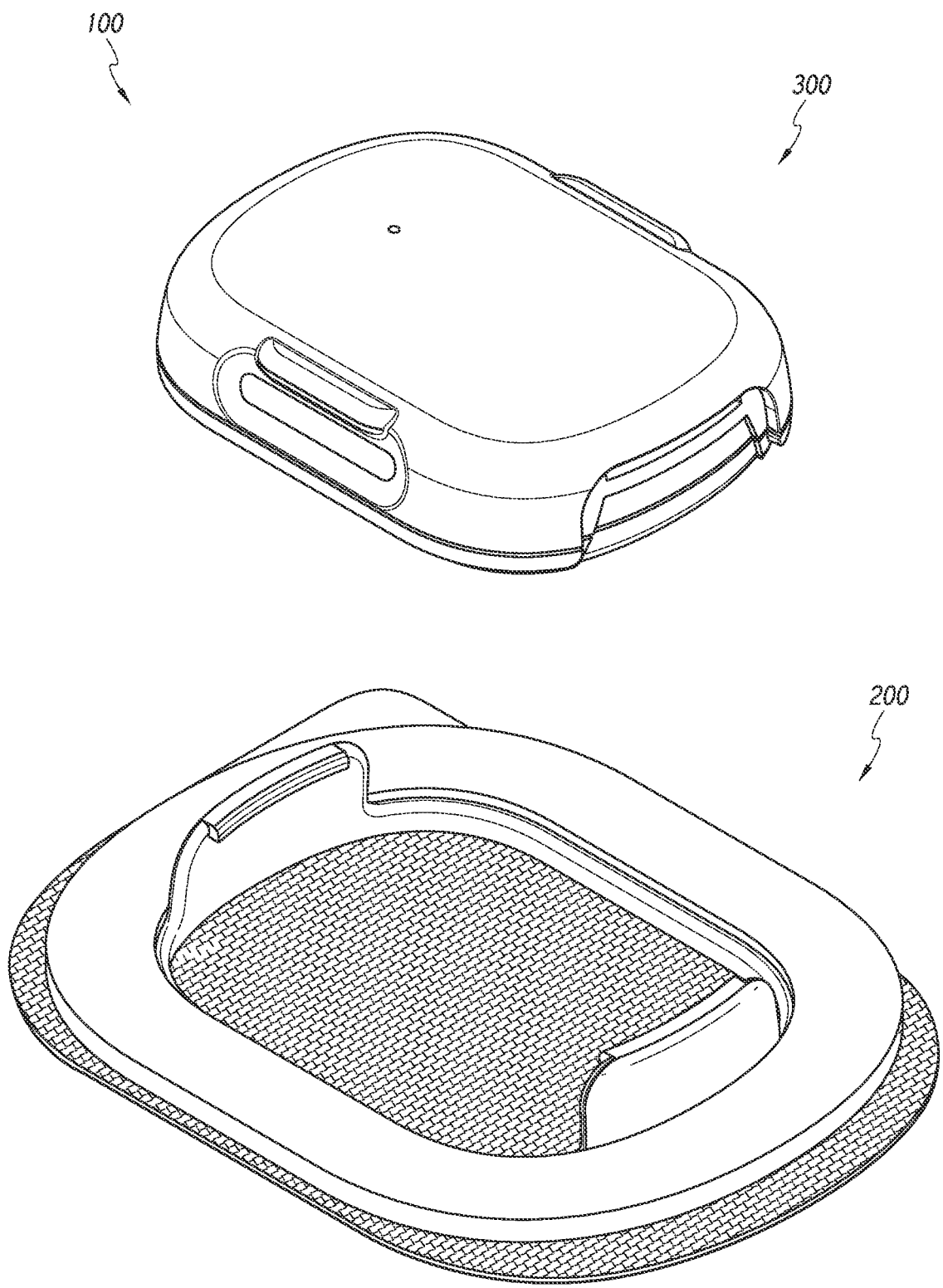

FIGS. 3A-3B illustrate perspective views of dock 200 and hub 300 of wearable device 100 separated from one another, whereas FIGS. 1A-1H illustrates dock 200 and hub 300 attached to one another. FIGS. 4A-4E illustrate various views of dock 200 or portions thereof, while FIGS. 5A-5S illustrate various views of hub 300 or portions thereof.

Figure 4A:
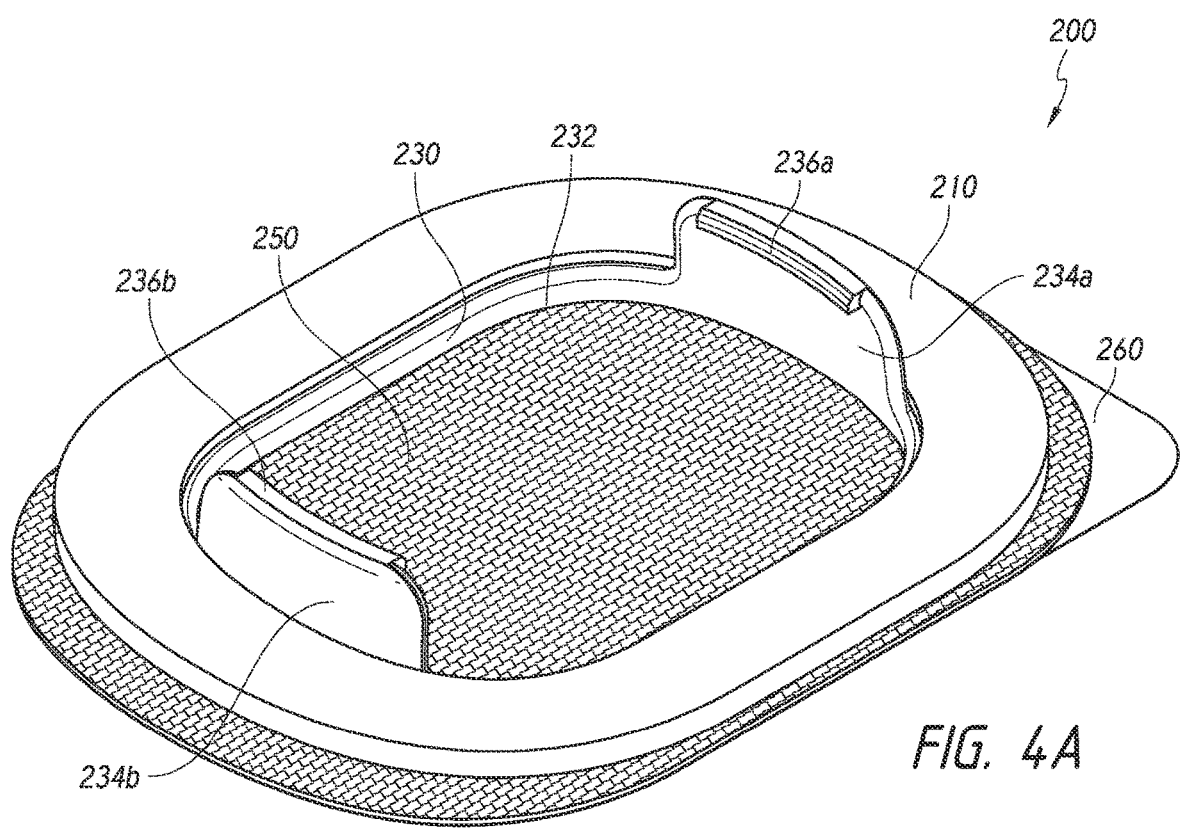
FIGS. 4A-4B illustrate top perspective views of the dock of FIGS. 3A-3B in accordance with aspects of this disclosure.
Figure 4B:
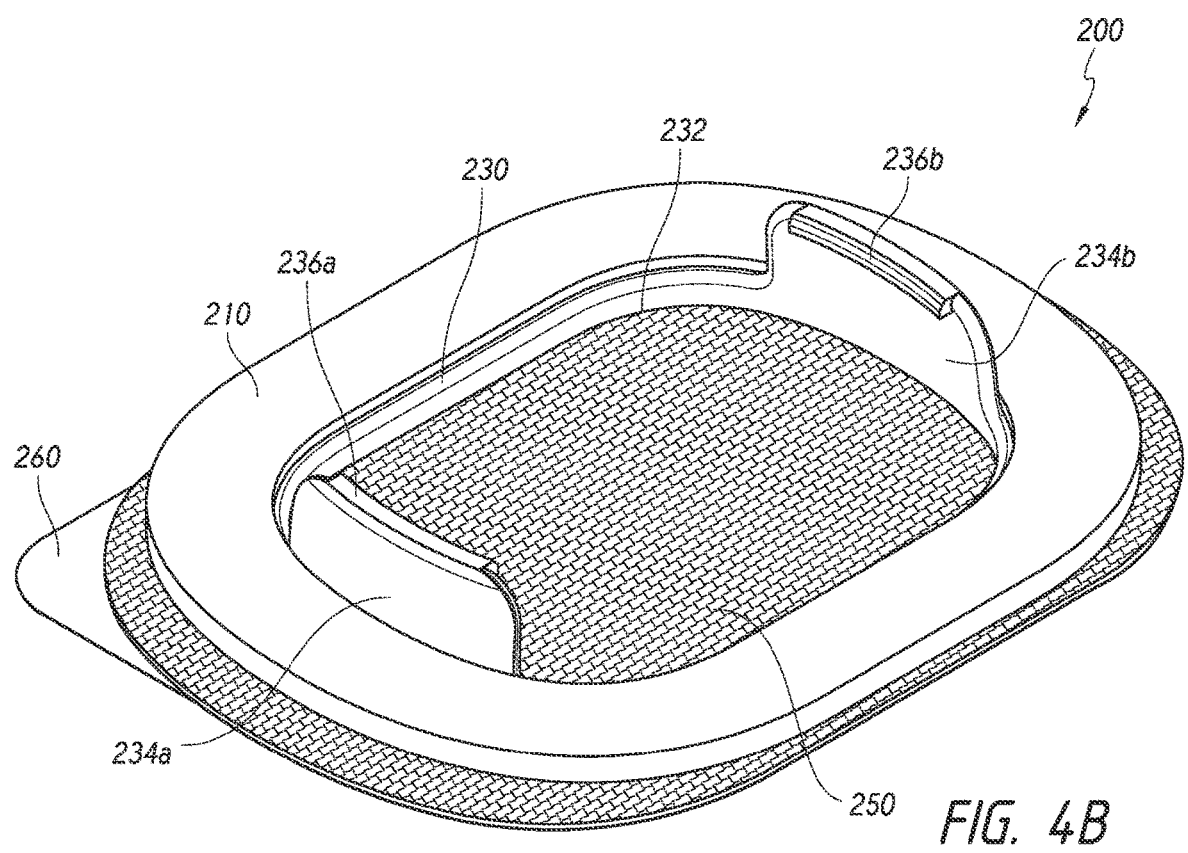
Figure 4C:
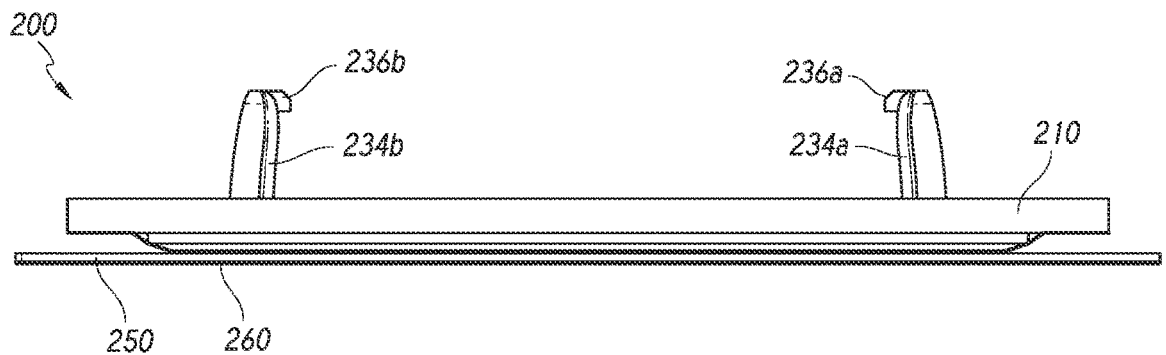
FIG. 4C illustrates a side view of the dock of FIGS. 4A-4B in accordance with aspects of this disclosure.
Figure 4D:
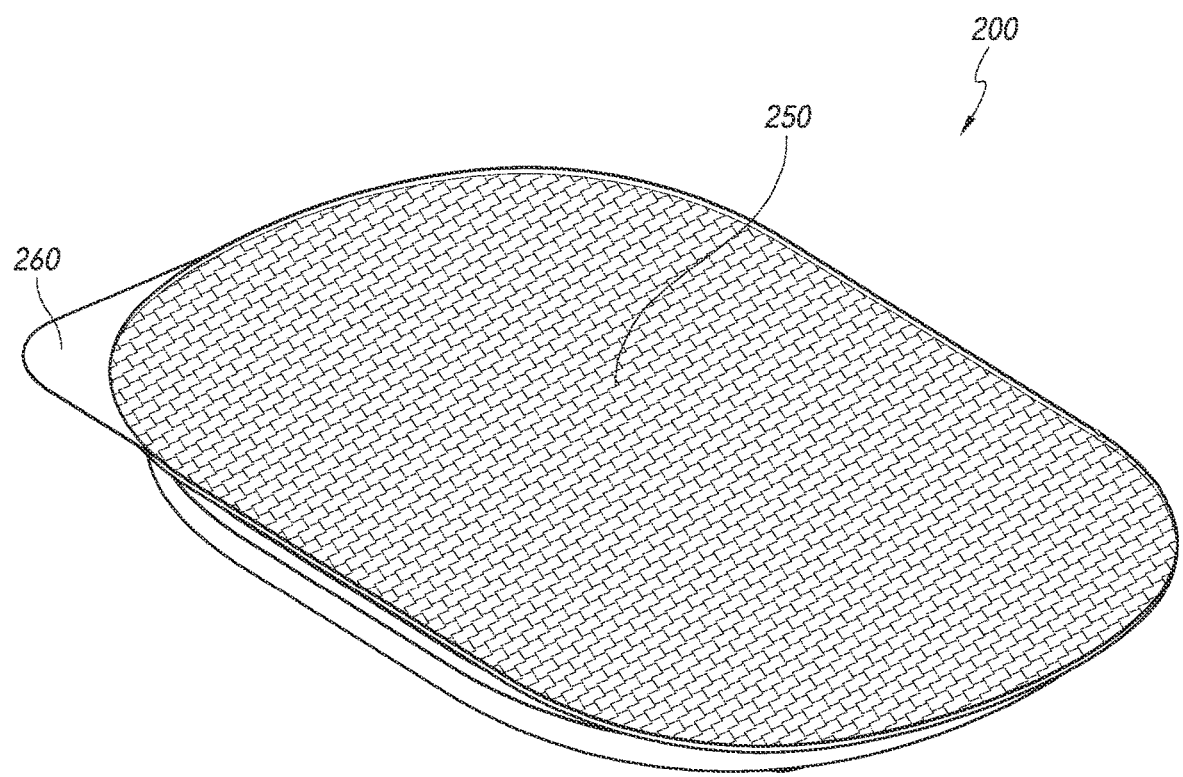
FIG. 4D illustrates a bottom perspective view of the dock of FIGS. 4A-4B in accordance with aspects of this disclosure.
Figure 4E:
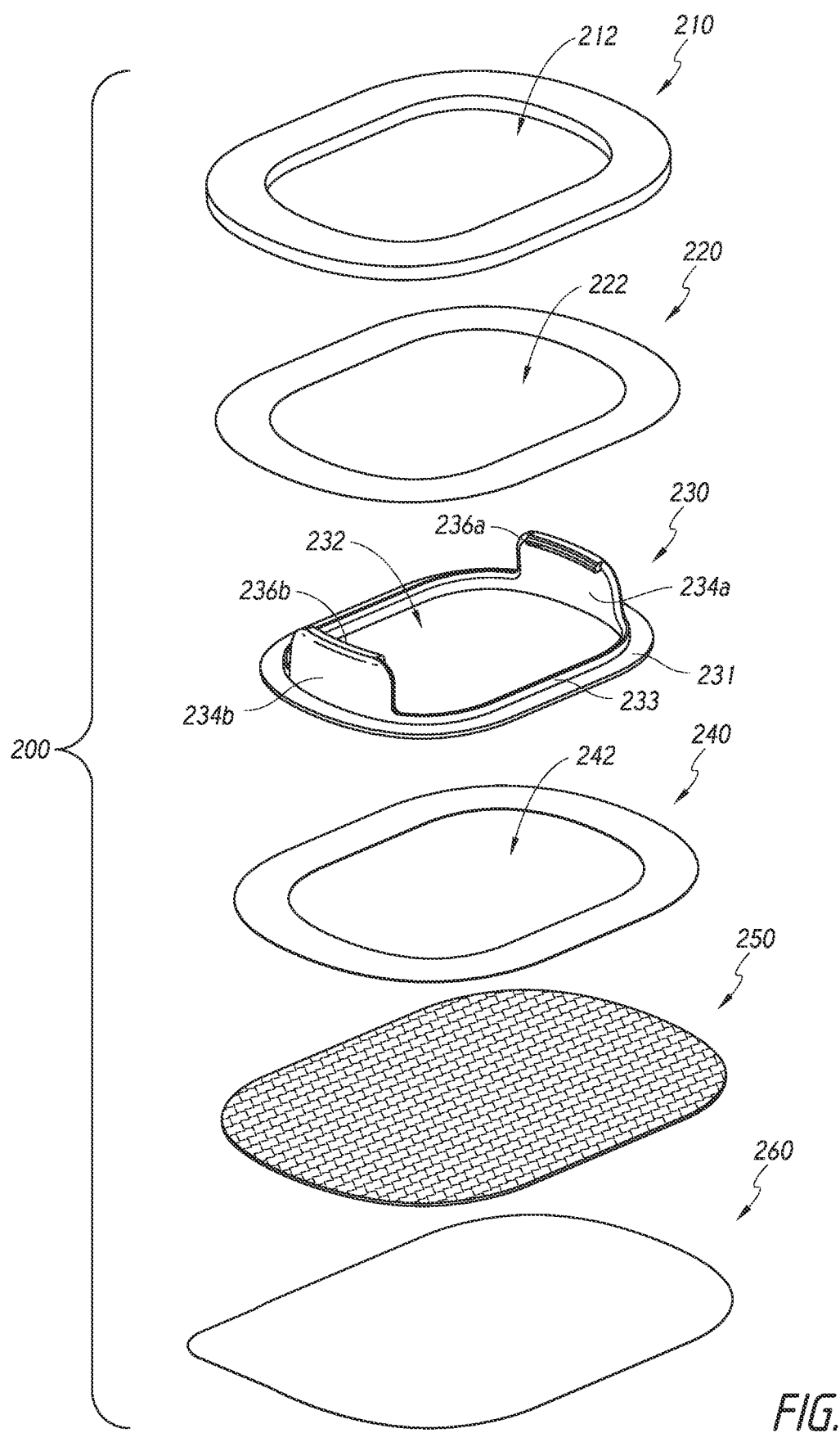
FIG. 4E illustrates an exploded perspective view of the dock of FIGS. 4A-4B in accordance with aspects of this disclosure.

FIGS. 4A-4B illustrate perspective views of dock 200. FIG. 4C illustrates a first side view of dock 200, which can be a mirror image of an opposite second side view of dock 200. FIG. 4D illustrates a bottom perspective view of dock 200. FIG. 4E illustrates an exploded view of dock 200.

With reference to FIGS. 4A-4E, dock 200 can include a frame 230 and one or more substrates coupled to frame 230, such as any of substrates 210, 220, 240, 250, and/or 260, each of which are discussed in more detail below. With reference to FIG. 4E, frame 230 can include a rim 231 and an opening 232. Rim 231 can define a perimeter of the frame 230. Rim 231 can have a rounded shape. Frame 230 can be configured to removably secure to hub 300, for example, to a housing of hub 300. Frame 230 can include one or more arms which are configured to engage with portions of the housing of the hub 300. For example, frame 230 can include arms 234a, 234b that can extend outward from rim 231. Arm 234a can be positioned at a first end of frame 230 and arm 234b can be positioned at a second end of frame 230 that is opposite of such first end of frame 230. Arms 234a, 234b can extend along a portion of rim 231, for example, less than an entire perimeter of rim 231. Arms 234a, 234b can extend generally perpendicular to rim 231 (for example, a plane defined by rim 231) and/or can extend generally perpendicular to opening 232 (for example, a plane defined by opening 232). In some implementations, frame 230 comprises a wall 233 that extends outward from (for example, generally perpendicular to) rim 231. Wall 233 can have a height that is less than arms 234a, 234b, as shown in FIG. 4E. In some implementations, arms 234a, 234b are curved along lengths (which may also be referred to as widths) thereof. For example, arms 234a, 234b can be curved to correspond with a curved shape of rim 231 at first and second ends of frame 230.

Arms 234a, 234b can be configured to engage with portions of a housing of hub 300 to facilitate securement (for example, removable securement) of the dock 200 and hub 300. As shown, arms 234a, 234b can include protrusions 236a, 236b. Arm 234a can include a first surface (which may be referred to as an "inward surface") and a second surface (which may be referred to as an "outward surface") opposite the first surface and arm 234b can include a first surface (which may be referred to as an "inward surface") and a second surface (which may be referred to as an "outward surface") opposite the first surface of arm 234b. The first surfaces of arms 234a, 234b can face at least partially toward each other (for example, can face in an inward direction of frame 230) and the second surfaces of the arms 234a, 234b can face away from one other. Protrusions 236a, 236b can extend outward from such respective inward surfaces of arms 234a, 234b and at least partially in a direction toward one another and/or toward an interior of frame 230. Protrusion 236a can extend along a portion of a length of arm 234a and protrusion 236b can extend along a portion of a length of arm 236a. While the figures illustrate protrusions 236a, 236b having a continuous length, in some variants, one or both of arms 234a, 234b include a plurality of protrusions separated from one another, for example, in a location such as that shown with respect to protrusions 236a, 236b. Protrusions 236a, 236b can engage recesses 307a, 307b of hub 300 as discussed in more detail below, which can facilitate securement of the hub 300 and the dock 200. With reference to FIG. 4C, protrusions 236a, 236b can have a beveled or chamfered edge on free ends thereof, which can facilitate movement along a portion of ends 302, 304 of the hub 300 and positioning within recesses 307a, 307b as explained in more detail below. Although arms 234a, 234b are shown as having protrusions 236a, 236b and hub 300 is shown as having recesses 307a, 307b, in some variants, arms 234a, 234b have recesses instead of protrusions 236a, 236b and hub 300 has protrusions instead of recesses 307a, 307b.

As also described further below, in some implementations, arms 234a, 234b can be configured to move when forces are applied to dock 200, which can facilitate removal of protrusions 236a, 236b from recesses 307a, 307b of hub 300 (see FIGS. 5A-5B). For example, in some implementations, application of opposing forces on opposite sides of the dock 200 (which extend between ends of dock 200 where arms 234a, 234b are located) can cause arms 234a, 234b to move from a first position (as shown in FIG. 4C) to a second position where arms 234a, 234b are positioned farther from each other than when in the first position. In some implementations, application of generally opposing forces on opposite ends of the dock 200 (where arms 234a, 234b are located) can cause arms 234a, 234b to move from the first position to the second position. In such second position, arm 234a, 234b can be flexed outward from one another (for example, to the "right" and "left" given the view shown in FIG. 4C). Such configuration can move the protrusions 236a, 236b out of recesses 307a, 307b, thereby allowing hub 300 to be removed from dock 200. In some implementations, dock 200 does not include a clip or other structure(s) that can be actuated by a user to disengage the protrusions 236a, 236b from recesses 307a, 307b. For example, in some implementations, in order for the hub 300 and dock 200 to be removed from each other, a portion or portions of the dock 200 (for example, the frame 200) must be deformed (for example, outward flexing of arms 234a, 234b). In some cases, such configurations make it difficult to remove hub 300 and dock 200 from one another when dock 200 is secured to the user's skin.

Such configurations can be advantageous to prevent users from separating the hub 300 and dock 200 from one another and interfering with operation of wearable device 100. As discussed further below, the hub 300 can include a button that allows the hub 300 to be transitioned from a non-operational mode to an operational mode, and in some implementations, such button is inaccessible when the hub 300 and dock 200 are coupled together. Such configurations can also inhibit users from intentionally or unintentionally interfering with operation of wearable device 100 (for example, shutting it off). For example, in some implementations, in order for wearable device 100 to be turned off, dock 200 and hub 300 must be removed (while coupled together) from the user's skin, arms 234a, 234b must be flexed outward (thereby removing protrusions 236a, 236b from recesses 307a, 307b of hub 300), and hub 300 must be decoupled from dock 200. In such configurations, it may be difficult for a user to carry out such actions when wearable device 100 is secured to the user's own skin, but such actions may be performed by a caregiver, which may be desirable in certain situations.

As mentioned above, FIG. 4E illustrates an exploded view of dock 200. Dock 200 can include one or more substrates that can secure and/or secure to other portions of dock 200 and/or that can allow the dock 200 to secure to a subject (for example, skin of the subject). For example, with reference to FIG. 4E, dock 200 can include one or more of substrates 210, 220, 240, 250, and/or 260.

Substrate 210 can be configured to surround a portion of frame 230. For example, substrate 210 can include an opening 212. Opening 212 can be sized and/or shaped to surround arms 234a, 234b and wall 233. Substrate 210 can be made of foam material such as white polyethylene, polyurethane, or reticulated polyurethane foams, to name a few. Substrate 210 can be made of medical-grade foam material. Substrate 210 can have a perimeter that is greater than a perimeter of rim 231 of frame 230 in some implementations. Substrate 210 and rim 231 can sandwich a substrate 220 therebetween. Substrate 220 can have an opening 222 that is sized and/or shaped to surround arms 234a, 234b and wall 233. Substrate 220 can comprise polyethylene with an adhesive on one or both sides thereof, which can allow substrate 210 to secure to frame 230 (for example, rim 231 of frame 230) in some implementations. Substrate 240 can be positioned between rim 231 and a substrate 250 (described further below). Substrate 240 can include an opening 242 as shown. In some implementations, openings 222 and 242 are identical. Substrate 240 can comprise polyethylene with an adhesive on one or both sides thereof, which can help secure substrate 250 to frame 230 (for example, rim 231 of frame 230). Substrate 240 can be sandwiched between rim 231 and substrate 250.

Substrate 250 can contact and/or secure to skin of a subject when wearable device 100 is in use. Substrate 250 can be a bottommost portion of wearable device 100 when wearable device 100 is in use (for example, after a release liner 260 is removed). Substrate 250 can be or include a material configured to secure to skin of a subject. Substrate 250 can comprise a material configured to allow for removable securement of wearable device 100 to the subject's skin. For example, the substrate 250 can be coated with a high tack, medical-grade adhesive, which when in contact with the subject's skin, is suitable for long-term monitoring, such as, for example two days or longer, such as 3 days, 4 days, 5 days, 6 days, 7 days, 8 days, 9 days, or 10 days or longer. Additionally or alternatively, the substrate 250 can be or include a soft, comfortable, and/or breathable material. For example, substrate 250 can be or include fabric, such as a spunlace fabric. The substrate 250 can include an adhesive material or layer (such as adhesive tape). Substrate 250 can comprise a silicon adhesive with a fabric layer. Such configuration can allow wearable device 100 to comfortably secure to the subject's skin. Substrate 250 can provide thermal insulation and/or provide thermal conductivity. For example, when wearable device 100 is positioned on and/or secured to (for example, adhered to) a subject's skin surface, substrate 250 can act to insulate the skin surface at, around, and/or proximate to a point or region where temperature is measured and/or where thermal energy is transmitted from the skin surface of the subject to or near one or more temperature sensors of wearable device 100 (for example, via thermally conductive probes 344a, 344b). For example, when wearable device 100 is positioned on and/or secured to (for example, adhered to) a subject's skin surface, substrate 250 can insulate the skin surface and can transmit thermal energy to thermally conductive probes 344a, 344b, which in turn, can transmit thermal energy to and/or toward temperature sensors 340a, 340c as described further below.

Substrate 260 can be a release liner 260. Substrate 260 can secure to one or more of the above-described substrates (such as substrate 250) and can be removed prior to securement of wearable device 100 to a subject. For example, substrate 260 can be removed from the substrate 250 prior to placement and/or securement of wearable device 100 on the subject's skin.

FIGS. 5A-5B illustrate top perspective views of hub 300, FIG. 5C illustrates a bottom perspective view of hub 300, and FIG. 5D illustrates a side view of hub 300 which can be a mirror image of the opposite side view of hub 300. Hub 300 can have a first end 302, a second end 304 opposite the first end 302, a first side 306, and a second side 308 opposite the first side 306.

As discussed above, hub 300 can be configured to be removably secured to dock 300, for example, via interaction between recesses 307a, 307b and protrusions 236a, 236b of arms 234a, 234b. Hub 300 can include a housing which can itself include shells 300a, 300c (see FIGS. 5E-5F) which can be secured (for example, permanently secured together) to enclose electronic components of wearable device 100. With reference to FIG. 5A, a portion 302a of end 302 of hub 300 (which can be defined by portions of shells 300a, 300c of a housing of hub 300) can be sized and/or shaped to receive and/or conform to a shape of arm 234a. Similarly, with reference to FIG. 5B, a portion 304a of end 304 of hub 300 (which can be defined by portions of shells 300a, 300c of a housing of hub 300) can be sized and/or shaped to receive and/or conform to a shape of arm 234b. Such portions 302a, 304a can be recessed from an outer surface of housing of hub 300 (for example, formed by shells 300a, 300c).

Recessed portions 302a, 304a can include structure(s) that facilitate engagement and/or securement with protrusions 236a, 236b of arms 234a, 234b of frame 230 of dock 200. For example, portion 302a can include a recessed portion 303a, a recess 307a (which may also be referred to as a "groove") and a wall 305a (which may also be referred to as a "non-recessed portion") that at least partially separates recessed portion 303a and recess 307a. Similarly, portion 304a can include a recessed portion 303b, a recess 307b (which may also be referred to as a "groove") and a wall 305b (which may also be referred to as a "non-recessed portion") that at least partially separates recessed portion 303b and recess 307b. In some implementations, hub 300 can be secured to dock 200 be inserting hub 300 between arms 234a, 234b of dock 200 from above (see, for example, FIGS. 3A-3B). During such insertion, protrusions 236a, 236b can contact and/or slide along recessed portions 303a, 303b, slide over walls 305a, 305b, and move into recesses 307a, 307b. In some implementations, protrusions 236a, 236b are configured for snap-fit engagement with recesses 307a, 307b (which can be facilitated by recessed portions 303a, 303b and/or walls 305a, 305b). As mentioned above, in some implementations, protrusions 236a, 236b have a beveled or chamfered end which can help protrusions 236a, 236b slide over walls 305a, 305b and into recesses 307a, 307b. Hub 300 and dock 200 can be decoupled from one another by flexing arms 234a, 234b outward, thereby moving protrusions 236a, 236b out of recesses 307a, 307b, as explained in more detail above. In some implementations, hub 300 includes features that can facilitate gripping and/or handling of hub 300, for example, before, during, and/or after removal of hub 300 and dock 200 from one another. For example, hub 300 can include recessed portions 309a, 309b and/or protrusions 311a, 311b extending along a portion of lengths of sides 308, 306.

With reference to FIG. 5C, hub 300 can include a button 325. Button 325 can be utilized to transition hub 300 (and wearable device 100) from a non-operational mode to an operational mode, and vice versa. In some implementations, when hub 300 (and wearable device 100) is in the non-operational mode, electronic functionality of wearable device 100 is disabled, for example, wireless communication is not allowed and/or physiological measurements (such as body temperature) are not determined. Conversely, in some implementations, when hub 300 (and wearable device 100) is in the operational mode, measurements of physiological parameters (such as body temperature) are enabled and/or wireless communication with separate devices is enabled. In some implementations, button 325 is located on a portion of hub 300 such that button 325 is inaccessible when hub 300 and dock 200 are coupled together. For example, with reference to at least FIGS. 1A-1B, 3A-3B, 4A-4B, and 5C, when hub 300 and dock 200 are coupled together, button 325 can face toward substrate 250 and can be hidden. Such configurations can advantageously inhibit or prevent wearable device 100 from being turned off when wearable device 100 is secured to the subject's skin and/or when hub 300 and dock 200 are connected. Such configurations can advantageously prevent a subject from intentionally or unintentionally turning wearable device 100 off when wearable device 100 is secured to the subject (which can ensure proper compliance in some situations).

In some implementations, hub 300 includes an opening 315 configured to allow light from and LED housed within the hub 300 to exit the hub 300 and illuminate nearby areas. This can be utilized to indicate a status of wearable device 100. Opening 315 can be located in shell 300a, which can form a housing when secured to shell 300c.

FIGS. 5E-5F illustrate exploded perspective views of hub 300. Hub 300 can include a housing formed by shell 300a (which may be referred to as "top shell") and shell 300c (which may be referred to as "bottom shell"). Such housing can enclose electronic components of wearable device 100. Shells 300a, 300c can be permanently secured together. In some implementations, shells 300a, 300c are secured together so as to prevent water ingress into an interior of a housing formed by shells 300a, 300c, which can in turn protect electronic components contained therewithin. With reference to at least FIG. 5T, in some implementations, joining edges represented by numeral "399" in FIG. 5T (for example, a bottom edge of shell 300a and a top edge of shell 300c) can be ultrasonically welded together to prevent water ingress. In some implementations, dock 200 does not include any electronic components and all electronic components of wearable device 100 are contained in hub 300. As shown in FIGS. 5E-5F, wearable device 100 (for example, hub 300) can include an electronics assembly represented by numeral "300b" for purposes of convenience. FIGS. 5G-5H illustrate views of shell 300a and FIGS. 5I-5J illustrate views of shell 300c. FIGS. 5K-5O illustrate views of various electronic and/or structural components that can be enclosed in a housing of hub 300 and can form electronics assembly 300b. Use of the phrase "electronics assembly" and use of numeral "300b" in the present disclosure is not intended to be limiting, but rather, is merely intended as a convenient method to refer to one or more components of wearable device 100 which can be enclosed by the shells 300a, 300c. The use of such phrase and such numeral is not intended to convey that the inclusion of any elements or features described with reference to electronics assembly 300*b* necessarily requires inclusion of any or all other elements or features described with reference to electronics assembly 300*b*.

As mentioned above, FIGS. 5G-5H illustrate bottom perspective views of shell 300*a*. Shell 300*a* can include various structure(s) that can engage with portions of electronics assembly 300*b* and/or act to operably position portions of electronics assembly 300*b*. For example, shell 300*a* can include structure(s) that engage and/or operably position any or all of circuit boards 330, 331 (see FIGS. 5K-5L). For example, shell 300*a* can include walls 313*a*, 313*b*, 313*c* (which may also be referred as "arms" or "protrusions") that can extend through openings 330*d* in circuit board 330 (see FIGS. 5K-5L, 5O-5Q). Such configurations can help align and/or position circuit board 330 with respect to shell 300*a* and/or within housing formed by shells 300*a*, 300*c* when assembled. Such configurations can also inhibit or limit movement of circuit board 330 in a direction along a plane formed by circuit board 330. With continued reference to FIGS. 5G-5H, shell 300*a* can include walls 317*a*, 317*b*, 316*a*, 316*b*, 314*a*, 314*b* that can contact a surface of circuit board 331 and provide a platform for circuit board 331. Walls 317*a*, 317*b*, 316*a*, 316*b* can be received by openings 330*b* (which can also be referred to as "notches") located along an edge and/or perimeter of circuit board 330 (see FIGS. 5K-5L). Walls 314*a*, 314*b* can at least partially form a cavity 314*c* that can be sized and/or shaped to receive NFC transponder 333 (see FIGS. 5K-5P). Walls 313*a*, 313*b*, 313*c*, 314*a*, 314*b*, 317*a*, 317*b* can extend outward from an interior surface 312 of shell 300*a* as shown. As also shown in FIGS. 5G-5H, shell 300*a* can include a cavity defined by an enclosure 319 extending outward from surface 312 of shell 300*a* and which can be positioned around emitter 397 (see FIG. 5K-5L). Opening 315 can extend through a portion of shell 300*a* into such cavity defined by enclosure 319, as shown. Enclosure 319 can isolate emitter 397 and/or light emitted from emitter 397 and help guide emitted light through opening 315.

FIGS. 5I-5J illustrate bottom perspective views of shell 300*c*. Shell 300*c* can include various structure(s) that can engage with portions of electronics assembly 300*b* and/or act to operably position portions of electronics assembly 300*b*. For example, shell 300*c* can include structure(s) that engage and/or operably position any or all of circuit boards 330, 331 (see FIGS. 5K-5L). For example, shell 300*c* can include arms 321*a*, 321*b*, 321*c*, 321*d* that extend outward from (for example, generally perpendicular to) an interior surface 320 of shell 300*c*. Arms 321*a*, 321*b*, 321*c*, 321*d* can be configured to engage with notches and/or openings in circuit boards 330, 331. For example, circuit board 330 can include openings 330*c* located in an interior portion of circuit board 300 and openings 330*a* (which can also be referred to as "notches") located along an edge and/or perimeter of circuit board 330 (see FIGS. 5K-5L, 5P, 5Q). FIG. 5P illustrates shell 300*c* coupled with electronics assembly 300*b* without also showing shell 300*a*, frame 334, and antenna 335 for purposes of clarity. As shown, portions of arms 321*a*, 321*b*, 321*c*, 321*d* can be received in openings 330*a* and ends of arms 321*a*, 321*b*, 321*c*, 321*d* can extends through openings 330*c*. In some implementations, arms 321*a*, 321*b*, 321*c*, 321*d* include a notch near free ends thereof, and such notch is configured to receive (for example, "grip") portions of circuit board 330 near openings 330*c*, 330*a*. As shown in at least FIGS. 5K-5L, circuit board 331 can include openings 331*a* (which can also be referred to as "notches") located along an edge and/or perimeter of circuit board 331, and portions of arms 321*a*, 321*b*, 321*c*, 321*d* can be received in openings 331*a*. Such configurations can advantageously allow shell 300*c* to engage and/or operably position circuit boards 330, 331, for example, within housing defined by shells 300*a*, 300*c* when assembled. With reference to FIGS. 5I-5J, in some implementations, free ends of arms 321*a*, 321*b*, 321*c*, 321*d* are chamfered or beveled, which can help such free ends contact and slide into engagement with openings 330*c*.

As discussed above, wearable device 100 can include a button 325 that can transition wearable device 100 between operational and non-operational modes. In some implementations, button 325 can be defined by a portion of shell 300*c* that can be recessed from interior surface 320 of shell 300*c* (see FIGS. 5I-5J). Button 325 can include an actuator portion and a switch. Such actuator portion can include a pad 325*a* (which can be pressable by a user, for example, by a finger of a user) and a protrusion 325*b* that can extend outward from pad 325*a* (which can have a cross shape among others). Protrusion 325*b* can be configured to engage a switch 325*c* (see FIGS. 5M-5N) coupled to circuit board 331. Movement (for example, actuation) of pad 325*a* can move protrusion 325*b* into engagement with switch 325*c*, which can cause wearable device 100 to transition between operational and non-operational modes. Button 325 can be an embodiment of user input device 108 discussed above.

With continued reference to FIGS. 5I-5J, shell 300*c* can include a wall 322 that extends between arms 321*c*, 321*d* adjacent to button 325 and/or can extend around a portion of a perimeter of button 325. Wall 322 can be curved and/or partially curved to correspond to a curvature of battery 332 (see FIGS. 5K-5O). Wall 322 can act to operably position battery 332.

As shown in at least FIGS. 5I-5J, shell 300*c* can include openings 324*a*, 324*b*, which can be positioned within an interior of shell 300*c* and/or spaced from a perimeter of shell 300*c*. Openings 324*a*, 324*b* can allow thermally conductive probes 344*a*, 344*b* to extend through shell 300*c* and a housing formed by shells 300*a*, 300*c*. Such configuration can allow probes 344*a*, 344*b* to contact substrate 250 when hub 300 and dock 200 are secured together, which can in turn allow probes 344*a*, 344*b* to receive thermal energy from substrate 250 (from skin of the user) and transmit such thermal energy to and/or toward temperature sensors 340*a*, 340*c* as described further below.

FIGS. 5K-5L illustrate top perspective views of electronics assembly 300*b* of hub 300 and FIGS. 5M-5N illustrate bottom perspective views of electronics assembly 300*b*. FIG. 5O illustrate a partially exploded bottom perspective view of electronics assembly 300*b*. FIGS. 5Q-5R illustrate top views of circuit boards 330, 331 (respectively). FIG. 5S illustrates a cross-section taken through electronics assembly 300*b* shown in FIGS. 5E-5F.

Wearable device 100 can include circuit boards 330, 331 as discussed above. Circuit boards 330, 331 can mechanically support and electrically connect various electrical components of wearable device 100 to facilitate the performance of various functions of wearable device 100. Such electrical components can include without limitation, processor 101, storage device 102, communication module 103, and one or more temperature sensors 106 (which can be, for example, temperature sensors 340*a*, 340*b*, 340*c*, 340*d*), one or more other sensor(s) 107, and/or other components discussed elsewhere herein. Circuit boards 330, 331 can be spaced apart from one another by a gap. In some implementations, circuit boards 330, 331 are oriented substantially parallel to one another. As shown, battery 332 can be positioned between circuit boards 330, 331. In some implementations, circuit boards 330, 331 are mechanically and/or electrically coupled with one or more headers 336, which can facilitate communication between circuit boards 330, 331 (for example, signals communicated therebetween). Such headers 336 can act to maintain the spacing and/or orientation of circuit boards 330, 331 with respect to each other.

Battery 332 can be an embodiment of battery 104 discussed above. Battery 332 can provide power to the hardware components of wearable device 100 which are described herein. Battery 332 can be a coin cell battery (such as a lithium coin cell battery). Battery 332 can have a circular shape. Battery 332 can comprise a metal housing. Battery 332 can be in electrical contact with circuit board 330 and/or circuit board 331. For example, as discussed below, battery 332 can contact an electrical contact 357 on circuit board 331. In some implementations, battery 332 is not rechargeable. With reference to FIGS. 5O and 5S, wearable device 100 can include an electrical contact 349 coupled to a surface (for example, bottom surface) of circuit board 330 and configured to contact a portion of battery 332. In some implementations, electrical contact 349 has a spring-like configuration which applies a compressive force against a portion of battery 332 when battery 332 is assembled between circuit boards 330, 331.

Wearable device 100 can include near field communication (NFC) functional capabilities (for example, RFID) that can enable wearable device 100 to interact and/or communicate with separate computing devices. Such NFC functional capabilities can enable wearable device 100 to, among other things: confirm or verify that it is and/or is made up of authentic components; transfer data (for example, physiological data) obtained by wearable device 100; and determine a lifespan of the wearable device 100. For example, wearable device 100 can include NFC transponder 333 (for example, in the form of a chip) that can interact with an RFID reader of a separate computing device that emits a radio frequency. NFC transponder 333 can be an embodiment of and/or be part of communication module 103 discussed above. NFC transponder 333 can be positioned within housing of hub 300 defined by shells 300a, 300c. NFC transponder 333 can be positioned near an exterior portion of the housing, for example, within cavity 314c discussed above.

Wearable device 100 can include an antenna 335 to facilitate wireless communication. Antenna 335 can be an embodiment of and/or be part of communication module 103 discussed above. Antenna 335 can allow wearable device 100 to wirelessly communicate via any of the communication protocols discussed elsewhere herein, such as but not limited to, Wi-Fi (802.11x), Bluetooth®, ZigBee®, Z-wave®, cellular telephony, infrared, near-field communications (NFC), RFID, satellite transmission, proprietary protocols, combinations of the same, and the like. As discussed previously and as shown in the figures, wearable device 100 can include a battery 332, which, in some implementations, is placed between and/or adjacent circuit boards 330, 331. In some cases, the battery 332 comprises a metal housing that can negatively impact antenna range. Advantageously, in some implementations where battery 332 is positioned adjacent circuit boards 330, 331, antenna 335 is positioned spaced away from the circuit boards 330, 331 in order to minimize the affect of the battery 332 on the range of the antenna 335. Such configurations can also position the antenna 335 further away from the user's skin and body when wearable device 100 is secured to the user, which can also improve antenna range since the body can negatively impact antenna range. For example, in some implementations, wearable device 100 include a frame 334 coupled to circuit board 330 and/or 331 that mounts the antenna 335 and positions the antenna 335 away from circuit boards 330, 331. Antenna 335 can be positioned and/or secured atop a top surface of frame 334, as shown. Numerals 335a, 335b in FIGS. 5K-5L are used to indicate where portions of antenna 335 are connected to (for example, soldered) circuit board 330. As shown, end portions of antenna 335 (at/near numerals 335a, 335b) can be connected to circuit board 330 and can extend upward over ends of legs 334c, 334d of frame 334 to allow a remainder of antenna 335 to be positioned atop the top surface of frame 334 as shown.

In some implementations, frame 334 comprises one or more legs 334a, 334b, 334c, 334d (see FIG. 5K-5L). Legs 334b, 334c, 334d can extend transverse (for example, generally perpendicular) to leg 334a. Frame 334 can include structure(s) that engage with structure(s) of circuit board 330. For example, as shown in FIG. 5N, frame 334 can include protrusions 334e extending outward from leg 334a (for example, generally perpendicular to leg 334) which can be received within openings 330e (which may be referred to as "notches") located along an edge and/or perimeter of circuit board 330 (see FIG. 5Q). Additionally or alternatively, frame 334 can include legs 334d which can extend from leg 334a. Legs 334d can extend from leg 334a in a first direction (for example, generally perpendicular to leg 334a, which is shown as "downward" in FIG. 5N) and in a second direction that is generally perpendicular to the first direction and which can be substantially parallel to legs 334b, 334c, 334d. Legs 334d can engage with openings 330f (which may be referred to as "notches") located along an edge and/or perimeter of circuit board 330 (see FIG. 5Q).

Wearable device 100 can include one or more indicators configured to indicate a status of wearable device 100, such as whether wearable device 100 is in an operational ("on") mode, whether wearable device 100 is pairing or has paired with a separate device, whether an error has been detected, and/or a power level of wearable device 100. For example, with reference to at least FIGS. 5K-5L, the wearable device 100 can include an emitter 397 configured to emit light of one or more wavelengths to indicate a status of wearable device 100. The emitter 397 can be coupled to the circuit board 330. The emitter 397 can include one or more light-emitting diodes (LEDs). The emitter 397 can emit light of certain colors to indicate certain statuses of wearable device 100. For example, the emitter 397 can emit a green light to indicate that wearable device 100 is powered "on" or a red light to indicate wearable device 100 is "off". A housing formed by shells 300a, 300c can include an opening configured to allow light emitted from the emitter 397 to be visible from a location outside an interior of the housing. For example, as discussed above, shell 300a can include opening 315. Additionally or alternatively, shells 300a and/or 300c can comprise a transparent or semi-transparent material that allows light emitted from the emitter 397 to be seen from a location outside an interior of the housing. In some implementations, opening 315 is at least partially aligned with emitter 397 to allow light emitted from the emitter 397 to more easily pass through the housing.

FIGS. 5Q and 5R illustrate top views of circuit boards 330, 331. As discussed herein, wearable device 100 can include one or more temperature sensors that can be mounted to circuit boards 330, 331. For example, wearable device 100 can include temperature sensors 340b and 340d mounted to circuit board 330 and temperature sensors 340*a* and 340*c* mounted to circuit board 331. In some implementations, circuit board 330 can include one or more openings at least partially between temperature sensors 340*b* and 340*d* and/or circuit board 331 can include one or more openings at least partially between temperature sensors 340*a*, 340*c*. Such one or more openings can be positioned within an interior portion of circuit boards 330, 331. Such one or more openings in circuit board 330 can be positioned such that a line extending between temperature sensors 340*b* and 340*d* passes through at least a portion of the one or more openings. Similarly, such one or more openings in circuit board 331 can be positioned such that a line extending between temperature sensors 340*a* and 340*c* passes through at least a portion of the one or more openings.

For example, circuit board 330 can include an opening 330*g* and/or an opening 330*h*. Openings 330*g*, 330*h* can be positioned at least partially between temperature sensors 340*b*, 340*d* such that a line extending between temperature sensors 340*b* and 340*d* passes through at least a portion of openings 330*g*, 330*h*. Opening 330*g* can be positioned proximate temperature sensor 340*b* and/or opening 330*h* can be positioned proximate temperature sensor 340*d*. Similarly, circuit board 331 can include an opening 331*c* and/or an opening 331*d*. Openings 331*c*, 331*d* can be positioned at least partially between temperature sensors 340*a*, 340*c* such that a line extending between temperature sensors 340*a* and 340*c* passes through at least a portion of openings 331*c*, 331*d*. Opening 331*c* can be positioned proximate temperature sensor 340*a* and/or opening 331*d* can be positioned proximate temperature sensor 340*c*. Openings 330*g*, 330*h*, 331*c*, 331*d* can be defined by one or more linear portions. For example, opening 330*g* can be defined by two linear portions which are transverse (for example, generally perpendicular) to one another. As another example, opening 330*h* can be defined by a single linear portion. In some implementations, openings 331*c*, 331*d* are defined by three linear portions, two of which are generally parallel to one another and one of which is generally perpendicular to the other two.

Advantageously, openings 330*g*, 330*h* can inhibit or minimize heat flow along circuit board 330 between temperature sensors 340*b* and 340*d*, and openings 331*c*, 331*d* can inhibit or minimize heat flow along circuit board 331 between temperature sensors 340*a* and 340*c*. Such configurations can allow temperature sensors 340*a*, 340*b*, 340*c*, 340*d* to be utilized to capture unique temperature values which can be advantageous in determining internal body temperature as explained in more detail below.

With reference to FIG. 5R, wearable device 100 can include an electrical contact 357 on circuit board 331 that can be electrically coupled to battery 332 when assembled. In some implementations such as that shown, electrical contact 357 comprises a circular shape corresponding to a shape of battery 332. Additionally or alternatively, in some implementations, electrical contact 357 can comprise a hatched pattern. Such hatching can inhibit or minimize heat flow along circuit board 330 between temperature sensors 340*b* and 340*d*. Additionally or alternatively, such hatching can inhibit or minimize heat flow along circuit board 331 between thermally conductive probes 344*a*, 344*b* which can be in contact with circuit board 331. Advantageously, such hatching can thereby allow temperature sensors 340*a*, 340*b*, 340*c*, 340*d* to be utilized to capture unique temperature values which can be advantageous in determining internal body temperature as explained in more detail below. Electrical contact 357 can comprise copper, for example, electrical contact 357 can be a gold plated copper pad.

With reference to FIGS. 5M-5O and as discussed elsewhere herein, wearable device 100 can include thermally conductive probes 344*a*, 344*b*. Thermally conductive probes 344*a*, 344*b* can advantageously help transmit thermal energy to and/or toward temperature sensors 340*a*, 340*c*, as also discussed elsewhere herein. Thermally conductive probes 344*a* can be rigid. Thermally conductive probes 344*a*, 344*b* can comprise a metallic material. In some implementations, probes 344*a*, 344*b* comprise brass. In some implementations, probes 344*a*, 344*b* are made of the same material. In some implementations, probes 344*a*, 344*b* are made of a different material. Thermally conductive probes 344*a* can comprise a circular cross-section. Thermally conductive probes 344*a* can have a first end that is substantially flat and a second end that is tapered (see FIG. 5O).

Thermally conductive probe 344*a* can have a first end positioned adjacent and/or secured to a portion of circuit board 331 and a second end opposite such first end. In some implementations, thermally conductive probe 344*a* (for example, such first end thereof) is soldered to circuit board 331. Such first end of thermally conductive probe 344*a* can be positioned adjacent and/or secured to a portion of circuit board 331 such that probe 344*a* is substantially aligned with one or both of temperature sensors 340*a*, 340*b* (see FIGS. 5K and 5S). Thermally conductive probe 344*b* can have a first end positioned adjacent and/or secured to a portion of circuit board 331 and a second end opposite such first end. In some implementations, thermally conductive probe 344*b* (for example, such first end thereof) is soldered to circuit board 331. Such first end of thermally conductive probe 344*b* can be positioned adjacent and/or secured to a portion of circuit board 331 such that probe 344*b* is substantially aligned with one or both of temperature sensors 340*c*, 340*d* (see FIGS. 5L and 5S).

Circuit board 331 can include one or more openings configured to allow thermal energy from thermally conductive probes 344*a*, 344*b* to pass through circuit board 331 and to temperature sensors 340*a*, 340*c*. For example, as shown in FIG. 5O, circuit board 331 can include a first plurality of holes 348*a* and a second plurality of holes 348*b*. Holes 348*a* can be arranged in an array and/or group proximate one another and can be positioned between thermally conductive probe 344*a* and temperature sensor 340*a*. Similarly, holes 348*b* can be arranged in an array and/or group proximate one another and can be positioned between thermally conductive probe 344*b* and temperature sensor 340*c*. The plurality of holes 348*a* can comprise two, three, four, five, six, seven, or eight or more holes 348*a*. Alternatively, such plurality of holes 348*a* could be replaced with a single hole. The plurality of holes 348*b* can comprise two, three, four, five, six, seven, or eight or more holes 348*b*. Alternatively, such plurality of holes 348*b* could be replaced with a single hole. In some implementations, such holes 348*a*, 348*b* are filled with a thermally conductive material. In some implementations, such holes 348*a*, 348*b* are not filled with a thermally conductive material. In some implementations, such holes 348*a*, 348*b* are left void. In some implementations, holes 348*a* are filled with a thermally conductive material but holes 348*b* are not filled with a thermally conductive material, or holes 348*b* are filled with a thermally conductive material but holes 348*a* are not filled with a thermally conductive material.

Thermally conductive probes 344*a*, 344*b* can be configured to contact substrate 250 when wearable device 100 is in use (for example, when hub 300 and dock 200 are coupled together. A housing defined by shells 300a, 300c can include openings configured to allow probes 344a, 344b to extend through the housing and contact substrate 250 when wearable device 100 is in use. For example, shell 300c can include openings 324a, 324b that can be sized and/or shaped to allow probes 344a, 344b to extend therethrough.

In some implementations, wearable device 100 includes seals configured to prevent water ingress through openings 324a, 324b around probes 344a, 344b. For example, wearable device 100 can include O-rings 345a, 345b that can surround probes 344a, 344b and sit within recessed portions of shell 300c surrounding openings 324a, 324b (see FIGS. 5I-5J and 5T).

Circuit board 330 can include one or more openings configured to allow thermal energy to pass through circuit board 330 and to temperature sensors 340b, 340d. For example, with reference to FIG. 5O, circuit board 330 can include a first plurality of holes 350a and a second plurality of holes 350b. Holes 350a can be arranged in an array and/or group proximate one another and can be positioned adjacent to (for example, underneath) temperature sensor 340b. Similarly, holes 350b can be arranged in an array and/or group proximate one another and can be positioned adjacent to (for example, underneath) temperature sensor 340d. The plurality of holes 350a can comprise two, three, four, five, six, seven, or eight or more holes 350a. Alternatively, such plurality of holes 350a could be replaced with a single hole. The plurality of holes 350b can comprise two, three, four, five, six, seven, or eight or more holes 350b. Alternatively, such plurality of holes 350b could be replaced with a single hole. In some implementations, such holes 350a, 350b are filled with a thermally conductive material. In some implementations, such holes 350a, 350b are not filled with a thermally conductive material. In some implementations, such holes 350a, 350b are left void. In some implementations, holes 350a are filled with a thermally conductive material but holes 350b are not filled with a thermally conductive material, or holes 350b are filled with a thermally conductive material but holes 350a are not filled with a thermally conductive material.

With reference to FIG. 5S, wearable device 100 can include temperature sensors 340a, 340b, 340c, 340d. Temperature sensors 340a, 340c can be mounted to a first surface of circuit board 331 and spaced away from each other. Thermally conductive probes 344a, 344b can be positioned adjacent and/or secured to a second surface of circuit board 331 that is opposite the first surface of circuit board 331 that temperature sensors 340a, 340c are mounted to. Holes 348a can be positioned at least partially between temperature sensor 340a and probe 344a and holes 348b can be positioned at least partially between temperature sensor 340c and probe 344b.

Temperature sensors 340a, 340b, 340c, 340d can be configured to generate one or more signals responsive to detected thermal energy, determine temperature, and/or transmit such generated one or more signals and/or such determined temperature to the processor 101 of wearable device 100 continuously and/or intermittently. For example, temperature sensors 340a, 340b, 340c, 340d can be configured to generate one or more signals responsive to detected thermal energy, determine temperature, and/or transmit such generated one or more signals and/or such determined temperature every 0.5 seconds, 1 second, 2 second, 3 seconds, 4 seconds, 5 seconds, 10 seconds, 30 seconds, 1 minute, 2 minute, 3 minutes, 4 minutes, 5 minutes, or at other intervals. Such generated one or more signals, determined temperature, and/or transmission of such generated one or more signals and/or determined temperature for each of temperature sensors 340a, 340b, 340c, 340d can be simultaneous or non-simultaneous.

The various devices, methods, and/or systems discussed above can be used for monitoring a subject's physiological information. For example, as discussed above, wearable device 100 can be used to measure a subject's temperature over time. As discussed above, wearable device 100 can be configured to wirelessly communicate with a separate computing device, such as a patient monitor and/or a mobile device (e.g., smart phone). Wearable device 100 can wirelessly transmit physiological data (such as temperature data) over time (continuously or periodically) to such separate computing device for display, among other things. As also discussed above, wearable device 100 can wirelessly transmit processed or unprocessed obtained physiological information to a mobile phone (for example) which can include one or more hardware processors configured to execute an application that generates a graphical user interface displaying information representative of the processed or unprocessed physiological information obtained from wearable device 100. Such graphical user interfaces can display continuous and/or periodic measurements obtained from wearable device 100, display and/or issue various types of alerts, display physiological trend information (for example, temperature trends), among other things. Features or aspects displayed by such graphical user interfaces can include, without limitation, a splash screen, onboarding, device setup, instructions (for example, both visual/graphical and textual) for securing wearable device 100 to a subject and/or pairing wearable device 100 to the separate computing device, temperature data and/or trending dashboard, user scenarios, notes (such as medication notes and reminders as well as other user activity notes), temperature trending data and information, user settings and profiles, app settings, and/or alerts and push notifications.

Temperature sensors 340b, 340d can be mounted to a first surface of circuit board 330 and spaced away from each other. A second surface of circuit board 330 that is opposite the first surface of the circuit board 331 can face toward temperature sensors 340a, 340c and toward circuit board 331 (for example, toward the first surface of circuit board 331 that temperature sensors 340a, 340c are mounted to). Circuit board 330 (for example, second surface of circuit board 330 that is opposite the first surface of circuit board 330 that temperature sensor 340b, 340d are mounted to) can be spaced a distance $d_1$ from temperature sensor 340a. Such distance $d_1$ can be approximately 0.5 mm, approximately 1 mm, approximately 1.5 mm, approximately 2 mm, approximately 2.5 mm, approximately 3 mm, approximately 3.5 mm, or approximately 4 mm, or any value or range between any of these values, or any value or range bounded by any combination of these values. Circuit board 330 (for example, second surface of circuit board 330 that is opposite the first surface of circuit board 330 that temperature sensor 340b, 340d are mounted to) can be spaced a distance $d_2$ from temperature sensor 340c. Such distance $d_2$ can be approximately 0.5 mm, approximately 1 mm, approximately 1.5 mm, approximately 2 mm, approximately 2.5 mm, approximately 3 mm, approximately 3.5 mm, or approximately 4 mm, or any value or range between any of these values, or any value or range bounded by any combination of these values. Distance $d_1$ and/or $d_2$ can be at least approximately 0.1 mm, at least approximately 0.2 mm, at least approximately 0.3 mm, at least approximately 0.4 mm, at least approximately 0.5 mm, at least approximately 1 mm, at least approximately 1.5 mm, at least approximately 2 mm, at least approximately 2.5 mm, at least approximately 3 mm, at least approximately 3.5 mm, or at least approximately 4 mm.

With continued reference to FIG. 5S, temperature sensor 340*b*, temperature sensor 340*a*, and thermally conductive probe 344*a* can be substantially aligned with one another along and/or with respect to an axis 5 that is parallel to axis 1 (see FIGS. 5S and FIGS. 5K-5L). An axis extending through a center of an array or group of holes 350*a* and/or holes 348*a* can substantially align with such axis 5 and/or be substantially parallel to axis 1. Similarly, temperature sensor 340*d*, temperature sensor 340*c*, and thermally conductive probe 344*b* can be substantially aligned with one another along and/or with respect to an axis 7 that is parallel to axis 1 (see FIGS. 5S and FIGS. 5K-5L). An axis extending through a center of an array or group of holes 350*b* and/or holes 348*b* can substantially align with such axis 5 and/or be substantially parallel to axis 1. As shown, axis 5 and 7 can be spaced from one another, for example, in a direction along axis 2. Each of axes 1, 2, and 3 are shown in FIGS. 5K, 5L, and 5S, and are mutually orthogonal to one another.

Temperature sensors 340*a*, 340*b* can be thermally insulated from one another. For example, with reference to at least FIG. 5S, an air gap can be present at least partially between temperature sensor 340*a* and 340*b*. For example, an air gap can be positioned at least partially between temperature sensor 340*a*, a second/bottom surface of circuit board 330, holes 350*a*, and temperature sensor 340*b*. In some variants, a thermally insulative material is positioned in place of such air gap.

Temperature sensors 340*c*, 340*d* can be thermally coupled to one another, for example, by a thermally conductive element 342. Thermally conductive element 342 can be positioned at least partially between temperature sensors 340*c*, 340*d*. For example, thermally conductive element 342 can be positioned between temperature sensor 340*c* and a second surface of circuit board 330 that is opposite a first surface of circuit board 330 to which temperature sensor 340*d* is mounted. Thermally conductive element 342 can also be positioned between holes 350*b* and temperature sensor 340*c*. Thermally conductive element 342 can comprise a first end 342*a* secured to the second surface of circuit board 330 adjacent to holes 350*b*, a second end 342*c* secured to the temperature sensor 340*c*, and a stem 342*b* positioned in between the first and second ends 342*a*, 342*c*. Thermally conductive element 342 can be rigid. Thermally conductive element 342 can be in a flexed configuration where stem 342*b* is at least partially bent when assembled (see FIGS. 5L-5M and 5O). Thermally conductive element 342 can comprise a metallic material, such as copper. As another example, the thermally conductive element 342 can comprise beryllium copper (BeCu). In some variants, a thermal material (such as a thermal paste) is positioned between end 342*c* and temperature sensor 340*c*, which can advantageously increase thermal transmissivity in some cases. For example, in some variants, such thermal paste comprises zinc oxide and/or is silicone free.

With reference to FIG. 5S, thermally conductive element 342 can have a width (for example, a width of end 342*a*, end 342*c*, and/or stem 342*b* which can extend in a direction parallel to axis 2 as shown in FIG. 5S) that is between approximately 0.01 inch and approximately 1 inch, for example, between approximately 0.01 inch and approximately 0.5 inch, between approximately 0.01 inch and approximately 0.4 inch, between approximately 0.01 inch and approximately 0.3 inch, between approximately 0.01 inch and approximately 0.2 inch, between approximately 0.01 inch and approximately 0.1 inch, between approximately 0.02 inch and approximately 0.1 inch, between approximately 0.03 inch and approximately 0.1 inch, between approximately 0.03 inch and approximately 0.1 inch, between approximately 0.04 inch and approximately 0.1 inch, between approximately 0.05 inch and approximately 0.1 inch, between approximately 0.06 inch and approximately 0.1 inch, between approximately 0.07 inch and approximately 0.1 inch, or between approximately 0.08 inch and approximately 0.1 inch, or any value or range between any of these values, or any value or range bounded by any combination of these values.

A width of stem 342*b* (see FIG. 5O) of thermally conductive element 342 (extending in a direction parallel to axis 2 as shown in FIG. 5S) can be between approximately 0.01 inch and approximately 1 inch, for example, between approximately 0.01 inch and approximately 0.5 inch, between approximately 0.01 inch and approximately 0.4 inch, between approximately 0.01 inch and approximately 0.3 inch, between approximately 0.01 inch and approximately 0.2 inch, between approximately 0.01 inch and approximately 0.1 inch, between approximately 0.01 inch and approximately 0.1 inch, between approximately 0.01 inch and approximately 0.09 inch, between approximately 0.01 inch and approximately 0.08 inch, between approximately 0.01 inch and approximately 0.07 inch, between approximately 0.01 inch and approximately 0.06 inch, between approximately 0.04 inch and approximately 0.06 inch, or any value or range between any of these values, or any value or range bounded by any combination of these values.

A thickness of thermally conductive element 342 (for example, a thickness of end 342*a*, end 342*c*, and/or stem 342*b*) can be between approximately 0.001 inch and approximately 0.1 inch, for example, between approximately 0.001 inch and approximately 0.09 inch, between approximately 0.001 inch and approximately 0.08 inch, between approximately 0.001 inch and approximately 0.07 inch, between approximately 0.001 inch and approximately 0.06 inch, between approximately 0.001 inch and approximately 0.05 inch, between approximately 0.001 inch and approximately 0.04 inch, between approximately 0.001 inch and approximately 0.03 inch, between approximately 0.001 inch and approximately 0.02 inch, between approximately 0.001 inch and approximately 0.01 inch, between approximately 0.001 inch and approximately 0.009 inch, between approximately 0.001 inch and approximately 0.008 inch, between approximately 0.001 inch and approximately 0.007 inch, between approximately 0.001 inch and approximately 0.006 inch, between approximately 0.004 inch and approximately 0.006 inch, or any value or range between any of these values, or any value or range bounded by any combination of these values.

FIG. 5T illustrates a cross-section taken through wearable device 100 when wearable device 100 is secured to user's skin. As discussed above, it is often difficult to accurately estimate internal body temperature based on temperature measurements obtained via skin. Advantageously, the arrangement of temperature sensors 340*a*, 340*b*, 340*c*, 340*d* along with various other components of wearable devices disclosed herein can facilitate more robust determinations of internal body temperature.

As discussed previously, wearable device 100 can include a substrate 250 that can be positioned to contact and/or secure to skin of a user when wearable device 100 is in use. Wearable device 100 can be secured to the skin via securement of dock 200 (and substrate 250) to the skin, prior to, during, and/or after securement of hub 300 to dock 200 which is described elsewhere herein. As also described previously, thermally conductive probes 344a, 344b can extend through opening 232 in frame 230 of dock 200 and contact substrate 250 (for example, an interior surface of substrate 250 that is opposite to an exterior or skin-facing surface of substrate 250) when hub 300 and dock 200 are coupled together. In some cases, probes 344a, 344b cause substrate 250 to "bulge", as shown in FIG. 5T (which may be an exaggerated representation of such "bulging"), for example, due to the length of probes 344a, 344b in relation to dimensions of the hub 300 and/or dock 200 (and/or portions thereof). Such bulging may cause corresponding pressure and/or "bulging" of a portion of the user's skin underneath (see FIG. 5T). In some implementations, the probes 344a, 344b are not configured to cause such "bulging", but merely contact substrate 250. In some implementations such as that shown, none of temperature sensors 340a, 340b, 340c, 340d and none of thermally conductive probes 344a, 344b contact skin of the user when wearable device 100 is in use. As also shown, when wearable device 100 is in use, probes 344a, 344b can receive thermal energy via contact with substrate 250 which itself contacts and receives thermal energy from skin. Such configurations can provide more consistent temperature readings since moisture and/or other characteristics of skin (for example, oil or dirt levels on skin) may result in inconsistent temperature readings.

Thermal energy radiating from the internal body of the user passing through the skin is conducted through substrate 250 and through thermally conductive probes 344a, 344b. As described previously, thermally conductive probes 344a, 344b can act as a thermal conduit to transmit thermal energy toward temperature sensors 340a, 340c. As discussed above, circuit board 331 can include holes 348a, 348b that can allow such thermal energy to pass through circuit board 331 to temperature sensors 340a, 340c.

In addition to temperature sensors 340a, 340c, wearable device 100 can include temperature sensors 340b, 340d. Temperature sensors 340b, 340d are operably positioned within a housing defined by shells 300a, 300c to be positioned farther away from the user's skin than temperature sensors 340a, 340c when wearable device 100 is secured to the user. For example, as shown, temperature sensors 340b, 340d can be positioned on a surface of circuit board 330 that faces toward a top interior surface of shell 300a. Such arrangement allows temperature sensors 340b, 340d to be more responsive to ambient temperature (for example, environmental temperature outside the housing of wearable device 100). In some variants, thermal putty (for example, a ceramic filled silicone sheet) is positioned between temperature sensors 340b, 340d and the top interior surface of shell 300a in order to provide better thermal contact between temperature sensors 340b, 340d and the ambient environment.

As discussed above, an air gap can be positioned between temperature sensor 340a and temperature sensor 340b (for example, between circuit board 330 and temperature sensor 340a). As also discussed above, a thermally conductive element 342 can be positioned between temperature sensors 340c, 340d. In such configurations, two unique temperature gradients are established, one between temperature sensors 340a, 340b and one between temperature sensors 340c, 340d.

Temperature data from each of temperature sensors 340a, 340b, 340c, 340d can advantageously be utilized by wearable device 100 to facilitate more robust approximations of internal body temperature. For example, temperature data from temperature sensors 340a and 340b can be compared (for example, differences can be determined therebetween) and/or temperature sensors 340c and 340d can be compared (for example, differences can be determined therebetween). Additionally or alternatively, comparisons between temperature data from temperature sensors 340a, 340c and/or between temperature sensors 340b, 340d can be made (for example, differences therebetween can be determined). Additionally or alternatively, comparisons between temperature data from temperature sensors 340a, 340d and/or between temperature sensors 340b, 340c can be made (for example, differences therebetween can be determined). Additionally, known information relating to thermal properties of air (which can be present between temperature sensors 340a, 340b as discussed previously) and/or thermally conductive element 342 can be utilized along with temperature data and/or comparisons of temperature data from temperature sensors 340a, 340b, 340c, 340d to determine robust approximations of internal body temperature. Such information can advantageously be utilized to overcome challenges of estimating internal body temperature based on skin temperature readings which are discussed above. Wearable device 100 (for example, processor 101) can determine body temperature values based on any of such above-described comparisons and/or differences and/or other information. In some implementations, wearable device 100 (for example, processor 101) can determine body temperature values based on one or more comparisons and/or one or more differences between any of such above-described differences.

Figure 6A:
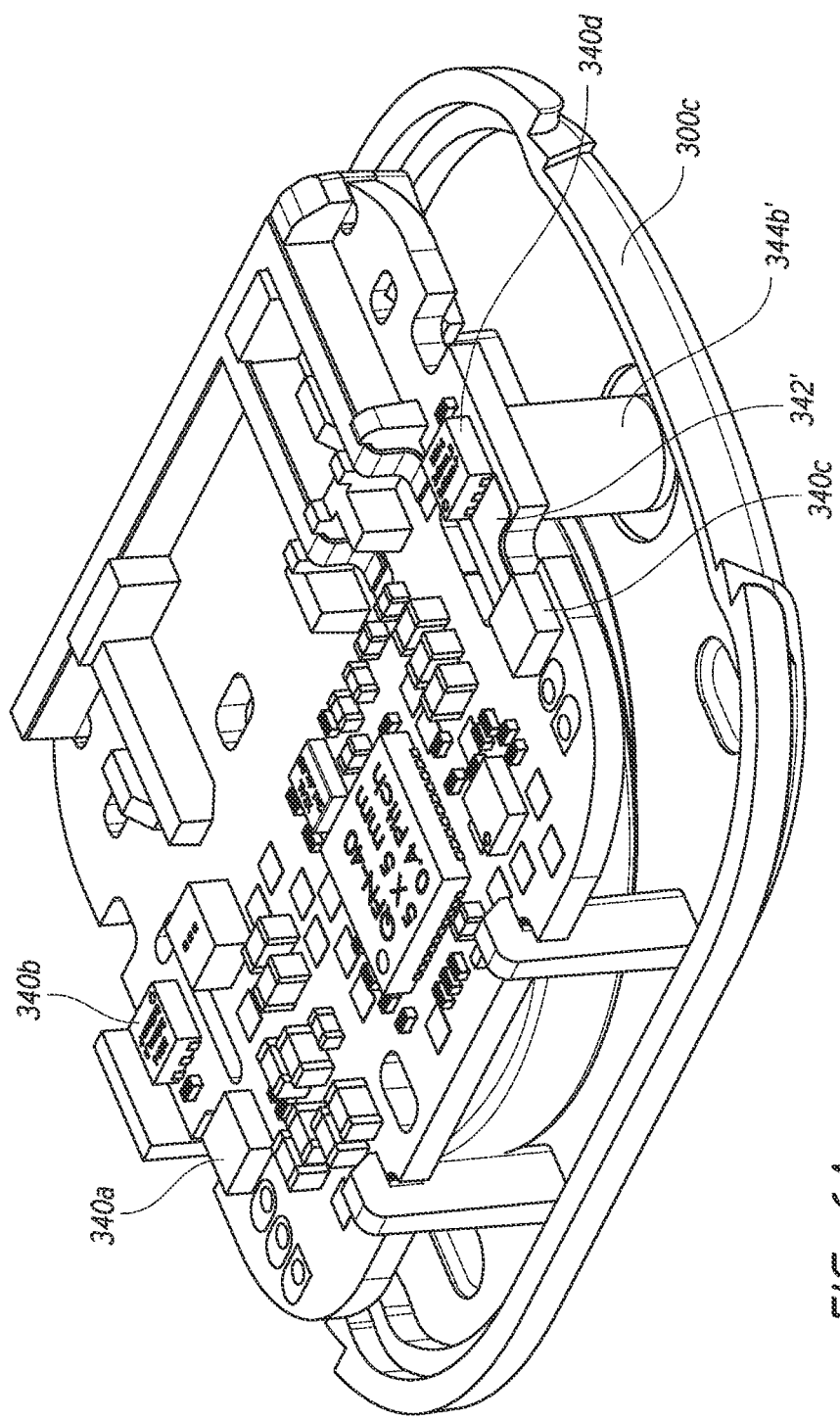
FIGS. 6A-6C illustrate alternative implementations for a hub of the wearable device in accordance with aspects of this disclosure.
Figure 6B:
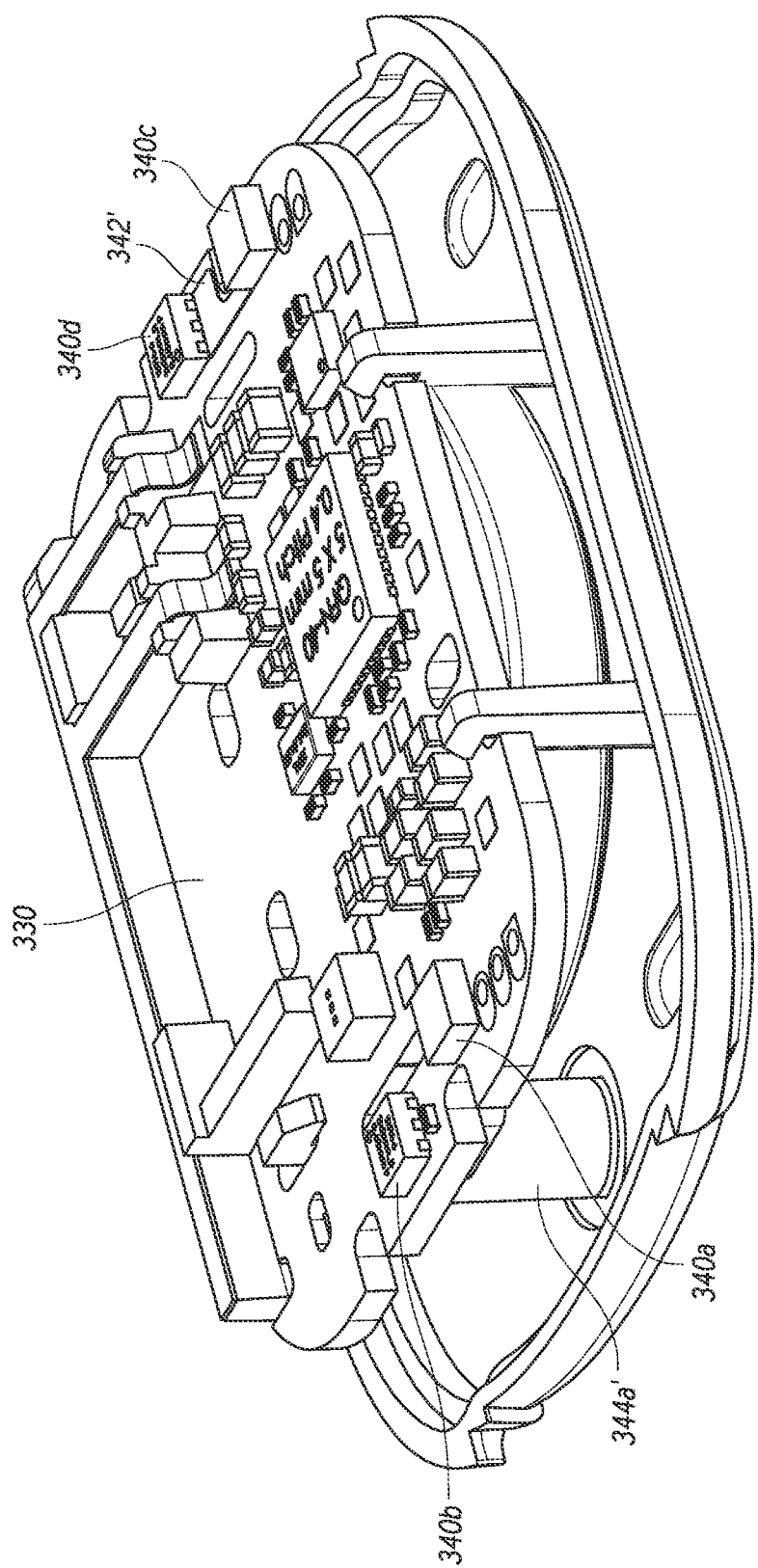
Figure 6C:
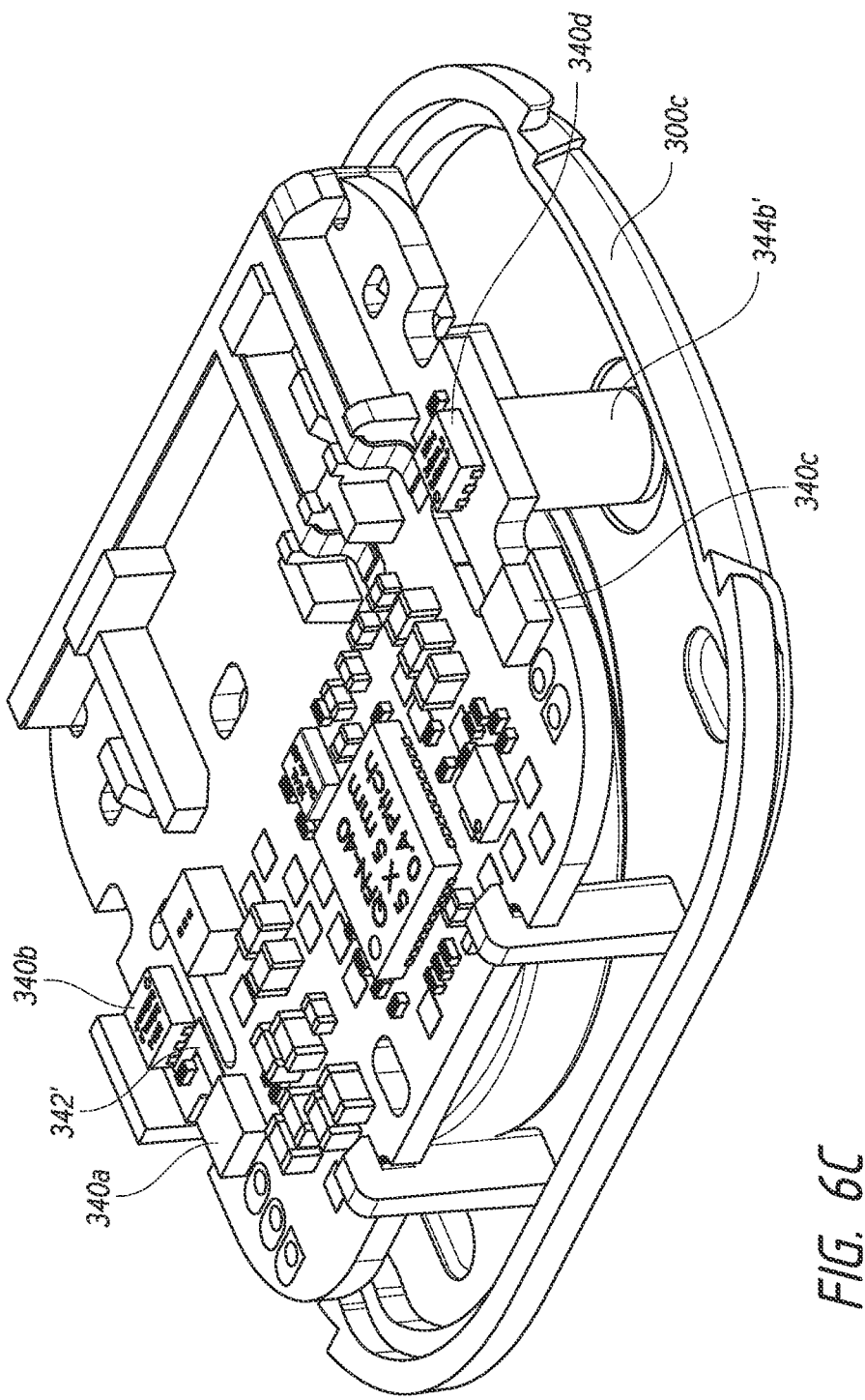

FIGS. 6A-6B illustrate an alternative implementation of hub 300, which includes only one circuit board (for example, circuit board 330), without shell 300a for purposes of clarity. In such alternative implementation, hub 300 includes thermally conductive probes 344a', 344b' which are longer than probes 344a, 344b and which extend up to a bottom surface of circuit board 330, for example, adjacent holes 350a, 350b (see FIG. 5S). Such alternative implementation still includes temperature sensors 340a, 340b, 340c, 340d, but all are arranged along substantially the same plane on the same surface of circuit board 330, as shown. As shown in FIG. 6A, temperature sensor 340d is substantially aligned with probe 344b' and temperature sensor 340c is not substantially aligned with probe 344b' and is spaced from temperature sensor 340d. Similarly, as shown in FIG. 6B, temperature sensor 340b is substantially aligned with probe 344a' and temperature sensor 340a is not substantially aligned with probe 344a' and is spaced from temperature sensor 340b. In some implementations, a thermally conductive element 342' (which can be similar to thermally conductive element 342 in many respects) is connected between temperature sensors 340d, 340c. In a variant as shown in FIG. 6C, thermally conductive element 342' is instead placed between temperature sensors 340a, 340b. Comparisons between different ones of temperature sensors 340a, 340b, 340c, 340d (such as any of the comparisons and/or differences discussed above) can be utilized along with known information relating to thermal properties of air (which can be present between temperature sensors 340a, 340b and/or 340c, 340d) and/or thermally conductive element 342' can be utilized to determine robust approximations of internal body temperature.

Figure 7A:
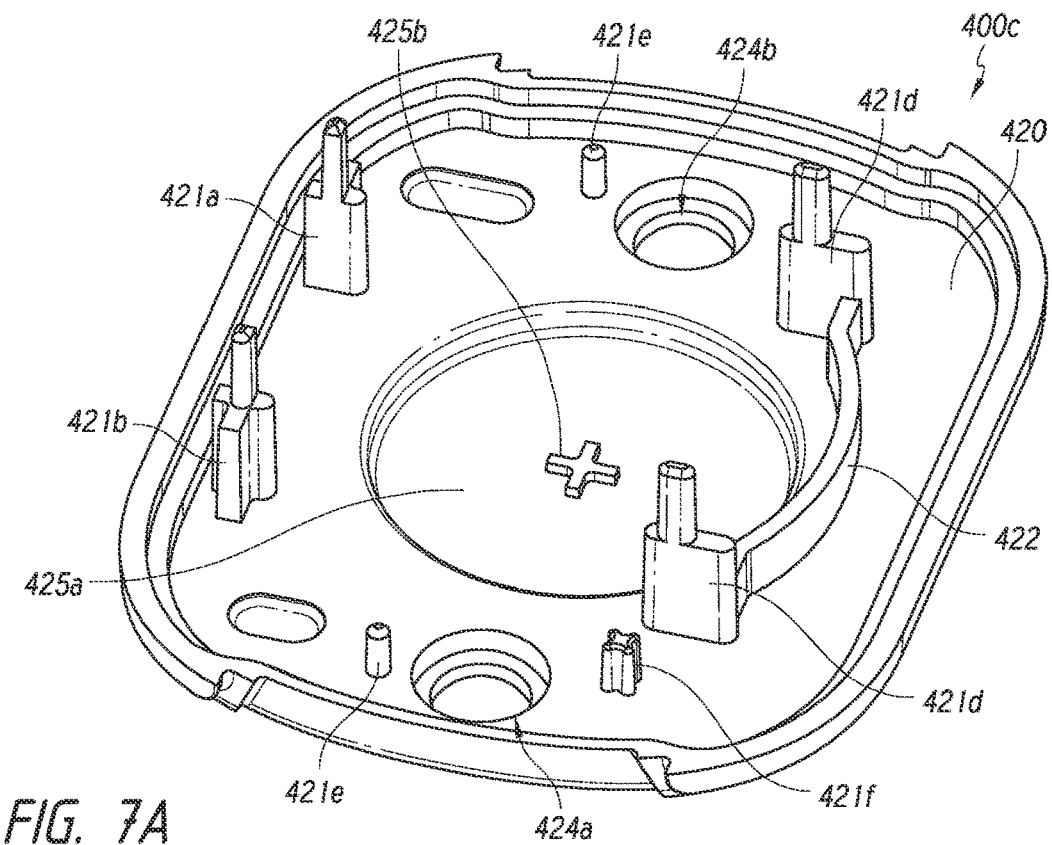
FIGS. 7A-7F illustrate alternative implementations of portions of a hub of the wearable device in accordance with aspects of this disclosure.
Figure 7B:
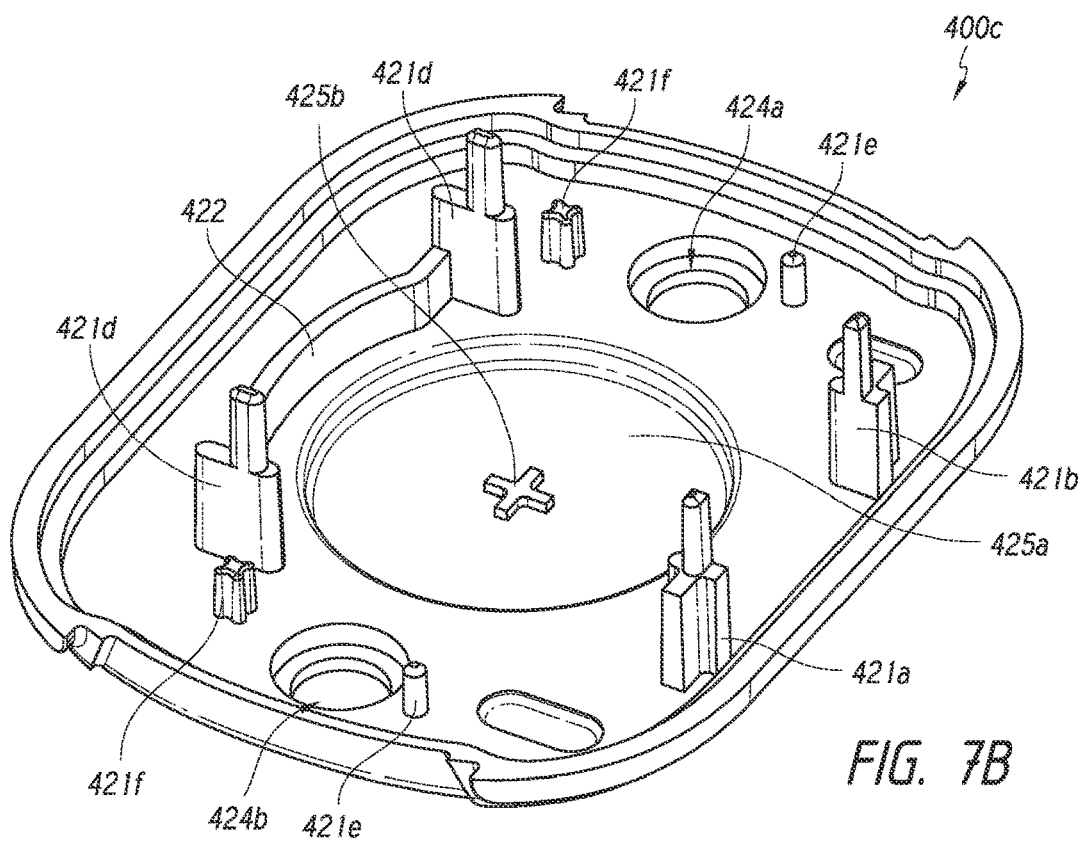
Figure 7C:
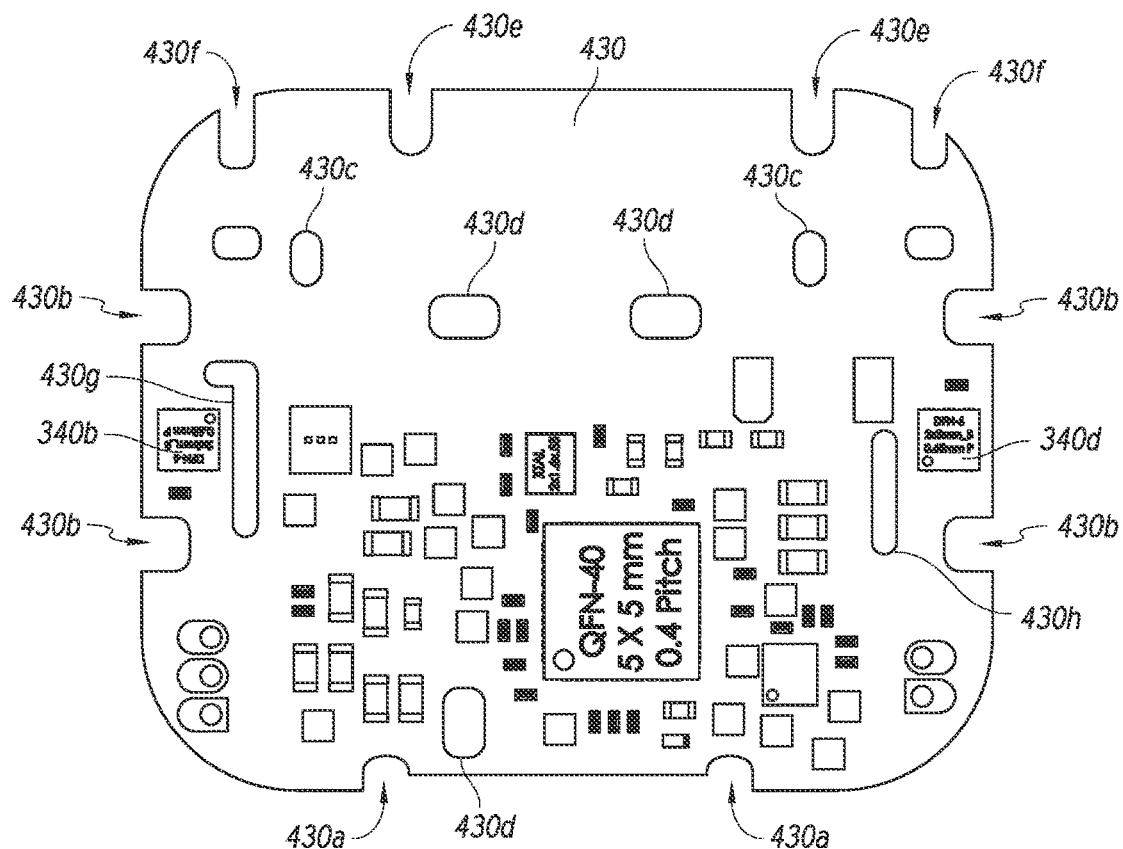
Figure 7D:
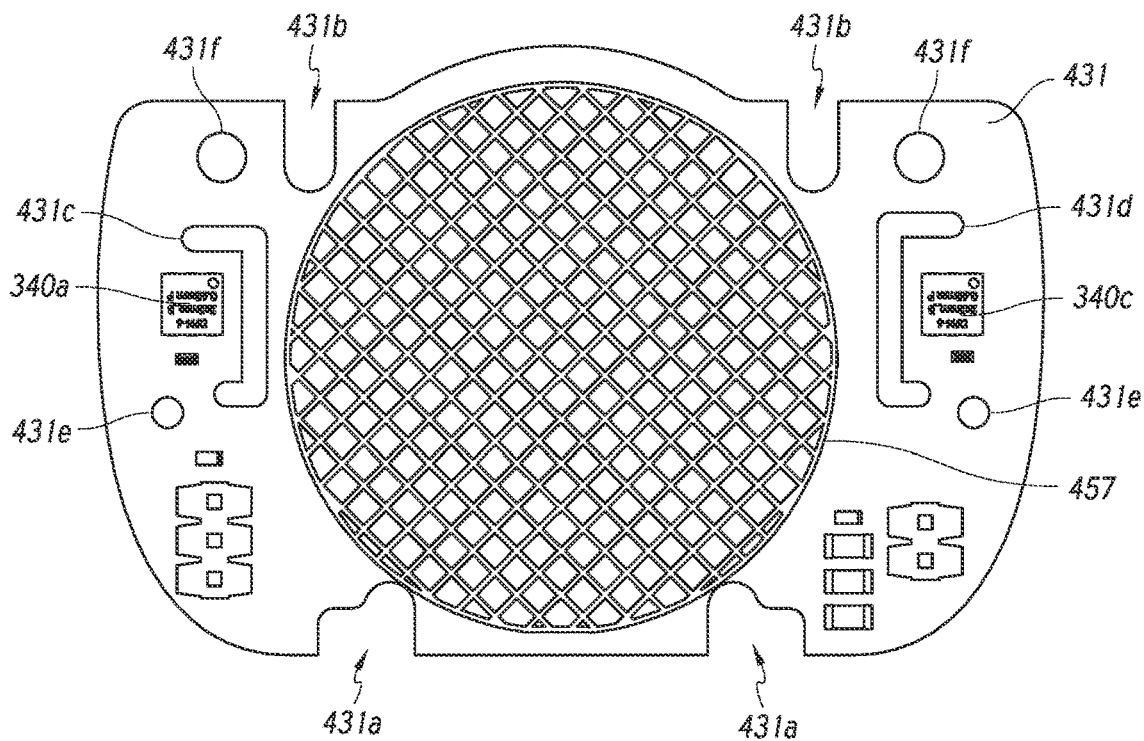
Figure 7E:
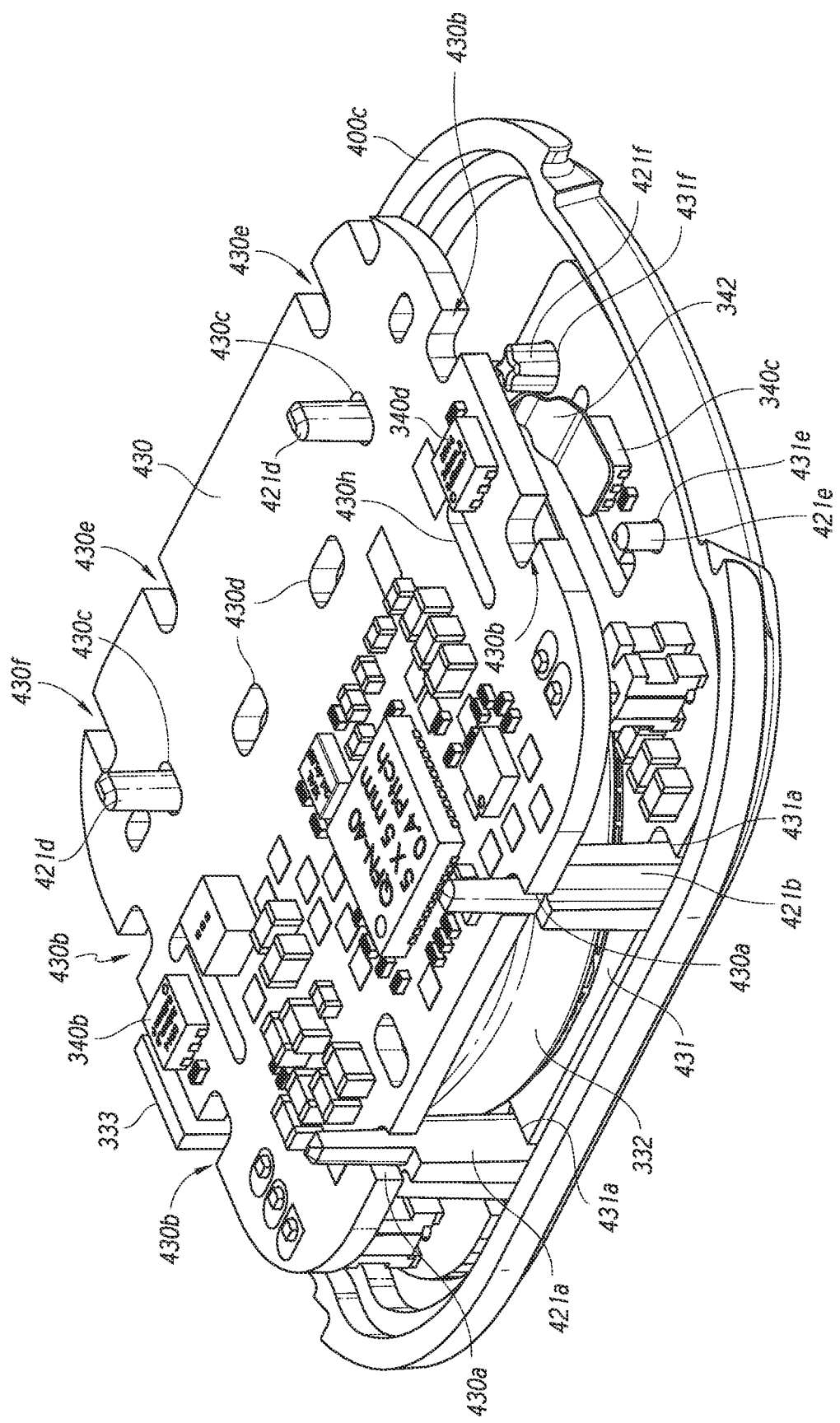
Figure 7F:
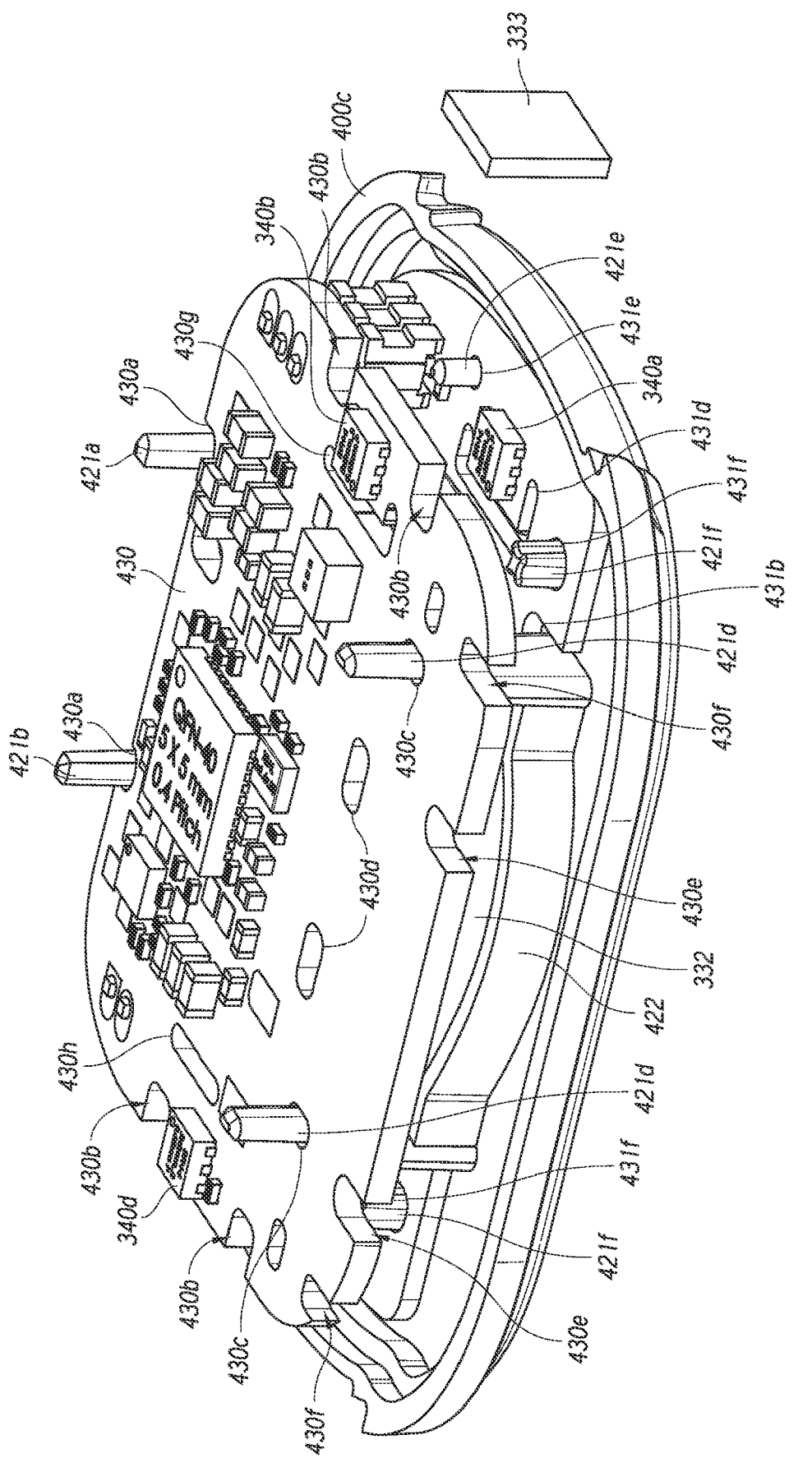

FIGS. 7A-7B illustrate another implementation of a shell 400c. Shell 400c can be utilized with shell 300a of wearable device 100. FIGS. 7C-7D illustrate top views of additional implementations of circuit boards 430, 431 that can be incorporated into wearable device 100, for example, along with shell 400c and shell 300a. FIGS. 7E-7F illustrate shell 400c assembled with circuit boards 430, 431 but without shell 300a connected thereto in order to illustrate how shell 400c and circuit boards 430, 431 can be engaged with one another as further described below. Shell 400c and circuit boards 430, 431 can be incorporated into wearable device 100 along with any of the components described elsewhere herein with respect to wearable device 100, including but not limited to battery 332, temperature sensors 340a, 340b, 340c, 340d, thermally conductive element 342, emitter 397, antenna 335, frame 334, NFC transponder 333, probes 344a, 344b, O-rings 345a, 345b, headers 336, and/or switch 325c.

Shell 400c can be similar or identical to shell 300c in some or many respects. With reference to FIGS. 7A-7B, which show top perspective views of shell 400c, shell 400c can include openings 424a, 424b, a pad 425a, and a protrusion 425b, which can be similar or identical to openings 324a, 324b, pad 325a, and protrusion 325b discussed above with reference to shell 300c. Openings 424a, 424b can allow probes 344a, 344b to extend through shell 400c, similar to openings 324a, 324b of shell 300c. Pad 325a and protrusion 325b can define, along with switch 325c, button 325 of wearable device 100. Shell 400c can include various structure(s) that can engage with portions of circuit boards 430, 431 and/or act to operably position portions of circuit boards 430, 431, similar to shell 300c and circuit boards 330, 331. For example, shell 400c can include stems 421a, 421b, 421d extending outward from surface 420 of shell 400c. Stems 421a, 421b (for example, portions thereof) can extend through and/or be received in notches 431a in circuit board 431 and notches 430a in circuit board 430 (see FIGS. 7C-7F). Stems 421d (for example, portions thereof) can extend through and/or be received in openings 431b in circuit board 431 and openings 430c in circuit board 430 (see FIGS. 7C-7F). In the implementation illustrated in FIGS. 7A-7B, stems 421d are configured to extend through openings 430c of circuit board 430 but do not include notched gripping portions in contrast to that illustrated with respect to arms 321c, 321d of shell 300c. Shell 400c can include protrusions 421e and/or protrusions 421f which can extend outward from surface 420. Protrusions 421e can extend through openings 431e of circuit board 431 and protrusions 421f can extend through openings 431f of circuit board 431 (see FIGS. 7D-7F). In some implementations, shell 400c includes a wall 422 extending between stems 421d. Wall 422 can be similar or identical to wall 322.

With reference to FIGS. 7C-7D, circuit board 430 can include openings 430g, 430h, which can be similar or identical to openings 330g, 330h in circuit board 330. Circuit board 431 can include openings 431c, 431d, which can be similar or identical to openings 331c, 331d in circuit board 331. Circuit board 430 can include openings 430d that can be similar or identical to openings 330d in circuit board 330. Openings 430d can receive portions of walls 313a, 313b, 313c (which may also be referred as "arms" or "protrusions") of shell 300a (see FIGS. 5G-5H). Circuit board 430 can include openings 430b (which may be referred to as "notches") that can receive portions of walls 317a, 317b, 316a, 316b of shell 300a. Circuit board 430 can include openings 430e (which may be referred to as "notches") and/or openings 430f (which may be referred to as "notches") that can receive protrusions 334e and/or legs 334d of frame 334, respectively, similar or the same as how openings 330e and/or 330f of circuit board 330 can receive such protrusions 334e and/or legs 334d. FIG. 7D illustrates an electrical contact 457 that can be coupled to circuit board 431. Electrical contact 457 can be similar or identical to electrical contact 357.

Additional Considerations and Terminology

Although this invention has been disclosed in the context of certain preferred implementations, it should be understood that certain advantages, features and aspects of the systems, devices, and methods may be realized in a variety of other implementations. Additionally, it is contemplated that various aspects and features described herein can be practiced separately, combined together, or substituted for one another, and that a variety of combination and subcombinations of the features and aspects can be made and still fall within the scope of the invention. Furthermore, the systems and devices described above need not include all of the modules and functions described in the preferred implementations.

Conditional language used herein, such as, among others, "can," "could," "might," "may," "e.g.," and the like, unless specifically stated otherwise, or otherwise understood within the context as used, is generally intended to convey that certain features, elements, and/or steps are optional. Thus, such conditional language is not generally intended to imply that features, elements, and/or steps are in any way required or that one or more implementations necessarily include logic for deciding, with or without other input or prompting, whether these features, elements, and/or steps are included or are to be always performed. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 10 degrees, 5 degrees, 3 degrees, or 1 degree. As another example, in certain implementations, the terms "generally perpendicular" and "substantially perpendicular" refer to a value, amount, or characteristic that departs from exactly perpendicular by less than or equal to 10 degrees, 5 degrees, 3 degrees, or 1 degree.

Although certain implementations and examples have been described herein, it will be understood by those skilled in the art that many aspects of the systems and devices shown and described in the present disclosure may be differently combined and/or modified to form still further implementations or acceptable examples. All such modifications and variations are intended to be included herein within the scope of this disclosure. A wide variety of designs and approaches are possible. No feature, structure, or step disclosed herein is essential or indispensable.

Any methods disclosed herein need not be performed in the order recited. The methods disclosed herein may include certain actions taken by a practitioner; however, they can also include any third-party instruction of those actions, either expressly or by implication.

The methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. The computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (for example, not all described operations or events are necessary for the practice of the algorithm). Moreover, in certain implementations, operations or events can be performed concurrently, e.g., through multi-threaded processing, interrupt processing, or multiple processors or processor cores or on other parallel architectures, rather than sequentially.

Various illustrative logical blocks, modules, routines, and algorithm steps that may be described in connection with the disclosure herein can be implemented as electronic hardware (e.g., ASICs or FPGA devices), computer software that runs on general purpose computer hardware, or combinations of both. Various illustrative components, blocks, and steps may be described herein generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, various illustrative logical blocks and modules that may be described in connection with the disclosure herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. A processor can include an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of any method, process, routine, or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features, it can be understood that various omissions, substitutions, and changes in the form and details of the devices or algorithms illustrated can be made without departing from the spirit of the disclosure. As can be recognized, certain portions of the description herein can be embodied within a form that does not provide all of the features and benefits set forth herein, as some features can be used or practiced separately from others. The scope of certain implementations disclosed herein is indicated by the appended claims rather than by the foregoing description. All changes which come within the meaning and range of equivalency of the claims are to be embraced within their scope.

What is claimed is:

1. A wearable device configured to secure to skin of a user and noninvasively measure body temperature of the user, the wearable device comprising:
   a first pair of temperature sensors, said first pair of temperature sensors comprising a first temperature sensor and a second temperature sensor, each of said first and second temperature sensors configured to generate one or more signals responsive to detected thermal energy, said first temperature sensor operably positioned to be closer to the user's skin than the second temperature sensor when the wearable device is secured to the user's skin, wherein the first pair of temperature sensors are thermally insulated from one another by an air gap;

a second pair of temperature sensors spaced from said first pair of temperature sensors, said second pair of temperature sensors comprising a third temperature sensor and a fourth temperature sensor, each of said third and fourth temperature sensors configured to generate one or more signals responsive to detected thermal energy, said third temperature sensor operably positioned to be closer to the user's skin than the fourth temperature sensor when the wearable device is secured to the user's skin;

a thermally conductive element positioned at least partially between the third and fourth temperature sensors; and one or more hardware processors configured to:
    receive said one or more signals generated by each of said first and second temperature sensors;
    receive said one or more signals generated by each of said third and fourth temperature sensors;
    determine one or more body temperature values of the user based on at least:
        a first comparison between said one or more signals generated by said first temperature sensor and said one or more signals generated by said second temperature sensor; and
        a second comparison between said one or more signals generated by said third temperature sensor and said one or more signals generated by said fourth temperature sensor.

2. The wearable device of claim 1, wherein:
the wearable device further comprises a first circuit board and a second circuit board, the first and second circuit boards spaced from one another, the first circuit board positioned closer to the skin of the user than the second circuit board when the wearable device is secured to the user's skin;
said first temperature sensor is mounted to the first circuit board and the second temperature sensor is mounted to the second circuit board;
said third temperature sensor is mounted to the first circuit board and spaced from the first temperature sensor;
said fourth temperature sensor is mounted to the second circuit board and spaced from the second temperature sensor;
a distance between the first temperature sensor and the second circuit board at least partially defines said air gap; and
said thermally conductive element is positioned between the third temperature sensor and a portion of the second circuit board that is adjacent to the fourth temperature sensor.

3. The wearable device of claim 2, wherein:
said first circuit board comprises a first surface and a second surface;
said second circuit board comprises a first surface and a second surface;
said first surface of the first circuit board faces toward the second surface of the second circuit board;
said first and third temperature sensors are mounted on the first surface of the first circuit board;
said second and fourth temperature sensors are mounted on the first surface of the second circuit board; and said thermally conductive element is positioned between the third temperature sensor and a portion of the second surface of the second circuit board that is adjacent to the fourth temperature sensor.

4. The wearable device of claim 3, wherein said second circuit board comprises at least one opening positioned between the fourth temperature sensor and a portion of said thermally conductive element, said at least one opening configured to allow thermal energy to pass from the thermally conductive element through the second circuit board and to the fourth temperature sensor.

5. The wearable device of claim 2, wherein the first and second circuit boards are arranged to be substantially parallel to one another.

6. The wearable device of claim 1, wherein said first and second temperature sensors are substantially aligned with one another and wherein said third and fourth temperature sensors are substantially aligned with one another.

7. The wearable device of claim 1, wherein said thermally conductive element comprises a metal strip.

8. The wearable device of claim 7, wherein said metal strip comprises copper.

9. The wearable device of claim 1, wherein said one or more hardware processors are further configured to determine said one or more body temperature values based on:
    a third comparison between said one or more signals generated by at least one of the first pair of temperature sensors and said one or more signals generated by at least one of the second pair of temperature sensors.

10. The wearable device of claim 1, wherein said one or more hardware processors are further configured to determine said one or more body temperature values based on:
    a third comparison between said one or more signals generated by the first temperature sensor and said one or more signals generated by the fourth temperature sensor.

11. The wearable device of claim 1, wherein the wearable device comprises a first portion configured to be secured to the user's skin and a second portion configured to removably secure to the first portion, and wherein the one or more hardware processors, the thermally conductive element, the first pair of temperature sensors, and the second pair of temperature sensors are positioned within the second portion of the wearable device.

12. The wearable device of claim 11, wherein the first portion comprises a frame and a substrate coupled to the frame, the substrate configured to secure to the user's skin, and wherein the second portion comprises a housing.

13. The wearable device of claim 12, wherein the housing comprises a first shell and a second shell, and wherein the first and second shells are permanently secured together.

14. The wearable device of claim 1, wherein none of the first temperature sensor, second temperature sensor, third temperature sensor, and fourth temperature sensor contact the user's skin when the wearable device is secured to the user.

15. A wearable device configured to secure to skin of a user, the wearable device comprising:
    a first pair of temperature sensors, said first pair of temperature sensors comprising a first temperature sensor and a second temperature sensor, said first temperature sensor operably positioned to be closer to the user's skin than the second temperature sensor when the wearable device is secured to the user's skin, wherein the first pair of temperature sensors are thermally insulated from one another by an air gap;

a second pair of temperature sensors spaced from said first pair of temperature sensors, said second pair of temperature sensors comprising a third temperature sensor and a fourth temperature sensor, said third temperature sensor operably positioned to be closer to the user's skin than the fourth temperature sensor when the wearable device is secured to the user's skin; and one or more hardware processors configured to:
receive one or more signals generated by each of said first temperature sensor, second temperature sensor, third temperature sensor, and fourth temperature sensor responsive to thermal energy; and determine one or more body temperature values of the user based on at least:
a first comparison between said one or more signals generated by said first temperature sensor and said one or more signals generated by said second temperature sensor; and
a second comparison between said one or more signals generated by said third temperature sensor and said one or more signals generated by said fourth temperature sensor.

16. The wearable device of claim 15, further comprising a thermally conductive element positioned at least partially between the third and fourth temperature sensors.

17. The wearable device of claim 16, wherein:
the wearable device further comprises a first circuit board and a second circuit board, the first and second circuit boards spaced from one another, the first circuit board positioned closer to the skin of the user than the second circuit board when the wearable device is secured to the user's skin;
said first temperature sensor is mounted to the first circuit board and the second temperature sensor is mounted to the second circuit board;
said third temperature sensor is mounted to the first circuit board and spaced from the first temperature sensor;
said fourth temperature sensor is mounted to the second circuit board and spaced from the second temperature sensor;
a distance between the first temperature sensor and the second circuit board at least partially defines said air gap; and
said thermally conductive element is positioned between the third temperature sensor and a portion of the second circuit board that is adjacent to the fourth temperature sensor.

18. The wearable device of claim 17, wherein:
said first circuit board comprises a first surface and a second surface;
said second circuit board comprises a first surface and a second surface;
said first surface of the first circuit board faces toward the second surface of the second circuit board;
said first and third temperature sensors are mounted on the first surface of the first circuit board;
said second and fourth temperature sensors are mounted on the first surface of the second circuit board; and
said thermally conductive element is positioned between the third temperature sensor and a portion of the second surface of the second circuit board that is adjacent to the fourth temperature sensor.

19. The wearable device of claim 18, wherein said second circuit board comprises at least one opening positioned between the fourth temperature sensor and a portion of said thermally conductive element, said at least one opening configured to allow thermal energy to pass from the thermally conductive element through the second circuit board and to the fourth temperature sensor.

* * * * *